United States Patent
Fudaba et al.

(10) Patent No.: US 8,909,374 B2
(45) Date of Patent: Dec. 9, 2014

(54) ROBOT ARM CONTROL APPARATUS, ROBOT ARM CONTROL METHOD, ROBOT, ROBOT ARM CONTROL PROGRAM, AND INTEGRATED ELECTRONIC CIRCUIT

(71) Applicant: Panasonic Corporation, Osaka (JP)

(72) Inventors: Yudai Fudaba, Osaka (JP); Masaki Yamamoto, Nara (JP); Yuko Tsusaka, Osaka (JP); Taichi Sato, Kyoto (JP)

(73) Assignee: Panasonic Corporation, Osaka (JP)

( * ) Notice: Subject to any disclaimer, the term of this patent is extended or adjusted under 35 U.S.C. 154(b) by 157 days.

(21) Appl. No.: 13/785,324

(22) Filed: Mar. 5, 2013

(65) Prior Publication Data

US 2013/0184871 A1    Jul. 18, 2013

Related U.S. Application Data

(63) Continuation of application No. PCT/JP2012/000035, filed on Jan. 5, 2012.

(30) Foreign Application Priority Data

Jan. 27, 2011 (JP) ................................. 2011-015228

(51) Int. Cl.
| | | |
|---|---|---|
| *G05B 19/04* | (2006.01) | |
| *G05B 19/18* | (2006.01) | |
| *G05B 15/00* | (2006.01) | |
| *G05B 19/00* | (2006.01) | |
| *B25J 13/02* | (2006.01) | |
| *B25J 13/08* | (2006.01) | |
| *G05B 19/423* | (2006.01) | |

(52) U.S. Cl.
CPC ............... *B25J 13/02* (2013.01); *B25J 13/081* (2013.01); *G05B 19/423* (2013.01); *G05B 2219/36453* (2013.01); *Y10S 901/02* (2013.01); *Y10S 901/03* (2013.01); *Y10S 901/04* (2013.01); *Y10S 901/09* (2013.01); *Y10S 901/20* (2013.01); *Y10S 901/30* (2013.01); *Y10S 901/33* (2013.01); *Y10S 901/46* (2013.01)
USPC ........... 700/257; 700/253; 700/254; 700/255; 700/258; 700/264; 901/2; 901/3; 901/4; 901/9; 901/20; 901/30; 901/33; 901/46

(58) Field of Classification Search
CPC . A61B 19/2203; A61B 19/2223; B25J 13/02; B25J 9/1633; B25J 13/085; B25J 13/084; B25J 18/00; B25J 9/1676; B25J 13/00; B25J 13/081; B25J 3/00; B25J 9/1641; B25J 13/082; G05B 2219/36429; G05B 2219/36433; G05B 2219/39082; G05B 2219/39505; G05B 2219/45083; G05B 2219/37411; G05B 2219/40379; G05B 2219/39211; G05B 2219/39439
See application file for complete search history.

(56) References Cited

U.S. PATENT DOCUMENTS 4,791,588 A  * 12/1988 Onda et al. .................... 700/260
5,403,970 A     4/1995 Aoki (Continued)

FOREIGN PATENT DOCUMENTS

| JP | 60-156113 | 8/1985 |
|---|---|---|
| JP | 1-164541 | 6/1989 |

(Continued)

OTHER PUBLICATIONS

International Search Report issued Mar. 19, 2012 in International (PCT) Application No. PCT/JP2012/000035.
International Preliminary Report on Patentability issued Aug. 1, 2013 in International (PCT) Application No. PCT/JP2012/000035.

*Primary Examiner* — Khoi Tran
*Assistant Examiner* — Bao Long T Nguyen
(74) *Attorney, Agent, or Firm* — Wenderoth, Lind & Ponack, L.L.P.

(57) ABSTRACT

A robot arm includes a grip part which is structured to be separated from an end effector attached to the robot arm. When the grip part is gripped by the user and shifted, the robot arm shifts tracking the grip part. Further, the grip part includes contact sensors, and a tracking control method is switched according to the value of the contact sensors.

9 Claims, 63 Drawing Sheets

(56) References Cited

U.S. PATENT DOCUMENTS

| | | | |
|---|---|---|---|
| 5,783,922 A * | 7/1998 | Hashimoto et al. | 318/568.14 |
| 5,880,956 A * | 3/1999 | Graf | 700/86 |
| 5,923,139 A * | 7/1999 | Colgate et al. | 318/566 |
| 6,385,508 B1 * | 5/2002 | McGee et al. | 700/254 |
| 6,477,448 B1 | 11/2002 | Maruyama | |
| 7,778,732 B2 * | 8/2010 | Adachi et al. | 700/245 |
| 7,872,436 B2 * | 1/2011 | Kock et al. | 318/631 |
| 8,392,024 B2 * | 3/2013 | Murayama et al. | 700/260 |
| 8,489,236 B2 * | 7/2013 | Fudaba et al. | 700/245 |
| 2006/0178775 A1 * | 8/2006 | Zhang et al. | 700/245 |
| 2006/0192514 A1 * | 8/2006 | Adachi et al. | 318/568.13 |
| 2007/0005189 A1 | 1/2007 | Furubo | |

FOREIGN PATENT DOCUMENTS

| | | |
|---|---|---|
| JP | 3-161799 | 7/1991 |
| JP | 4-164584 | 6/1992 |
| JP | 9-216183 | 8/1997 |
| JP | 11-231925 | 8/1999 |
| JP | 2000-246674 | 9/2000 |
| JP | 2005-14132 | 1/2005 |
| JP | 2005-14133 | 1/2005 |
| JP | 2005-193340 | 7/2005 |
| JP | 2006-247787 | 9/2006 |
| JP | 2007-7786 | 1/2007 |
| JP | 2007-76807 | 3/2007 |
| JP | 2012-24848 | 2/2012 |

* cited by examiner

Fig.7
| CONTACT SENSOR | OCCURRENCE OF CONTACT |
|---|---|
| 105A | 0 |
| 105B | 0 |
| 105C | 1 |
| 105D | 1 |
| 105E | 0 |
Fig.8
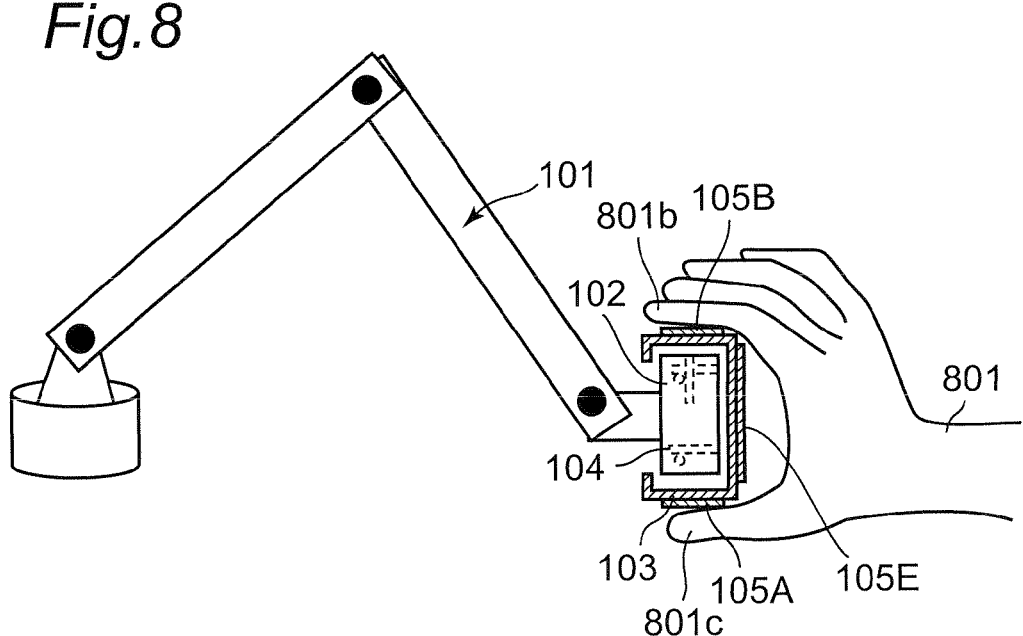
Fig.9A
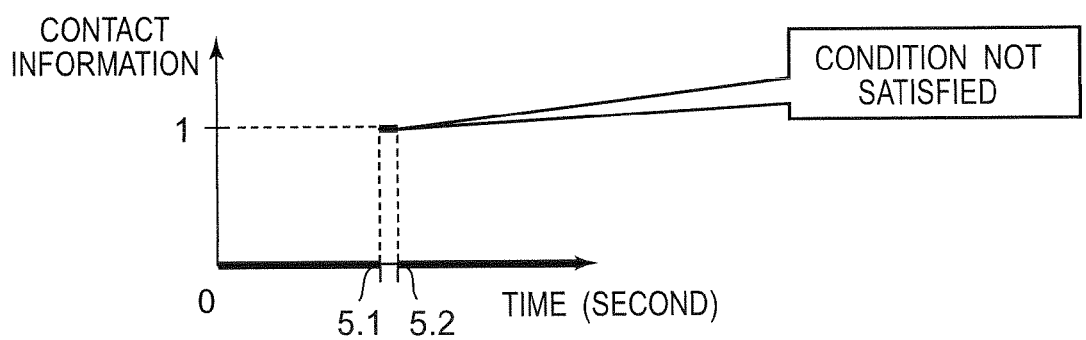

Fig.17

| STATE OF USER'S GRIPPING TO GRIP PART | TIME FROM START OF GRIPPING | COEFFICIENT k |
|---|---|---|
| GRIPPING | 0 SECONDS OR MORE AND LESS THAN 3 SECONDS | 0.5 |
| | 3 SECONDS OR MORE | 1.0 |
| NOT GRIPPING | | 0.0 |

Fig. 25

| STATE OF USER'S GRIPPING TO GRIP PART | POSITION OF GRIPPED CONTACT SENSORS 105 | COEFFICIENT k |
|---|---|---|
| GRIPPING | 105A AND 105B | 0.5 |
| | 105C AND 105D | 0.5 |
| | : : | : : |
| | 105H AND 105I | 0.5 |
| | 105A AND 105B AND 105F | 1.0 |
| | 105A AND 105B AND 105G | 1.0 |
| | : : | : : |
| | 105A AND 105B AND 105C AND 105D AND 105E AND 105F AND 105G AND 105H AND 105I | 1.0 |
| NOT GRIPPING | | 0.0 |

Fig.32

| FORCE SENSOR | MAGNITUDE OF FORCE (N) |
|---|---|
| 3001A | 1.5 |
| 3001B | 1.2 |
| 3001C | 0.0 |
| 3001D | 0.0 |
| 3001E | 0.5 |

Fig.33

| STATE OF USER'S GRIPPING TO GRIP PART | MAGNITUDE OF GRIPPING FORCE | COEFFICIENT k |
|---|---|---|
| GRIPPING | 0.3N OR MORE AND LESS THAN 2.0N | 0.5 |
| | 2.0N OR MORE | 1.0 |
| NOT GRIPPING | | 0.0 |

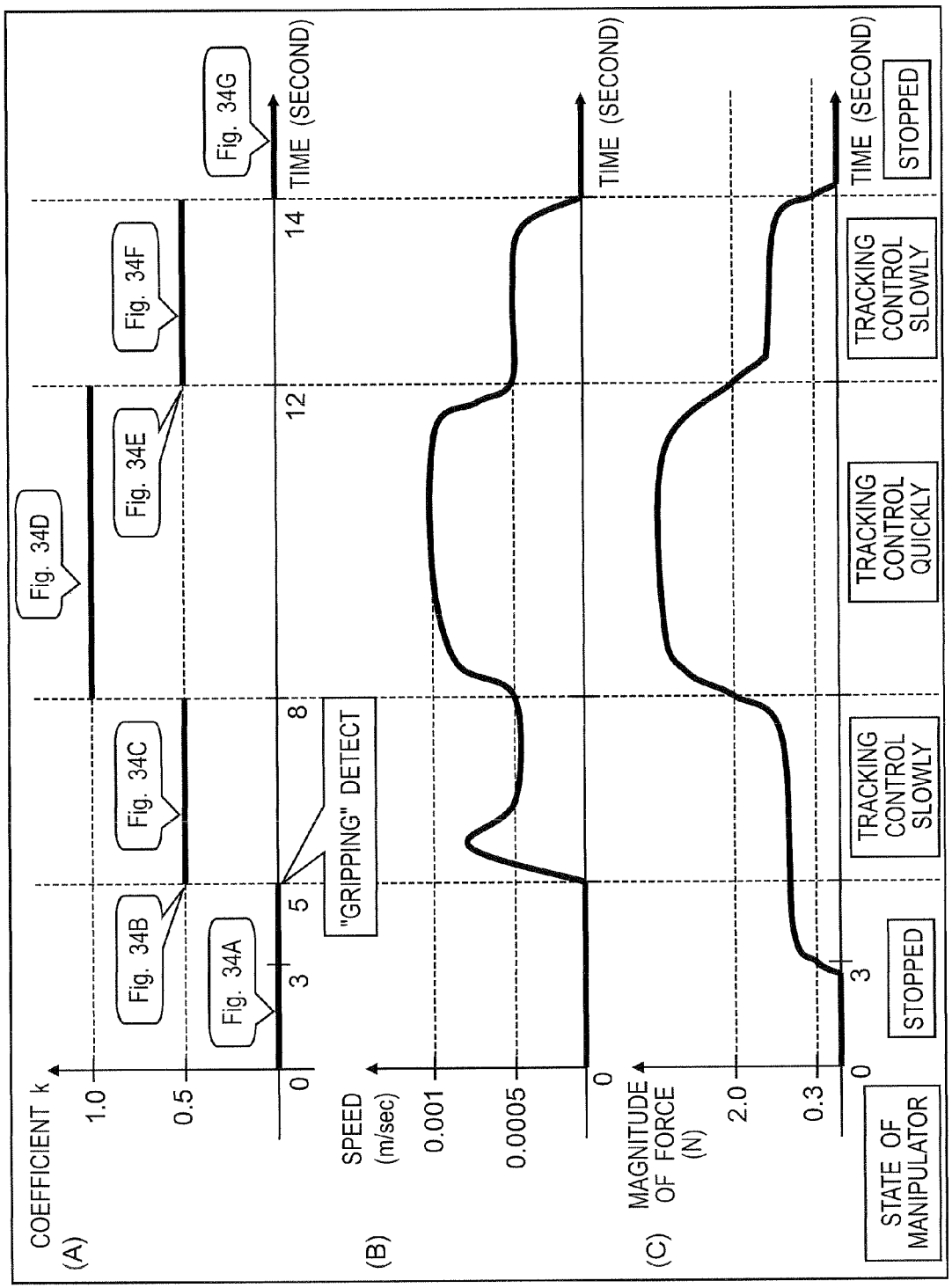

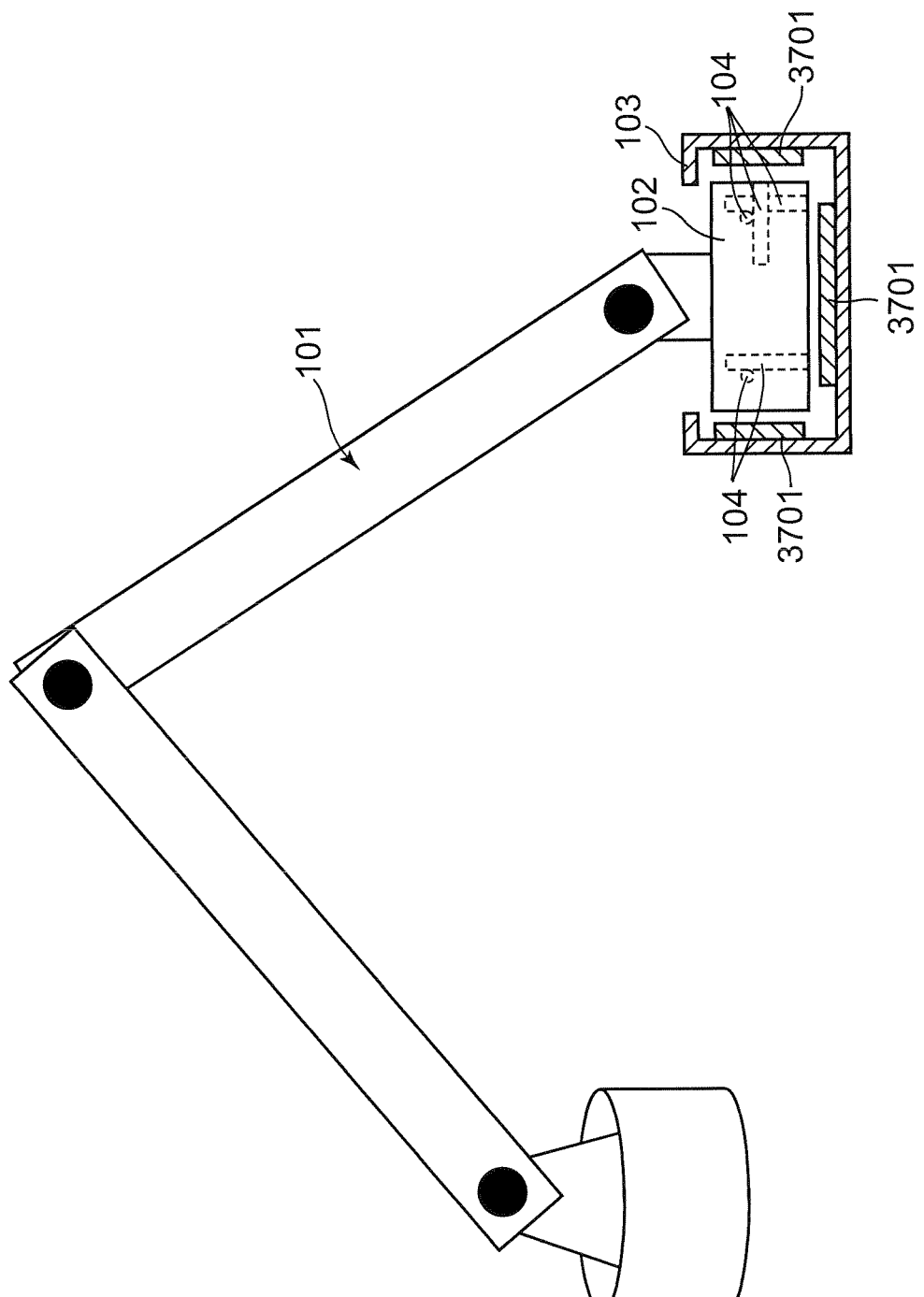

ROBOT ARM CONTROL APPARATUS, ROBOT ARM CONTROL METHOD, ROBOT, ROBOT ARM CONTROL PROGRAM, AND INTEGRATED ELECTRONIC CIRCUIT

CROSS-REFERENCE TO RELATED APPLICATIONS

This is a continuation application of International Application No. PCT/JP2012/000035, with an international filing date of Jan. 5, 2012, which claims priority of Japanese Patent Application No.: 2011-015228 filed on Jan. 27, 2011, the content of which is incorporated herein by reference.

TECHNICAL FIELD

The technical field relates to a robot arm control device, a robot arm control method, a robot having the robot arm control device, a robot arm control program, and an integrated electronic circuit, for generating operations of a robot to teach or carry out desired work such as cooperative conveyance.

BACKGROUND ART

In recent years, model changes frequently take place for producing various types in small lots at manufacturing sites. In order to automate screw tightening work, fitting work or attaching work of components, inserting work of flexible substrates or the like, or polishing work by robots at recent manufacturing sites where the cell production is actively adopted, it is necessary to flexibly address a great variety of components or work procedures. Since the position or orientation in assembly work changes every time a change is made in the component and so a change is made in the order of performing the work, such changes must be addressed. Further, the work of handling flexible objects such as inserting work of flexible substrates is troublesome, and hence is still human-intensive. When the flexible object is brought into contact with a target object and is deflected thereby, a reaction occurs and the human estimates the deflection degree or the position of a flexible object by the reaction received at his/her hand. In this manner, the human can carry out complicated work.

To the contrary, it is very difficult for a robot to perform complicated work in accordance with the obtained reaction, because the force information or positional information of the flexible object which flexure manner or place varies for each trial and cannot be formulated. There is great demand for solving the aforementioned issue and automating such human-intensive works so as to be performed by robots.

Accordingly, what is conventionally employed is a method of teaching works to robots using a teaching pendant or programming. However, teaching through such a method greatly increases the teaching steps. Further, it may be impossible to teach works which require complicated motion such as moving a plurality of joints of a robot at the same time.

As described above, the method of teaching through use of a teaching pendant or programming has limitation.

Therefore, conventionally, what is employed is a method of simply teaching through direct teaching, in which a robot is taught by being touched. The direct teaching is advantageous in that: an intuitive manipulation is possible; and the user can feel the physical reaction occurred by the robot being brought into contact with the target object, whereby the worker can perform a manipulation in accordance with the reaction. On the other hand, it has combined disadvantageous in that: the user cannot support the robot when the robot itself is heavy, and hence cannot manipulate the robot; the user cannot feel the physical reaction occurred by the robot being brought into contact with the target object because the robot itself is heavy; and the robot is dangerous when the robot becomes out of control because the user is touching the robot. Thus, in teaching the robot of poor operability, it is highly important to improve the operability of the robot. Similarly, it is important to secure safety when the user touches the robot.

In connection with the direct teaching, a structure in which a second robot arm is attached by a spring to the arm end leading end part of the first robot arm is considered. Employing the structure having the two robot arms, more precise direct teaching is realized as compared to the conventional structure having only one robot arm (see Patent Literature 1).

Further, a method is used which includes: limiting the motion of the retaining member in the horizontal direction; detecting external environment (a displacement amount or force information of the retained target object); and exerting impedance control. Thus, even in the case where a relatively heavy target object is held, the retaining member can be displaced with a small force (see Patent Literature 2).

On the other hand, in connection with the conveying work of products or the fitting work of heavy components, in the case where the work cannot be achieved by a robot through the method using a teaching pendant or programming because of complexity, the work is performed by two workers. There is strong demand for reducing the burden of the workers using a robot in performing such work. In automating such work, the worker cannot teach the robot through the direct teaching because the product weighs heavy. Accordingly, what is employed is the cooperative conveyance method, in which a robot conveys the gripped heavy product in cooperation with the worker.

In connection with the cooperative conveyance, it is considered to produce an assist force at the robot so that the cooperative conveyance is achieved with a small manipulatory force. The assist force value is obtained as follows. That is, the joint angle of the robot, the arm end position, and the force that the worker cooperatively working with the robot applies to the target object are detected. Based on these values, the viscosity coefficient of the worker's fingertip, the elastic coefficient, and the natural length position of the worker's fingertip are estimated, and the assist force value is obtained based on these values (see Patent Literature 3).

CITATION LIST

Patent Literature

Patent Literature 1: Japanese Unexamined Patent Publication No. 4-164584
Patent Literature 2: Japanese Unexamined Patent Publication No. 2006-247787
Patent Literature 3: Japanese Unexamined Patent Publication No. 2007-76807

SUMMARY OF THE INVENTION

In Patent Literature 1, since the robot arm attached to the leading end part of the arm end is attached by a spring, the robot arm is influenced by the elastic force of the spring. Hence, the operability is still unsatisfactory. Further, since the second robot arm does not move as being interlocked with the first robot arm, when work requiring a wide work area is to be performed, the number of work steps might be increased because the second robot arm must be moved after the first robot arm is moved.

In Patent Literature 2, since the motion of the retaining member is limited only in the horizontal direction, it is difficult to move in other directions. Further, since the retaining member and the robot arm are in contact with each other, the robot arm is influenced by the gravity of the retaining member or the friction force caused by the contact. Therefore, the operability is still unsatisfactory.

In Patent Literature 3, though the robot produces an assist force, the error of the estimated values causes the user to sense the weight of the target object or the robot, which leaves the operability unsatisfactory. Further, since it is necessary to use a force sensor, a great cost will be incurred.

Accordingly, the inventors of the present disclosure have devised the structure of a robot arm in which the grip part gripped by the user when the robot arm is manipulated is mechanistically separated from the robot arm body. With this structure, by exerting tracking control of the robot arm such that the relative position of the robot arm body and the grip part falls within a prescribed threshold value range, the influence of inertia of the robot arm body can be eliminated when the user manipulates the grip part. Hence, a great improvement in operability can be achieved.

However, with this structure, when the user is not gripping the grip part, the grip part falls down until the grip part hits the ground. In accordance therewith, the robot arm continues to fall down following the grip part. Thus, when the user is not gripping the grip part, the robot arm continuously falls down and hence is dangerous. Further, in the case where the relative position of the grip part and the robot arm is great when the user grips the grip part and starts exerting the tracking control and when ending the tracking control, the robot arm performs tracking the great relative position. Hence, because the robot arm sharply shifts, it is very dangerous if the robot arm hits the user. On the other hand, when the user sharply shifts the grip part, the robot arm cannot perform tracking, and hence the behavior of the robot arm cannot be predicted.

One non-limiting and exemplary embodiment provides a robot arm control device, a robot arm control method, a robot, a robot arm control program, and an integrated electronic circuit, with which the operability of a robot arm in performing work such as cooperative conveyance or direct manipulation can be improved, and with which a robot arm can be moved at ease highly safely.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: a robot arm control device controlling an operation of a robot arm performing work by being touched and manipulated by a user, the robot arm including an end effector attached to a body of the robot arm, and a grip part attached to the body of the robot arm as being separated from the end effector to form a clearance of a prescribed interval between the end effector and the grip part, the grip part being capable of relatively shifting to the end effector and being capable of being gripped by the user during a manipulation, the robot arm control device including:

a relative position information acquiring unit that acquires relative position information of the grip part to the end effector during the manipulation;

a tracking control unit that obtains a shift amount of the robot arm for tracking control causing the robot arm to shift in accordance with a change amount of the interval of the clearance between the end effector and the grip part, such that the relative position information acquired by the relative position information acquiring unit falls within a prescribed threshold value range;

a tracking control switch control unit that outputs tracking control information switching the tracking control such that the tracking control unit exerts the tracking control when the grip part is in contact with any other object than the end effector, and that the tracking control unit does not exert the tracking control when the grip part is out of contact with the other object; and a control unit that controls, based on the tracking control information from the tracking control switch control unit, shifting of the robot arm in accordance with the change amount of the interval of the clearance between the end effector and the grip part based on the shift amount of the robot arm obtained by the tracking control unit when the tracking control unit exerts the tracking control, whereas the control unit controls shifting of the robot arm irrespective of the shift amount of the robot arm obtained by the tracking control unit when the tracking control unit does not exert the tracking control, wherein the tracking control switch control unit includes:

a contact information acquiring unit that acquires information as to an occurrence of contact between the grip part and any other object;

a grip detecting unit that detects grip information indicative of an occurrence of gripping of the user to the grip part, based on the information as to the contact acquired by the contact information acquiring unit; and a tracking control switching unit that outputs tracking control information for exerting the tracking control only when the user is gripping the grip part and for stopping the tracking control when the user is not gripping the grip part, based on the grip information detected by the grip detecting unit.

These general and specific aspects may be implemented using a system, a method, and a computer program, and any combination of systems, methods, and computer programs.

With the robot arm control apparatus, the robot arm control method, the robot, the robot arm control program, and the integrated electronic circuit of the present disclosure, the end effector attached to the robot arm body and the grip part gripped by the user are mechanistically separated from each other, and the user can manipulate the robot arm by manipulating the grip part. As a result, the influence of the inertia of the robot arm body to the grip part during manipulation can be eliminated, and operability can highly be improved. Further, in the case where the grip part mechanistically separated from the robot arm is brought into contact with any other object, safety can be improved by changing the method of tracking control.

BRIEF DESCRIPTION OF THE DRAWINGS

These and other objects and features of the present disclosure will become apparent from the following description in connection with embodiments taken in conjunction with the accompanying drawings, in which:

FIG. 7 is an explanatory view of contact information in the robot according to the first embodiment of the present disclosure;

FIG. 8 is an explanatory view of the gripping position of the user's hand in the robot according to the first embodiment of the present disclosure;

FIG. 9A is an explanatory view of the gripping time of the user's hand in the robot according to the first embodiment of the present disclosure;

FIG. 17 is an explanatory view of a determination method of coefficient information of a tracking control switching unit in the robot according to the second embodiment of the present disclosure;

FIG. 25 is an explanatory view of a determination method of coefficient information in a tracking control switching unit in the robot according to the third embodiment of the present disclosure;

FIG. 32 is an explanatory view of force information in the robot according to the fourth embodiment of the present disclosure;

FIG. 33 is an explanatory view of a determination method of coefficient information in a tracking control switching unit in the robot according to the fourth embodiment of the present disclosure;

FIG. 35 is an explanatory view of cooperative conveyance using the robot arm in the robot according to the fourth embodiment of the present disclosure, in which FIGS. 35 (A), 35 (B), and 35 (C) are respectively explanatory views of the relationship between the time and coefficient of cooperative conveyance, the relationship between time and speed, and the relationship between the time and magnitude of force, using the robot arm in the robot according to the fourth embodiment of the present disclosure;

FIG. 37 is a configuration view of an end effector, a grip part, relative position sensors, and contact sensors in a robot according to a fifth embodiment of the present disclosure;

DETAILED DESCRIPTION

Figure 1:
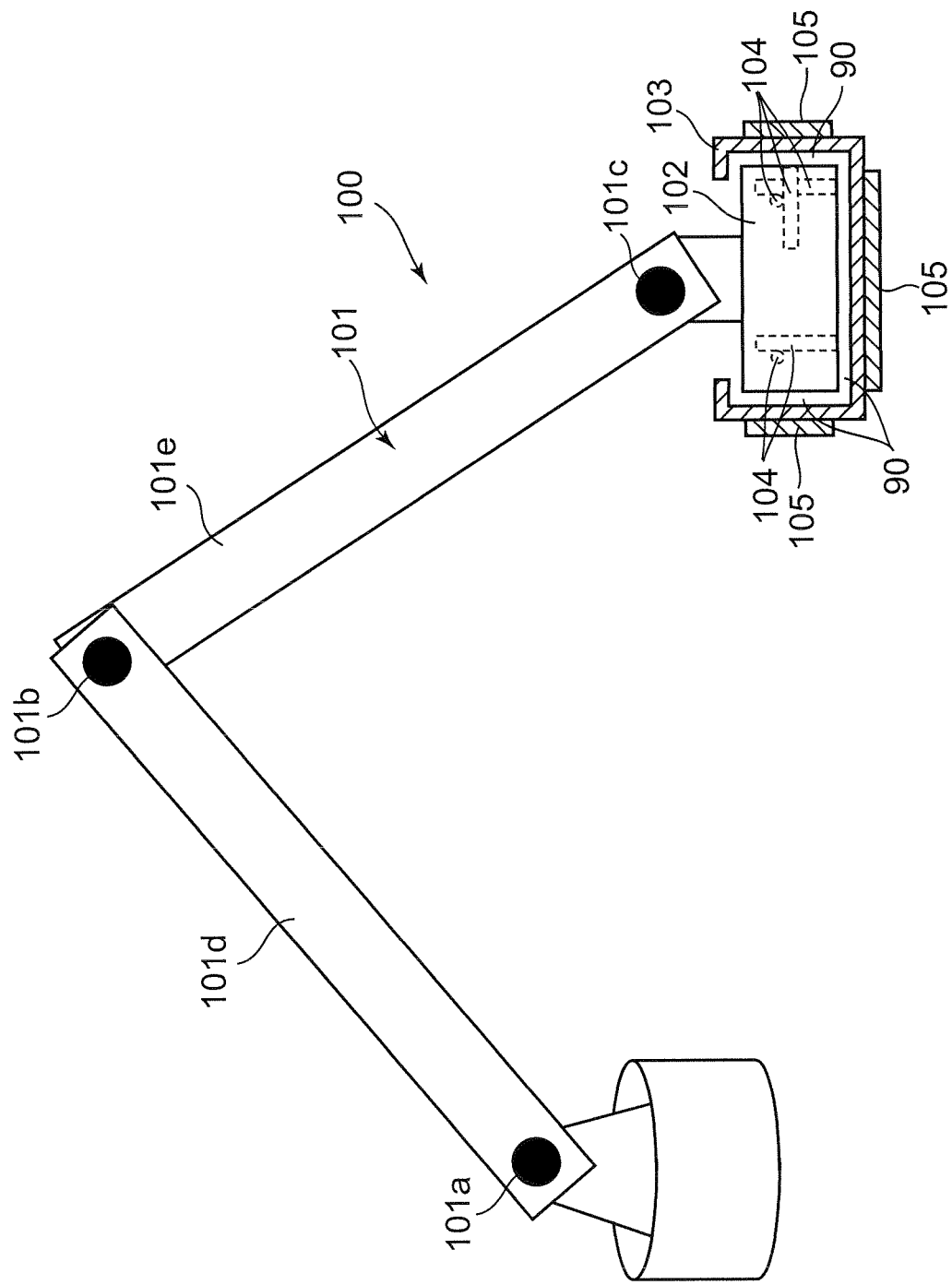
FIG. 1 is a configuration view of an end effector, a grip part, relative position sensors, and contact sensors in a robot according to a first embodiment of the present disclosure.

In the following, with reference to the drawings, a detailed description will be given of embodiments of the present disclosure.

First, the basic concept of the present disclosure is explained.

Examples of the disclosed technique are as follows.

1st aspect: A robot arm control device controlling an operation of a robot arm performing work by being touched and manipulated by a user, the robot arm including an end effector attached to a body of the robot arm, and a grip part attached to the body of the robot arm as being separated from the end effector to form a clearance of a prescribed interval between the end effector and the grip part, the grip part being capable of relatively shifting to the end effector and being capable of being gripped by the user during a manipulation, the robot arm control device comprising:

a relative position information acquiring unit that acquires relative position information of the grip part to the end effector during the manipulation;

a tracking control unit that obtains a shift amount of the robot arm for tracking control causing the robot arm to shift in accordance with a change amount of the interval of the clearance between the end effector and the grip part, such that the relative position information acquired by the relative position information acquiring unit falls within a prescribed threshold value range;

a tracking control switch control unit that outputs tracking control information switching the tracking control such that the tracking control unit exerts the tracking control when the grip part is in contact with any other object than the end effector, and that the tracking control unit does not exert the tracking control when the grip part is out of contact with the other object; and a control unit that controls, based on the tracking control information from the tracking control switch control unit, shifting of the robot arm in accordance with the change amount of the interval of the clearance between the end effector and the grip part based on the shift amount of the robot arm obtained by the tracking control unit when the tracking control unit exerts the tracking control, whereas the control unit controls shifting of the robot arm irrespective of the shift amount of the robot arm obtained by the tracking control unit when the tracking control unit does not exert the tracking control, wherein the tracking control switch control unit includes:

a contact information acquiring unit that acquires information as to an occurrence of contact between the grip part and any other object;

a grip detecting unit that detects grip information indicative of an occurrence of gripping of the user to the grip part, based on the information as to the contact acquired by the contact information acquiring unit; and a tracking control switching unit that outputs tracking control information for exerting the tracking control only when the user is gripping the grip part and for stopping the tracking control when the user is not gripping the grip part, based on the grip information detected by the grip detecting unit.

2nd aspect: The robot arm according to the first aspect, wherein the grip detecting unit detects, in addition to the information as to an occurrence of the user's gripping, an elapsed time from a start of gripping also as the grip information, the robot arm further comprising:

a control coefficient information acquiring unit that acquires associated information in which the information as to an occurrence of the user's gripping to the grip part, the elapsed time from the start of the gripping, and information as to a control coefficient determining the tracking speed are associated with one another; and a control coefficient information determining unit that determines the control coefficient determining the tracking speed based on the grip information detected by the grip detecting unit and the associated information acquired by the control coefficient information acquiring unit, wherein in a prescribed certain time immediately after the user grips the grip part, control is exerted such that the tracking speed of the tracking control becomes slower than the tracking speed in other time, based on the control coefficient acquired by the control coefficient information acquiring unit.

3rd aspect: The robot arm according to the first aspect, wherein the grip detecting unit detects, in addition to the information as to an occurrence of the user's gripping, a position at which the grip part is gripped by the user also as the grip information, the robot arm further comprising:

a control coefficient information acquiring unit that acquires associated information in which the information as to an occurrence of the user's gripping to the grip part, the position at the grip part gripped by the user, and information as to a control coefficient determining a tracking speed are associated with one another; and a control coefficient information determining unit that determines the control coefficient determining the tracking speed based on the grip information detected by the grip detecting unit and the associated information acquired by the control coefficient information acquiring unit, wherein control is exerted such that the tracking speed of the tracking control is changed based on the control coefficient acquired by the control coefficient information acquiring unit, in accordance with the position at which the grip part is gripped by the user.

4th aspect: The robot arm according to the first aspect, wherein the tracking control switch control unit includes a force information acquiring unit acquiring a magnitude of force externally applied to the grip part, and the grip detecting unit detects, based on the force information acquired by the force information acquiring unit, the information as to an occurrence of gripping of the user to the grip part, and further detects the magnitude of force of the user gripping the grip part also as the grip information, the robot arm further comprising:

a control coefficient information acquiring unit that acquires associated information in which the information as to an occurrence of the user's gripping to the grip part, the magnitude of force of the user gripping the grip part, and a control coefficient determining the tracking speed are associated with one another; and a control coefficient information determining unit that determines a control coefficient determining the tracking speed based on the grip information detected by the grip detecting unit and the associated information acquired by the control coefficient information acquiring unit, wherein control is exerted such that the tracking speed of the tracking control is changed based on the control coefficient acquired by the control coefficient information acquiring unit, in accordance with the magnitude of force of the user gripping the grip part.

5th aspect: The robot arm according to the first aspect, wherein the tracking control switch control unit includes:

a contact information acquiring unit that acquires an occurrence of contact of the end effector with the grip part; and a tracking control switching unit that outputs tracking control information for stopping tracking control only when the grip part and the end effector are brought into contact with each other, and exerting tracking control when the grip part and the end effector are out of contact with each other, based on the contact information acquired by the contact information acquiring unit.

6th aspect: A robot including the robot arm according to one of the first to fifth aspects.

7th aspect: A robot arm control method controlling an operation of a robot arm performing work by being touched and manipulated by a user, the robot arm including an end effector attached to a body of the robot arm, and a grip part attached to the body of the robot arm as being separated from the end effector to form a clearance of a prescribed interval between the end effector and the grip part, the grip part being capable of relatively shifting to the end effector and being capable of being gripped by the user during a manipulation, the method including:

acquiring, by a relative position information acquiring unit, relative position information of the grip part to the end effector during the manipulation;

obtaining, by a tracking control unit, a shift amount of the robot arm for tracking control causing the robot arm to shift in accordance with a change amount of the interval of the clearance between the end effector and the grip part, such that the relative position information acquired by the relative position information acquiring unit falls within a prescribed threshold value range;

outputting, by a tracking control switch control unit, tracking control information switching the tracking control such that the tracking control unit exerts the tracking control when the grip part is in contact with any other object than the end effector, and that the tracking control unit does not exert the tracking control when the grip part is out of contact with the other object; and controlling, based on the tracking control information from the tracking control switch control unit, shifting of the robot arm in accordance with the change amount of the interval of the clearance between the end effector and the grip part based on the shift amount of the robot arm obtained by the tracking control unit when the tracking control unit exerts the tracking control, whereas the control unit controls shifting of the robot arm irrespective of the shift amount of the robot arm obtained by the tracking control unit when the tracking control unit does not exert the tracking control, wherein in the outputting of the tracking control information from the tracking control switch control unit, acquiring, by a contact information acquiring unit, information as to an occurrence of contact between the grip part and any other object, detecting, by a grip detecting unit, grip information indicative of an occurrence of gripping of the user to the grip part, based on the information as to the contact acquired by the contact information acquiring unit, and outputting, by a tracking control switching unit, tracking control information for exerting the tracking control only when the user is gripping the grip part and for stopping the tracking control when the user is not gripping the grip part, based on the grip information detected by the grip detecting unit.

8th aspect: A computer-readable recording medium including a robot arm control program for controlling an operation of a robot arm performing work by being touched and manipulated by a user, the robot arm including an end effector attached to a body of the robot arm, and a grip part attached to the body of the robot arm as being separated from the end effector to form a clearance of a prescribed interval between the end effector and the grip part, the grip part being capable of relatively shifting to the end effector and being capable of being gripped by the user during a manipulation, the robot arm control program causing a computer to perform steps of:

acquiring, by a relative position information acquiring unit, relative position information of the grip part to the end effector during the manipulation;

obtaining, by a tracking control unit, a shift amount of the robot arm for tracking control causing the robot arm to shift in accordance with a change amount of the interval of the clearance between the end effector and the grip part, such that the relative position information acquired by the relative position information acquiring unit falls within a prescribed threshold value range;

outputting, by a tracking control switch control unit, tracking control information switching the tracking control such that the tracking control unit exerts the tracking control when the grip part is in contact with any other object than the end effector, and that the tracking control unit does not exert the tracking control when the grip part is out of contact with the other object; and controlling, based on the tracking control information from the tracking control switch control unit, shifting of the robot arm in accordance with the change amount of the interval of the clearance between the end effector and the grip part based on the shift amount of the robot arm obtained by the tracking control unit when the tracking control unit exerts the tracking control, whereas the control unit controls shifting of the robot arm irrespective of the shift amount of the robot arm obtained by the tracking control unit when the tracking control unit does not exert the tracking control, wherein in the outputting of the tracking control information from the tracking control switch control unit, acquiring, by a contact information acquiring unit, information as to an occurrence of contact between the grip part and any other object, detecting, by a grip detecting unit, grip information indicative of an occurrence of gripping of the user to the grip part, based on the information as to the contact acquired by the contact information acquiring unit, and outputting, by a tracking control switching unit, tracking control information for exerting the tracking control only when the user is gripping the grip part and for stopping the tracking control when the user is not gripping the grip part, based on the grip information detected by the grip detecting unit.

9th aspect: A robot arm-use integrated electronic circuit controlling an operation of a robot arm performing work by being touched and manipulated by a user, the robot arm including an end effector attached to a body of the robot arm, and a grip part attached to the body of the robot arm as being separated from the end effector to form a clearance of a prescribed interval between the end effector and the grip part, the grip part being capable of relatively shifting to the end effector and being capable of being gripped by the user during a manipulation, the integrated electronic circuit including:

a relative position information acquiring unit that acquires relative position information of the grip part to the end effector during the manipulation;

a tracking control unit that obtains a shift amount of the robot arm for tracking control causing the robot arm to shift in accordance with a change amount of the interval of the clearance between the end effector and the grip part, such that the relative position information acquired by the relative position information acquiring unit falls within a prescribed threshold value range;

a tracking control switch control unit that outputs tracking control information switching the tracking control such that the tracking control unit exerts the tracking control when the grip part is in contact with any other object than the end effector, and that the tracking control unit does not exert the tracking control when the grip part is out of contact with the other object; and a control unit that controls, based on the tracking control information from the tracking control switch control unit, shifting of the robot arm in accordance with the change amount of the interval of the clearance between the end effector and the grip part based on the shift amount of the robot arm obtained by the tracking control unit when the tracking control unit exerts the tracking control, whereas the control unit controls shifting of the robot arm irrespective of the shift amount of the robot arm obtained by the tracking control unit when the tracking control unit does not exert the tracking control, wherein the tracking control switch control unit includes:

a contact information acquiring unit that acquires information as to an occurrence of contact between the grip part and any other object;

a grip detecting unit that detects grip information indicative of an occurrence of gripping of the user to the grip part, based on the information as to the contact acquired by the contact information acquiring unit; and a tracking control switching unit that outputs tracking control information for exerting the tracking control only when the user is gripping the grip part and for stopping the tracking control when the user is not gripping the grip part, based on the grip information detected by the grip detecting unit.

In the following, with reference to the drawings, the embodiments of the present disclosure will be described.

(First Embodiment)

In the following, a description will be given of a robot according to a first embodiment of the present disclosure.

With the robot according to the first embodiment of the present disclosure, in order to improve the operability of the robot arm, a grip part gripped by the user when being manipulated is mechanistically separated from a robot arm body, and the robot arm body follows the shifting of the grip part (a detailed description thereof will be given later). However, exerting the tracking control in this manner invites an issue that, when the user is not gripping the grip part, the grip part falls and the robot arm falls down (a detailed description thereof will be given later). The first embodiment is directed to resolve the issue.

FIG. 1 shows a robot 601 including a robot arm 100 according to the first embodiment of the present disclosure. The robot arm 100 includes a manipulator 101 as an example of a body of the robot arm 100, an end effector 102, a grip part 103, relative position sensors 104 as an example of a relative position information acquiring unit, and contact sensors 105. It is to be noted that, when specific contact sensors are described individually, the contact sensors are respectively denoted by reference characters 105A to 105E as described later, while the contact sensors are denoted by reference character 105 when generally described. Here, the robot 601 is structured by the robot arm 100, and a control device 602 for the robot arm.

The manipulator 101 has a plurality of multi-joint mechanisms as described later, and links 101d and 101e rotate about joint shafts (101a, 101b, 101c). To the arm end of the manipulator 101, the end effector 102 is attached.

The end effector 102 accommodates a plurality of relative position sensors 104, and has a function of measuring, by the plurality of relative position sensors 104, the relative position of the grip part 103 to the end effector 102 (that is, information of the relative position, in other words, a measurement value or a measured value). The end effector 102 is fixed to the arm end of the manipulator 101 such that its position will not be changed, and the relative position of the grip part 103 from the fixed position is measured. In the first embodiment, the relative position is measured using six relative sensors 104 (the detail thereof will be given later).

The grip part 103 is the part for the user to grip with his/her hand in performing work. The grip part 103 is structured to be separated from the end effector 102.

The relative position sensors 104 are the sensors that detect the relative position of the grip part 103 to the end effector 102. Here, Δr generally refers to Δx to Δγ. Here, the relative sensors 104 having prescribed six pieces of acquired information of the relative position are used (the detail thereof will be given later).

The contact sensors 105 are attached on the outer side of the grip part 103, to detect contact between a target object outside the grip part 103 and the grip part 103. Here, five contact sensors 105 are used (the detail thereof will be given later).

In the following, with reference to FIGS. 2A to 2C, a detailed description will be given of the end effector 102, the grip part 103, the relative position sensors 104, and the contact sensors 105.

Figure 2A:
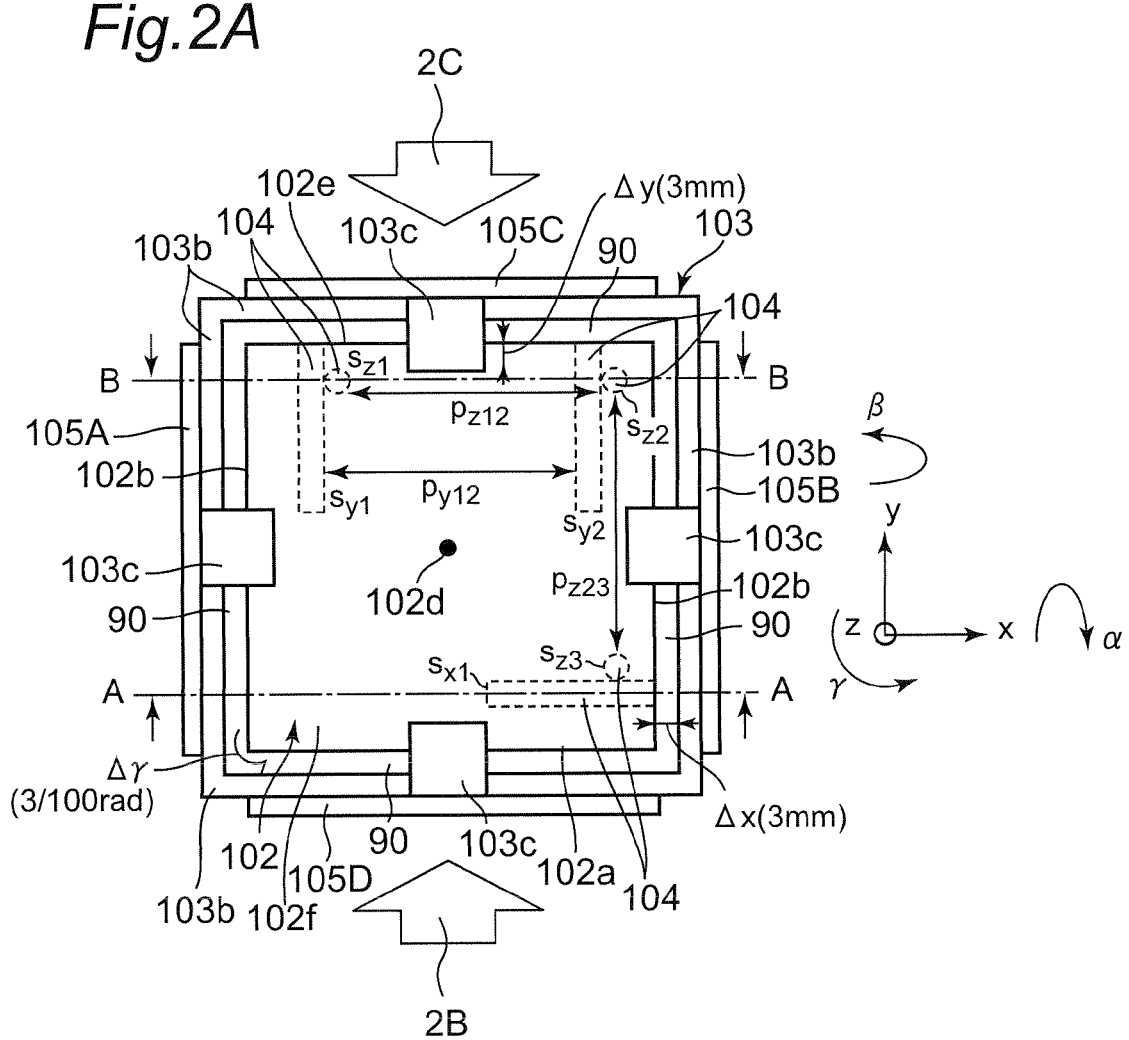
FIG. 2A is a plan view of the end effector, the grip part, the relative position sensors, and the contact sensors in the robot according to the first embodiment of the present disclosure.

FIG. 2A is a plan view of the end effector 102 being rectangular parallelepiped-shaped and having a square plane, the quadrangular box-like grip part 103, the relative position sensors 104, and the contact sensors 105. The arm end of the manipulator 101 is coupled to the surface of FIG. 2A. FIG. 2B is a cross-sectional view of the end effector 102, the grip part 103, the relative position sensors 104, and the contact sensors 105 taken along line A-A in FIG. 2A and as seen from arrow 2B. FIG. 2C is a cross-sectional view of the end effector 102, the grip part 103, the relative position sensors 104, and the contact sensors 105 taken along line B-B in FIG. 2A and as seen from arrow 2C.

It is to be noted that, in the first embodiment, though the end effector 102 has the shape shown in FIG. 2, the end effector 102 can be in any shape, e.g., a columnar object having a plane of rectangular, polygonal, or circular shape, or a spherical object.

The grip part 103 is structured to be quadrangular box-like, with a quadrangular bottom face part 103a, four quadrangular side face parts 103b standing upright from respective sides of the bottom face part 103a, and projecting parts 103c as an example of a coming-off prevention member projecting inwardly at the top face at the central part of each of the side face parts 103b. Inside the grip part 103, the bottom face part 103a and the four side face parts 103b form a box-shape having a concave space 103d. The concave space 103d forms a space where the end effector 102 can be arranged, with a prescribed clearance (space) 90. Hence, the clearance 90 can be secured between the bottom face part 103a, the four side face parts 103b, and the four projecting parts 103c relative to the corresponding opposing faces of the end effector 102.

Figure 3A:
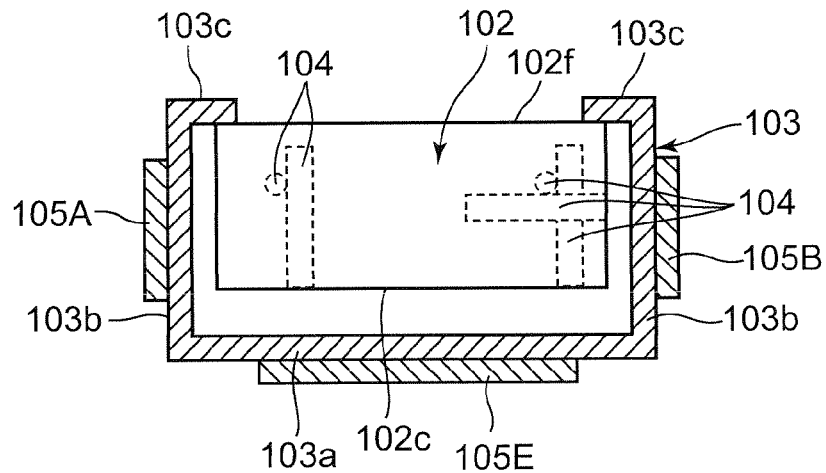
FIG. 3A is a cross-sectional view of the end effector, the grip part, the relative position sensors, and the contact sensors in the robot according to the first embodiment of the present disclosure when falling.

The projecting parts 103c are plate members provided at the position opposing to the bottom face part 103a of each of the side face parts 103b, and function as an example of the coming-off prevention member which prevents the end effector 102 arranged inside the concave space 103d from escaping from the box-like inner concave space 103d as shown in FIG. 3A.

The grip part 103 is structured to be separated from the end effector 102, and is structured by separate members from the end effector 102. It is to be noted that, though the grip part 103 has the shape shown in FIGS. 2A to 2C, it can be in any shape, e.g., a box-like object having a plane of rectangular, polygonal, or circular, or a spherical object.

Figure 2B:
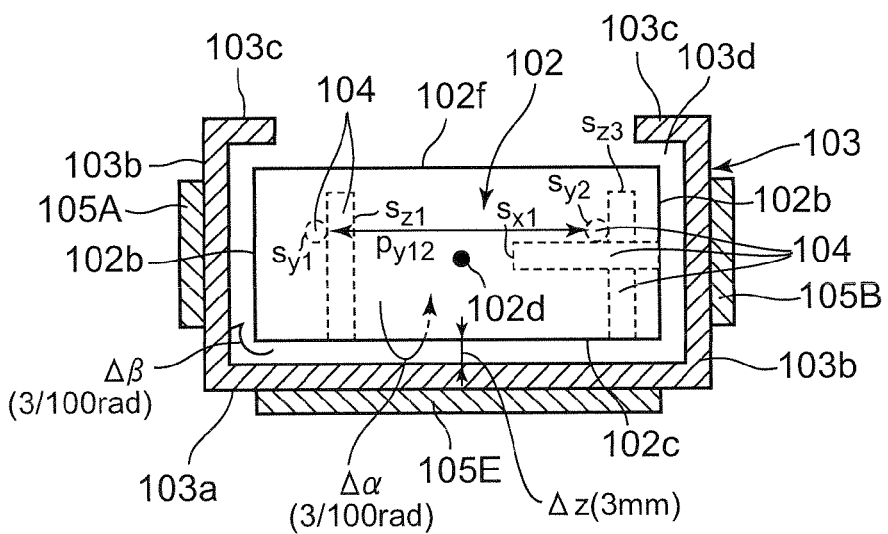
FIG. 2B is a cross-sectional view taken along line A-A in FIG. 2A showing the end effector, the grip part, the relative position sensors, and the contact sensors in the robot according to the first embodiment of the present disclosure.
Figure 2C:
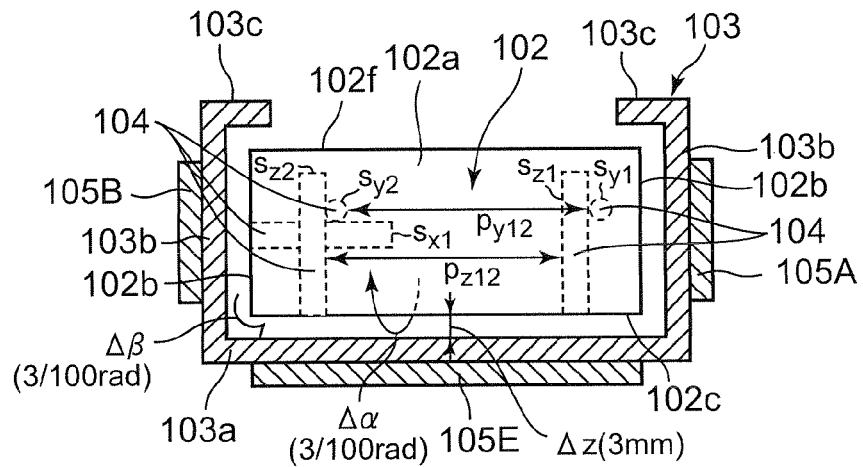
FIG. 2C is a cross-sectional view taken along line B-B in FIG. 2A showing the end effector, the grip part, the relative position sensors, and the contact sensors in the robot according to the first embodiment of the present disclosure.

With reference to FIGS. 2A to 2C, a description will be given of the respective spaces 90 (Δx to Δγ).

Here, it is defined such that the horizontal direction in FIG. 2A is the x-axis direction, the vertical direction is the y-axis direction, and the vertical direction in FIGS. 2B and 2C is the z-axis direction. Then, the width Δx of the clearance 90 in the x-axis direction represents the interval of the clearance in the x-axis direction between the side face part 102b of the end effector 102 and the side face part 103b of the grip part 103 each arranged along the y-axis direction which is perpendicular to the x-axis direction. The width Δy of clearance 90 in the y-axis direction represents the interval of the clearance in the y-axis direction between the front face part 102a or the back face part 102e of the end effector 102 and the side face part 103b of the grip part 103 each arranged along the x-axis direction. The width Δz of the clearance 90 in the z-axis direction represents the interval of the clearance in the z-axis direction between the bottom face part 102c of the end effector 102 and the bottom face part 103a of the grip part 103 each arranged along the direction perpendicular to the z-axis direction. The width Δα of the clearance 90 in the α direction represents the interval of the clearance in the rotary direction α about x-axis between the bottom face part 102c of the end effector 102 and the bottom face part 103a of the grip part 103. The width Δβ of the clearance 90 in the β direction represents the interval of the clearance in the rotary direction β about y-axis between the bottom face part 102c of the end effector 102 and the bottom face part 103a of the grip part 103. The width Δγ of the clearance 90 in the γ direction represents the interval of the clearance in the rotary direction γ about z-axis between the front face part 102a of the end effector 102 and the side face part 103b of the grip part 103.

Here, with reference to FIGS. 2A to 2C, the axes (x to γ) will be described. The x-axis is the axis extending perpendicularly from the central part 102d of the end effector 102 to the side face part 102b, and the right direction in FIG. 2A is defined as +. The y-axis is the axis extending perpendicularly from the central part 102d of the end effector 102 to the front face part 102a or the back face part 102e, and the top direction in FIG. 2A is defined as +. The z-axis is the axis extending perpendicularly from the central part 102d of the end effector 102 to the bottom face part 102c, and the top direction in FIG. 2B is defined as +. The rotation α about x-axis applies the right-hand rule to x-axis. The rotation β about y-axis applies the right-hand rule to y-axis. The rotation γ about z-axis applies the right-hand rule to z-axis.

The intervals (gaps) Δx, Δy, and Δz of the clearance 90 between the end effector 102 and the grip part 103 in the states shown in FIGS. 2A to 2C are each 3 mm as a specific example. By the clearance, the grip part 103 can be moved in the x-axis direction, the y-axis direction, or the z-axis direction. Accordingly, in the states of FIGS. 2A to 2C, the movable range of the grip part 103 (the range as being separated from the end effector 102) is ±3 mm to x-, y-, and z-axes. Further, the movable range (Δα, Δβ, Δγ) of the grip part 103 is ±3/100 radian to each of α-, β-, and γ directions, as an example. Similarly to the end effector 102, the grip part 103 can be in any shape.

Figure 3B:
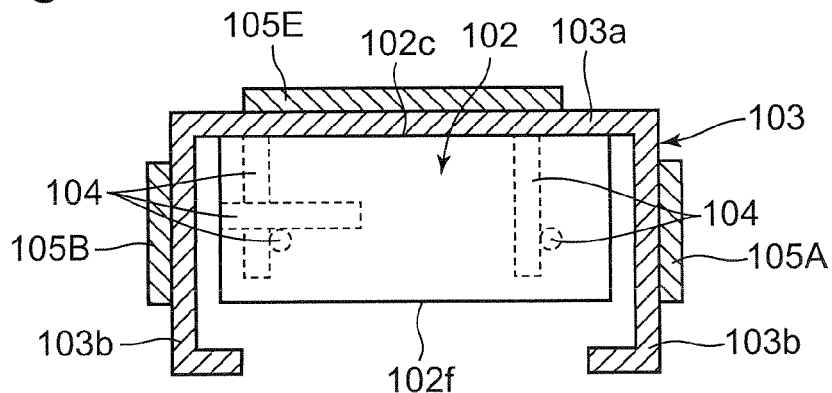
FIG. 3B is a cross-sectional view of the end effector, the grip part, the relative position sensors, and the contact sensors in the robot according to the first embodiment of the present disclosure when falling.
Figure 3C:
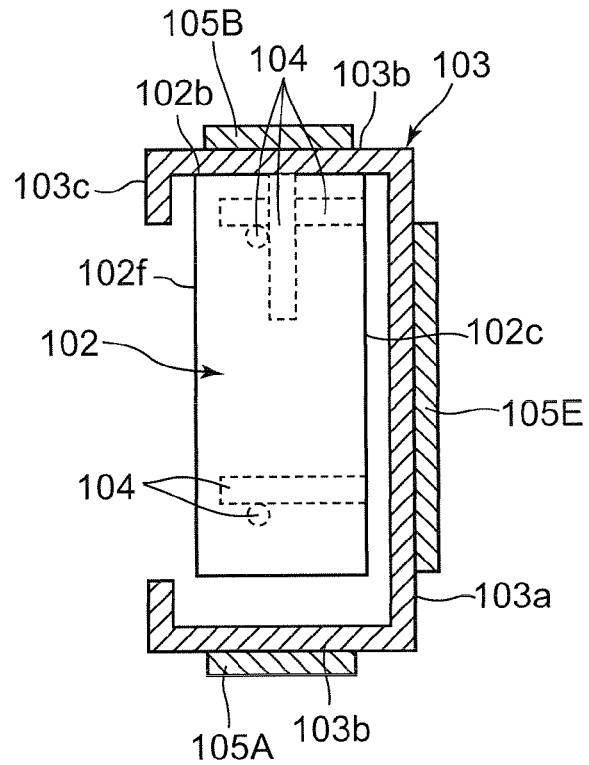
FIG. 3C is a cross-sectional view of the end effector, the grip part, the relative position sensors, and the contact sensors in the robot according to the first embodiment of the present disclosure when falling.
Figure 3D:
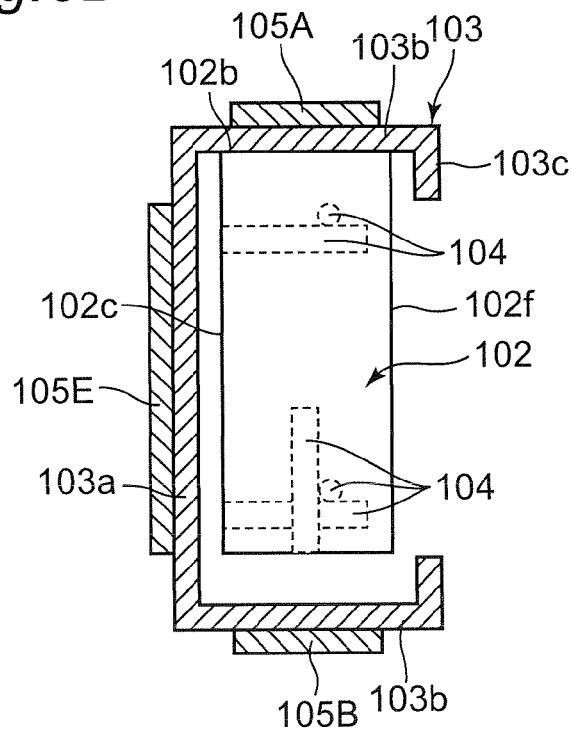
FIG. 3D is a cross-sectional view of the end effector, the grip part, the relative position sensors, and the contact sensors in the robot according to the first embodiment of the present disclosure when falling.
Figure 3E:
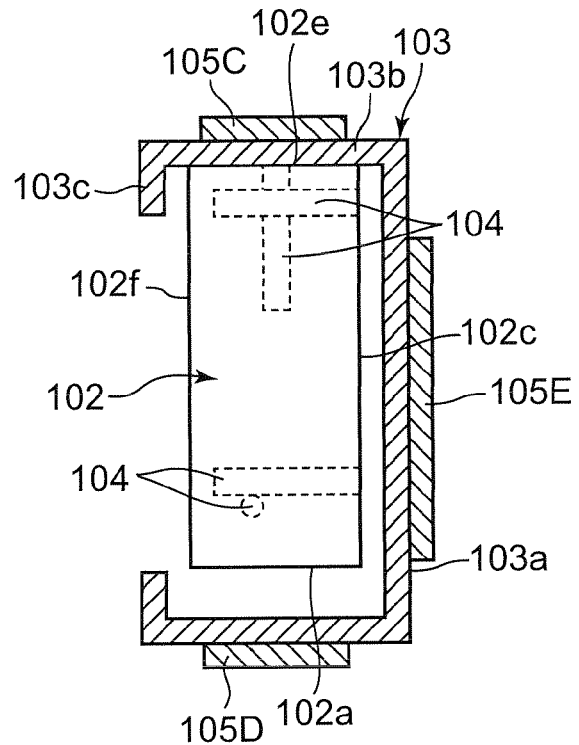
FIG. 3E is a cross-sectional view of the end effector, the grip part, the relative position sensors, and the contact sensors in the robot according to the first embodiment of the present disclosure when falling.
Figure 3F:
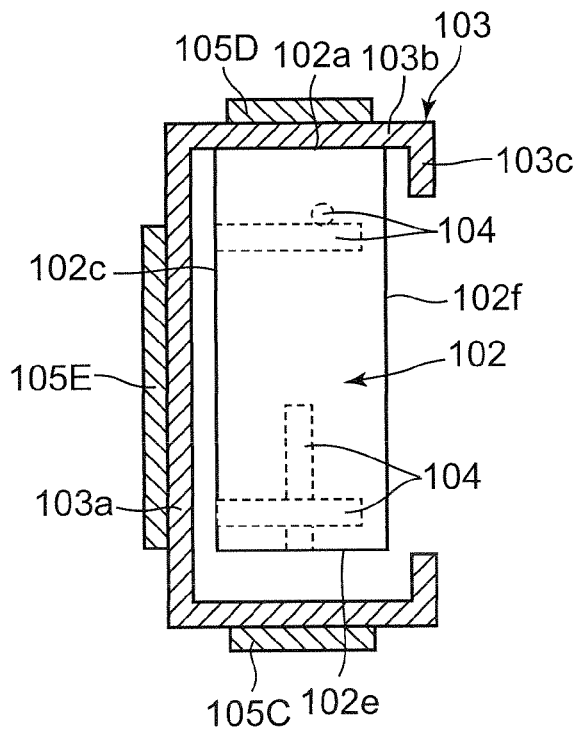
FIG. 3F is a cross-sectional view of the end effector, the grip part, the relative position sensors, and the contact sensors in the robot according to the first embodiment of the present disclosure when falling.
Figure 3G:
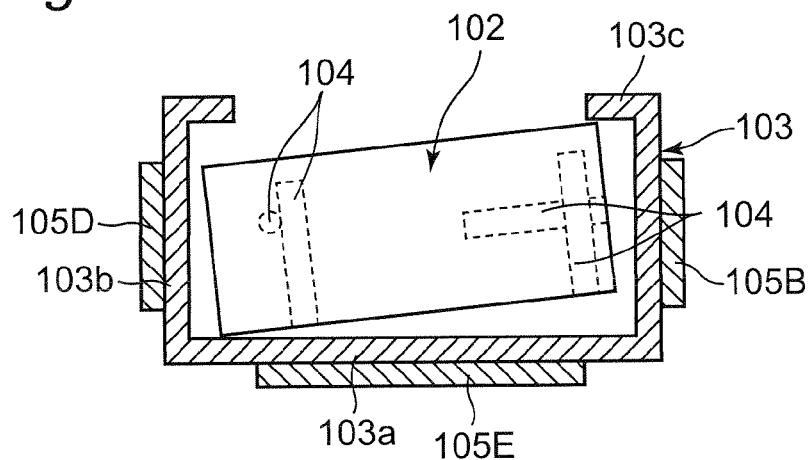
FIG. 3G is a cross-sectional view of the end effector, the grip part, the relative position sensors, and the contact sensors in the robot according to the first embodiment of the present disclosure when falling.
Figure 3H:
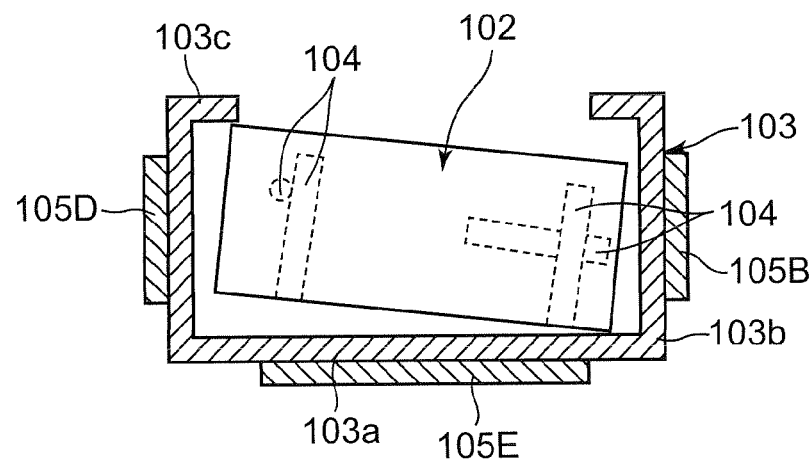
FIG. 3H is a cross-sectional view of the end effector, the grip part, the relative position sensors, and the contact sensors in the robot according to the first embodiment of the present disclosure when falling.
Figure 3I:
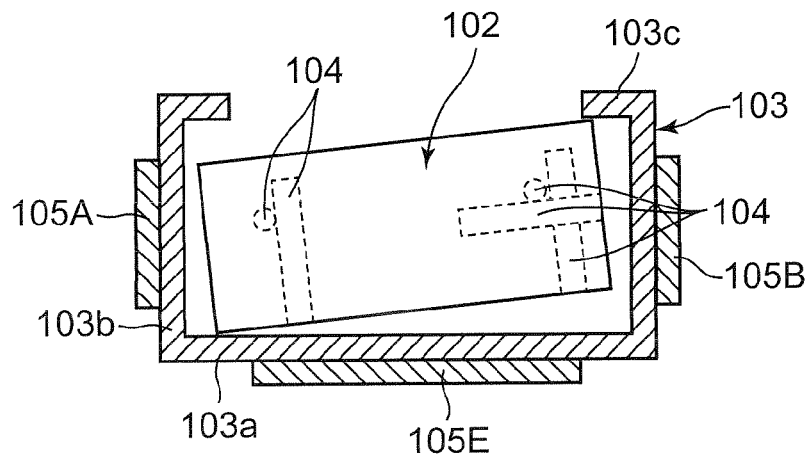
FIG. 3I is a cross-sectional view of the end effector, the grip part, the relative position sensors, and the contact sensors in the robot according to the first embodiment of the present disclosure when falling.
Figure 3J:
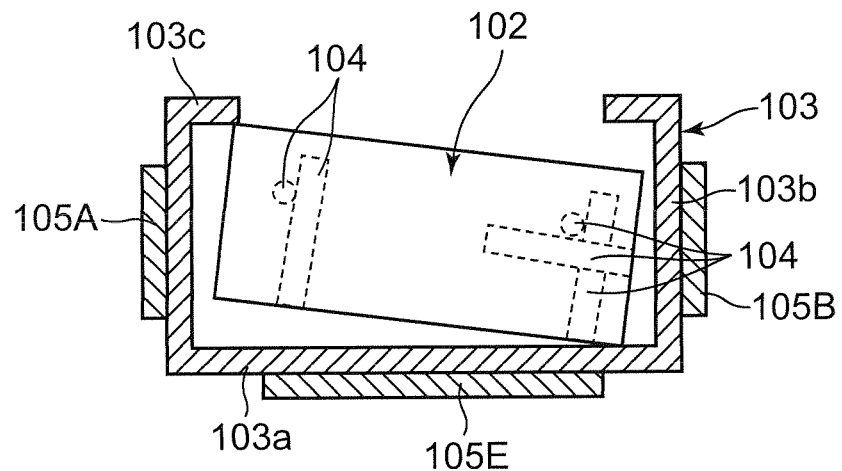
FIG. 3J is a cross-sectional view of the end effector, the grip part, the relative position sensors, and the contact sensors in the robot according to the first embodiment of the present disclosure when falling.

Further, in order to prevent the grip part 103 from coming off from the end effector 102 even when the grip part 103 is not gripped by the user, as shown in FIGS. 2A to 2C, the four projecting parts 103c of the grip part 103 are shaped to surround or hook the end effector 103. Therefore, whichever direction the grip part 103 is oriented, the grip part 103 will not come off from the end effector 102 (see FIGS. 3A to 3F). That is, FIG. 3A shows the state where the four projecting parts 103c are brought into contact with the top face 102f of the end effector 102 to prevent the grip part 103 from coming off in the case where the grip part 103 has shifted to the bottommost position relative to the end effector 102. FIG. 3B shows the state where the positional relationship of the grip part 103 and the end effector 102 is inverted from the state shown in FIG. 3A, and the bottom face part 103a of the grip part 103 is brought into contact with the bottom face part 102c of the end effector 102. FIG. 3C is the state where the positional relationship of the grip part 103 and the end effector 102 is rotated by 90 degrees in the clockwise direction from the state shown in FIG. 3A, and shows the state where the side face part 103b of the grip part 103 is brought into contact with the side face part 102b of the end effector 102. FIG. 3D is the state where the positional relationship between the grip part 103 and the end effector 102 is rotated by 90 degrees in the counterclockwise direction from the state shown in FIG. 3A, and shows the state where the side face part 103b of the grip part 103 is brought into contact with the side face part 102b of the end effector 102. FIG. 3E is the state where the positional relationship of the grip part 103 and the end effector 102 is rotated by 90 degrees in the top direction about the right-left axial direction from the state shown in FIG. 3C, and shows the state where the side face part 103b of the grip part 103 is brought into contact with the back face part 102e of the end effector 102. FIG. 3F is the state where the positional relationship of the grip part 103 and the end effector 102 is rotated by 90 degrees, reversely to the manner shown in FIG. 3E, in the top direction about the right-left axial direction from the state shown in FIG. 3C, and shows the state where the side face part 103b of the grip part 103 is brought into contact with the front face part 102a of the end effector 102.

Figure 3K:
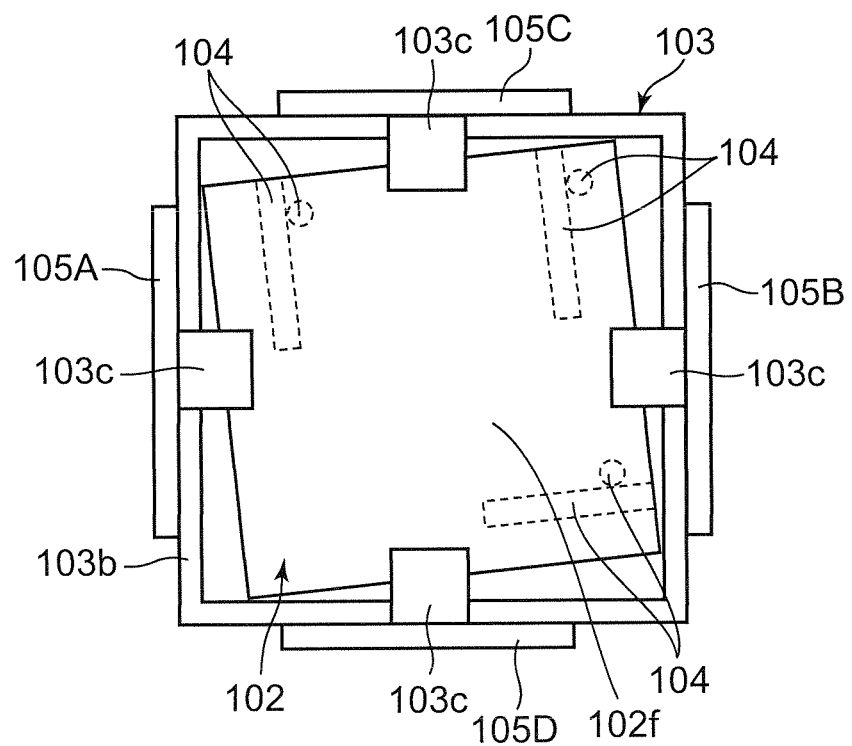
FIG. 3K is a plan view of the end effector, the grip part, the relative position sensors, and the contact sensors in the robot according to the first embodiment of the present disclosure when falling.
Figure 3L:
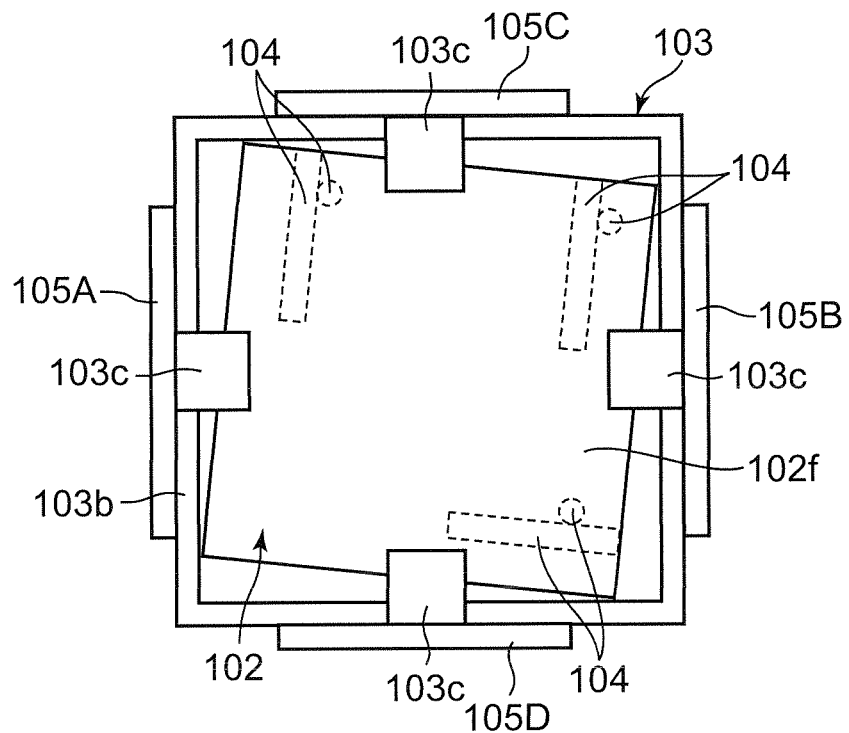
FIG. 3L is a plan view of the end effector, the grip part, the relative position sensors, and the contact sensors in the robot according to the first embodiment of the present disclosure when falling.

Further, similarly, the grip part 103 is structured so as not to come off from the end effector 102 whichever direction the end effector 102 rotates (see FIGS. 3G to 3L). That is, FIGS. 3G to 3J show the state where, even when any of the side face part 102b and the front face part 102a (the back face part 102e) of the end effector 102 rotates in the clockwise direction or counterclockwise direction in FIGS. 3G to 3J, the right-side corner part or the left-side corner part is brought into contact with the projecting parts 103c of the grip part 103, and the grip part 103 will not come off from the end effector 102. FIGS. 3K to 3L show the state where, even when the top face 102f of the end effector 102 rotates in the clockwise direction or the counterclockwise direction in FIGS. 3K to 3L, the rotation of the corner part of the end effector 102 is restricted by the corner part being brought into contact with the side face part 103b of the grip part 103 to rotates little, and a part of each side of the end effector 102 is brought into contact with the projecting parts 103c of the grip part 103, whereby the grip part 103 does not come off from the end effector 102.

Figure 4A:
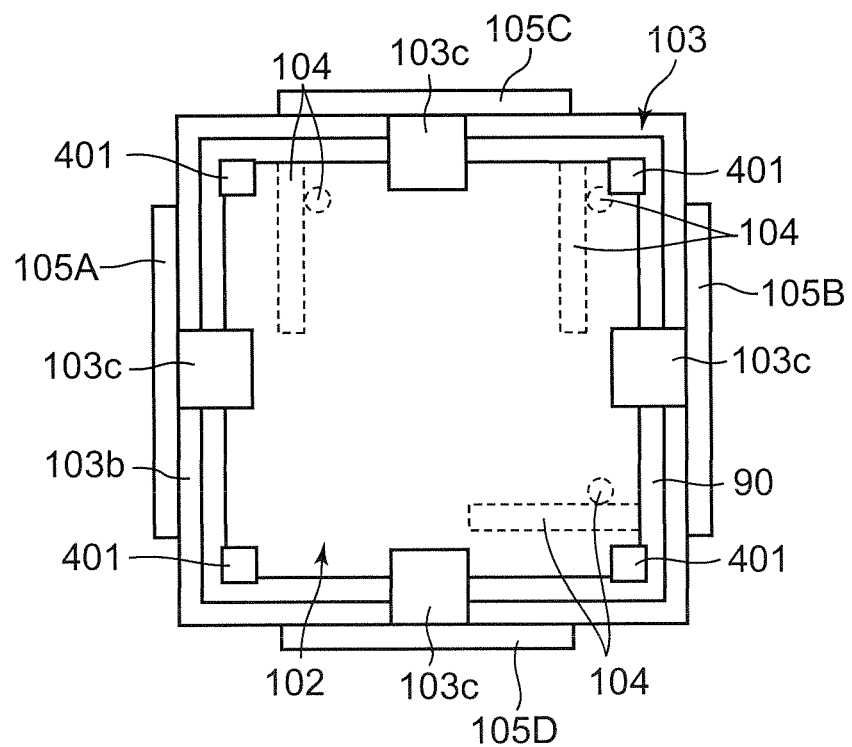
FIG. 4A is a plan view of the end effector, the grip part, the relative position sensors, the contact sensors, and buffer members in the robot according to the first embodiment of the present disclosure.
Figure 4B:
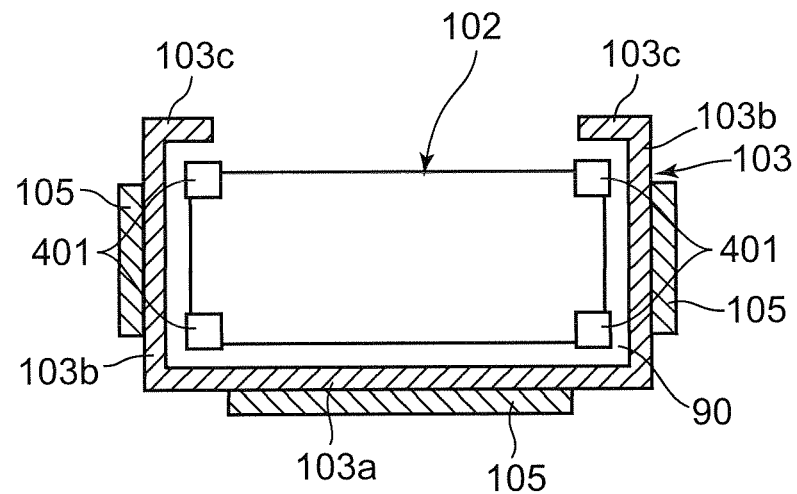
FIG. 4B is a side view of the end effector, the grip part, the contact sensors, and the buffer members in the robot according to the first embodiment of the present disclosure.
Figure 4C:
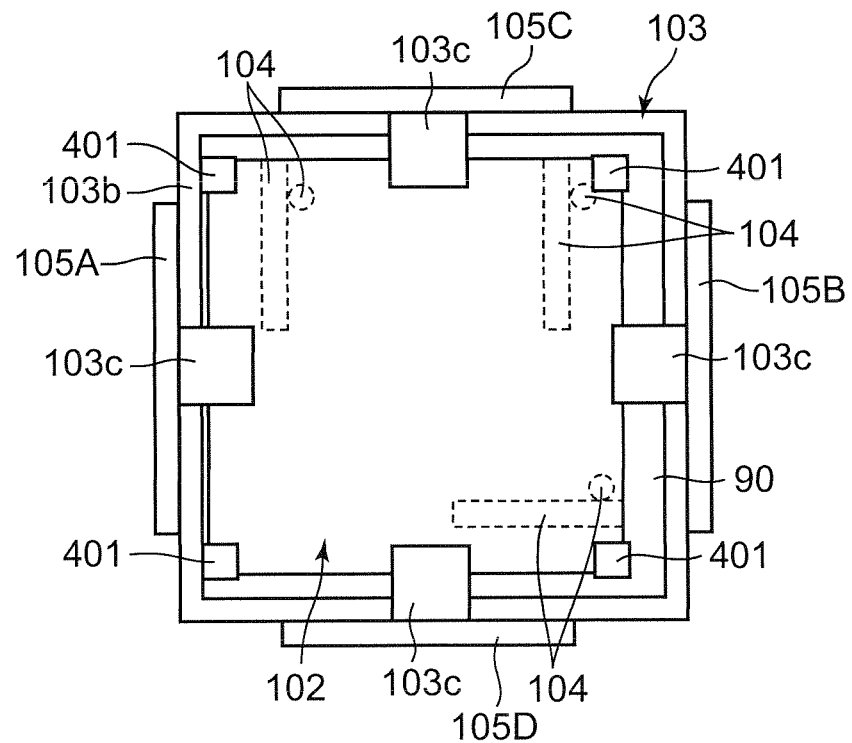
FIG. 4C is a plan view of the end effector, the grip part, the relative position sensors, the contact sensors, and the buffer members in the robot according to the first embodiment of the present disclosure when being brought into contact.
Figure 4D:
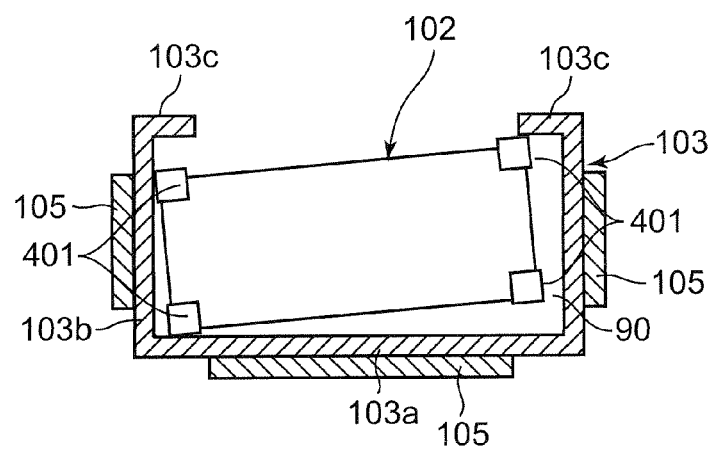
FIG. 4D is a side view of the end effector, the grip part, the contact sensors, and the buffer members in the robot according to the first embodiment of the present disclosure when being brought into contact.

It is to be noted that, it is also possible to attach buffer members 401 to the end effector 102 so as to alleviate the shock caused by the contact between the end effector 102 and the grip part 103 (see FIGS. 4A and 4B). As shown in FIGS. 4A and 43, even when the buffer members 401 are attached to the top, bottom, right, and left corner portions of the end effector 102, the values of the clearances (Δx to Δγ) defined in FIGS. 2A to 2C do not change. FIGS. 4C and 4D show the state where the buffer members 401 are brought into contact with the grip part 103. It can be seen that, from FIGS. 4C and 4D, by attaching the buffer members 401 to the end effector 102, only the buffer members 401 are in contact with the grip part 103, and the end effector 102 and the grip part 103 are not directly in contact with each other.

Figure 5:
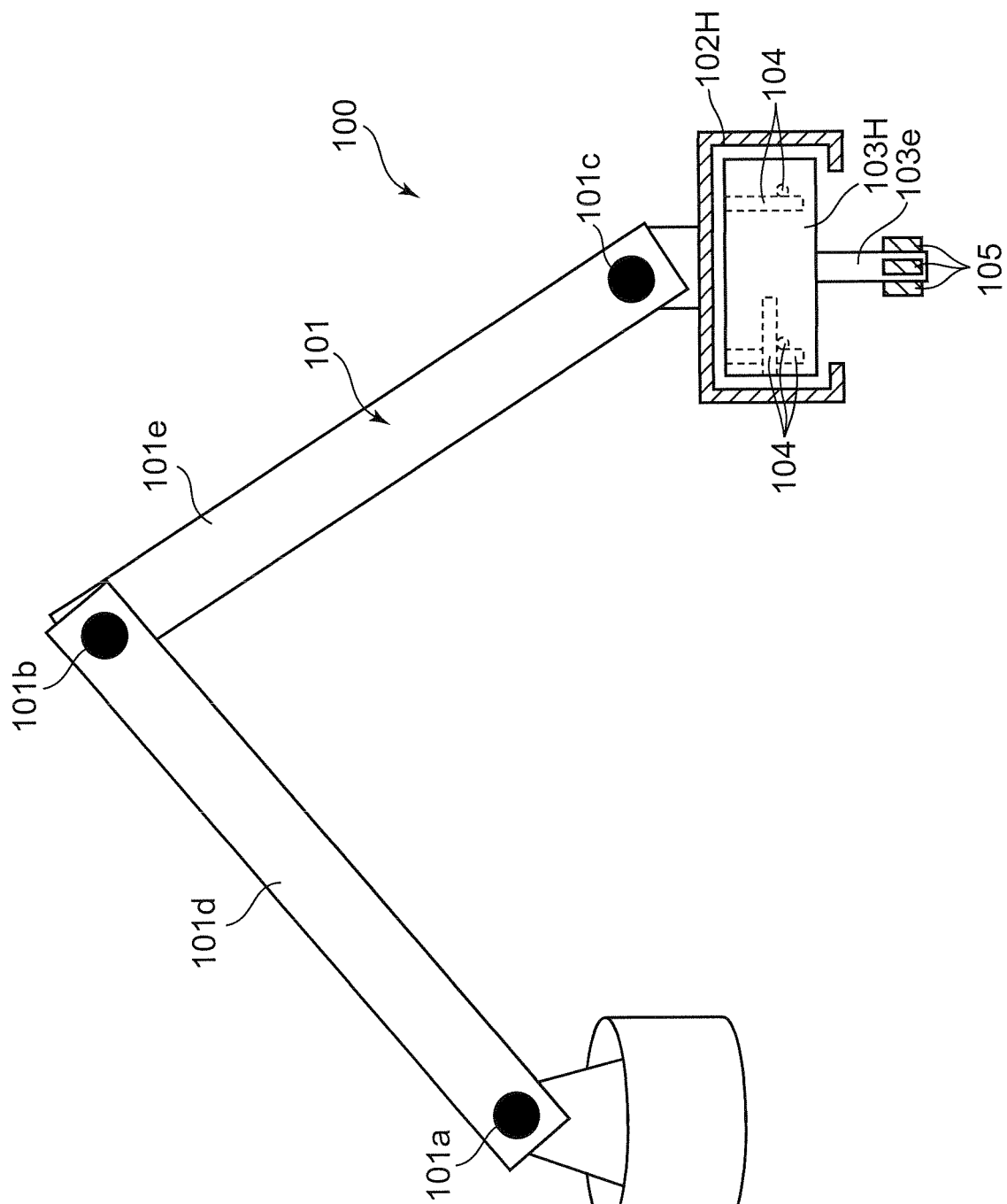
FIG. 5 is a configuration view of the end effector, the grip part, the relative position sensors, and the contact sensors in the robot according to the first embodiment of the present disclosure being different from FIG. 1.

It is to be noted that, as shown in FIG. 5, it is possible to employ the structure in which the position of the end effector 102 and that of the grip part 103 are replaced by each other. That is, it is also possible to arrange a rectangular parallelepiped-like grip part 103H having a square plane in the space in a quadrangular box-like end effector 102H with a clearance as great as the clearance described above. In this case, for the user to easily grip the grip part 103H, a knob member 103e must be attached to the bottom face part of the grip part 103H. In FIG. 5, though the contact sensors 105 are attached to four places around the knob member 103e as one example, the arrangement is not limited thereto.

The relative position sensors 104 are each the sensor detecting the relative position Δr of the grip part 103 to the end effector 102. Here, the Δr generally refers to the Δx to the Δγ.

Here, the relative position Δr is represented by the following Equation (1), and each relative position is as shown in FIGS. 2A to 2C.

$$\Delta r = \begin{bmatrix} \Delta x \\ \Delta y \\ \Delta z \\ \Delta \alpha \\ \Delta \beta \\ \Delta \gamma \end{bmatrix} \qquad \text{Equation (1)}$$

As shown in FIGS. 2A to 2C, the relative position sensors 104 are stored in the end effector 102, and specifically, gap sensors are used. That is, in the proximity of the front face part 102a of the end effector 102, a rod-like gap sensor $s_{x1}$ is arranged in parallel to the front face part 102a and along the x-axis direction, while one end of the gap sensor $s_{x1}$ is exposed at the side face part 102b of the end effector 102, to measure the width Δx of the clearance 90 in the x-axis direction. In the proximity of the side face part 102b of the end effector 102, a rod-like gap sensor $s_{z3}$ is arranged in parallel to the side face part 102b and along the z-axis direction, while one end of the gap sensor $s_{z3}$ is exposed at the bottom face part 102c of the end effector 102, to measure the width Δz of the clearance 90 in the z-axis direction. In the proximity of the back face part 102e of the end effector 102, a pair of rod-like gap sensors $s_{y1}$ and $s_{y2}$ is arranged in parallel to the side face part 102b and along the y-axis direction, while the one ends of a pair of gap sensors $s_{y1}$ and $s_{y2}$ are exposed at the back face part 102e of the end effector 102, to measure the width Δy of the clearance 90 in the y-axis direction. In the proximity of the back face part 102e of the end effector 102, a pair of rod-like gap sensors $s_{z2}$ and $s_{z3}$ is arranged in parallel to the side face part 102b and along the z-axis direction, while the one ends of the gap sensors $s_{z2}$ and $s_{z3}$ are exposed at the bottom face part 102c of the end effector 102, to measure the width Δz of the clearance 90 in the z-axis direction.

Hence, the width Δy of the clearance 90 in the y-axis direction is obtained by calculating the average of at least two measured values $y_1$ and $y_2$ measured by the two gap sensors $s_{y1}$ and $s_{y2}$, by the relative position information acquiring unit 607, which will be described later. The width Δz of the clearance 90 in the z-axis direction is obtained by calculating the average of at least three measured values $z_1$, $z_2$, and $z_3$ measured by the three gap sensors $s_{z1}$, $s_{z2}$, and $s_{z3}$, by the relative position information acquiring unit 607, which will be described later. It is to be noted that, as the width Δx of the clearance 90 in the x-axis direction, at least one measured value $x_1$ measured by one gap sensor $s_x$ is employed as it is. Alternatively, measurement may be performed by one gap sensor $s_x$ for a plurality of times, and the average value thereof may be calculated by the relative position information acquiring unit 607, which will be described later, and employed. Similarly, the width Δy and the width Δz may also be measured for a plurality of times by their respective gap sensors, and using the average values, i.e., $y_1$, $y_2$, $z_1$, $z_2$, and $z_3$, the average value described above may be calculated and employed. Hence, the result obtained by calculating the measured values $x_1$, $y_1$, $y_2$, $z_1$, $z_2$, and $z_3$ is the width Δx to Δγ.

However, as the method of detecting the relative position Δr of the grip part 103 to the end effector 102, in place of detection using the gap sensors, other method can be employed, such as: acquiring an image of the grip part 103 relative to the end effector 102 with a camera; and detecting the relative position Δr.

Here, a description will be given of the method using six gap sensors shown in FIGS. 2A to 2C. The six gap sensors $s_{x1}$, $s_{y1}$, $s_{y2}$, $s_{z1}$, $s_{z2}$, and $s_{z3}$ are arranged as shown in FIGS. 2A to 2C, and the clearance g for each of x-, y-, and z-axes between the end effector 102 and the grip part 103 is measured (the method of deriving the relative position Δr from the measured values (measurement values) g of the gap sensors $s_{x1}$, $S_{y1}$, $s_{y2}$, $s_{z1}$, $s_{z2}$, and $s_{z3}$ will be described later). It is to be noted that, the clearance g generally refers to the measured values $x_1$, $y_1$, $y_2$, $z_1$, $z_2$, and $z_3$ of the gap sensors $s_{x1}$, $s_{y1}$, $s_{y2}$, $s_{z1}$, $s_{z2}$, and $s_{z3}$, respectively. Here, the clearance g is represented by the following Equation (2), which represents the measured values $x_1$, $y_1$, $y_2$, $z_1$, $z_2$, and $z_3$ of respective gap sensors $s_{x1}$, $S_{y1}$, $S_{y2}$, $s_{z1}$, $s_{z2}$, and $s_{z3}$, and the clearance g is as shown in FIGS. 2A to 2C. It is to be noted that, the rotary direction is not represented only by the measured values $x_1$, $y_1$, $y_2$, $z_1$, $z_2$, and $z_3$. Accordingly, the result of obtaining the translational direction and the rotary direction using the measured values $x_1$, $y_1$, $y_2$, $z_1$, $z_2$, and $z_3$ is Δx to Δγ. Hence, the measured values $x_1$, $y_1$, $y_2$, $z_1$, $z_2$, and $z_3$ merely represent the measured values of the gap sensors $s_{x1}$, $s_{y1}$, $s_{y2}$, $s_{z1}$, $s_{z2}$, and $s_{z3}$. On the other hand, Δx to Δγ are derived as a result of calculating the relative position in the translational direction and the rotary direction using the measured values.

$$g = \begin{bmatrix} x_1 \\ y_1 \\ y_2 \\ z_1 \\ z_2 \\ z_3 \end{bmatrix} \qquad \text{Equation (2)}$$

Further, as shown in FIGS. 2A to 2C, it is defined that the interval $Py_{12}$ between the gap sensors $s_{y1}$ and $s_{y2}$ in the y-axis direction, the interval $Pz_{12}$ between the gap sensors $s_{z1}$ and $s_{z2}$ in the z-axis direction, and the interval $Pz_{23}$ between the gap sensors $s_{z2}$ and $s_{z3}$ in the z-axis direction are each 100 mm.

The contact sensors 105 are attached to the outer faces of four side face parts 103b and to the outer face of the bottom face part 103a on the outer side of the grip part 103, to detect whether the grip part 103 is in contact with any external object. The output of each contact sensor 105 is a digital signal, and each contact sensor 105 outputs "1" when "in contact", and outputs "0" when "out of contact". The detected output of the contact sensor 105 is output to the input/output IF 608. As shown in FIGS. 2A to 2C, the contact sensors 105 are attached at the five places, i.e., 105A to 105E. That is, the contact sensors 105A to 105D are attached to the outer faces of four side face parts 103b, and the contact sensor 105E is attached to the outer face of the bottom face part 103a. It is to be noted that, while the contact sensors 105 are arranged herein as shown in FIGS. 2A and 2B, any arrangement place or number of pieces of the contact sensors 105 can be selected so long as the contact information between the grip part 103 and any other object is acquired.

Figure 6:
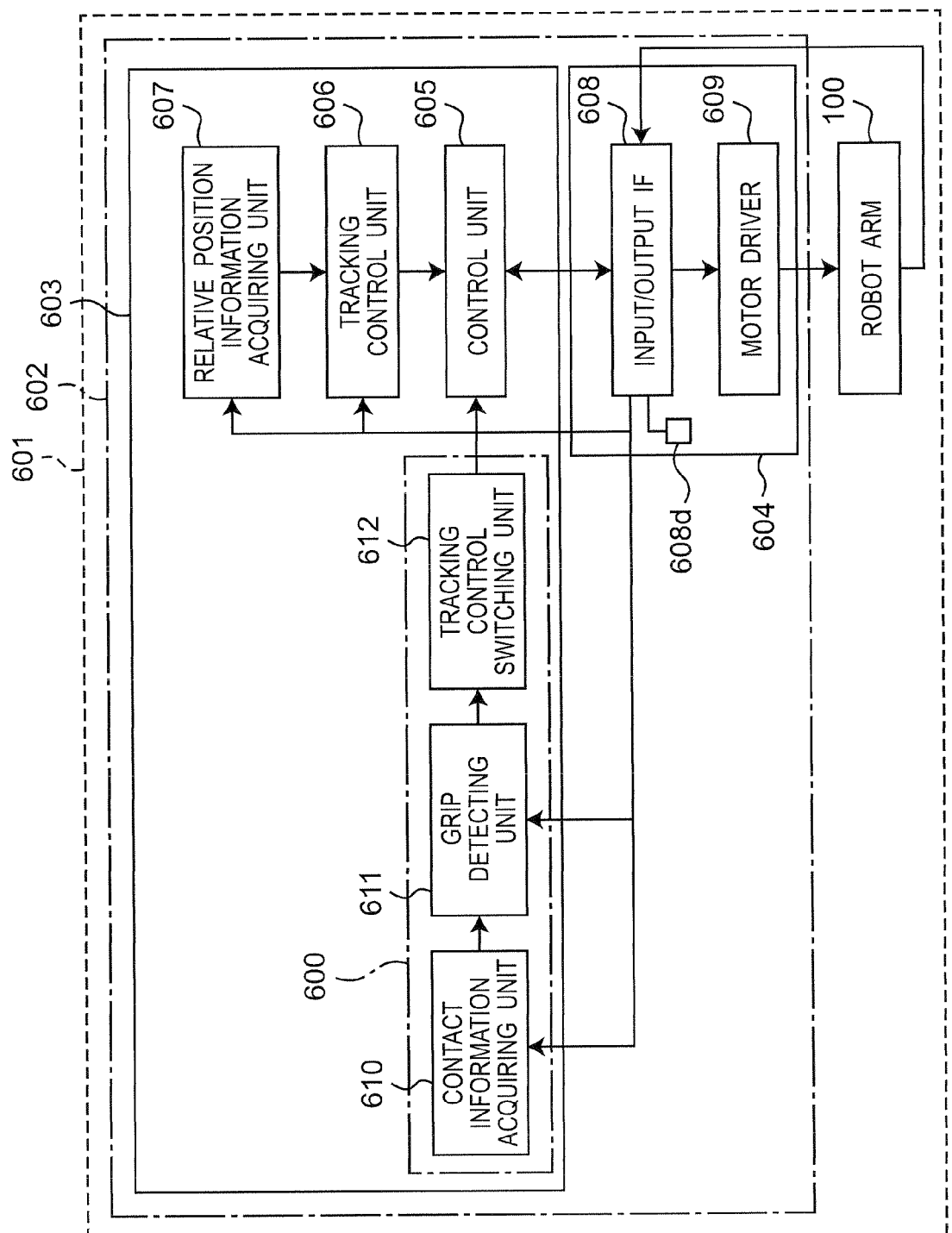
FIG. 6 is a block diagram of the robot arm in the robot according to the first embodiment of the present disclosure.

FIG. 6 is a block diagram of the robot arm 100 in the robot according to the first embodiment of the present disclosure. In FIG. 4, the robot arm 100 is structured by the manipulator 101 and the control device 602 for the robot arm 100.

The control device 602 for the robot arm 100 is structured by a control device body unit 603 and a peripheral device 604. The control device body unit 603 is structured with a control unit 605, a tracking control unit 606, a relative position information acquiring unit 607, and a tracking control switch control unit 600 (a contact information acquiring unit 610, a grip detecting unit 611, and a tracking control switching unit 612). The peripheral device 604 is structured by the input/output IF 608 and a motor driver 609. The input/output IF 608 includes an ON/OFF switch for a control operation exerted by the control device 602. The tracking control switch control unit 600 includes a contact information acquiring unit 610, a grip detecting unit 611, and a tracking control switching unit 612. The tracking control switch control unit 600 outputs tracking control information to switch the tracking control such that the tracking control unit 606 exerts tracking control when the grip part 103 is in contact with any other object, and the tracking control unit 606 does not exert tracking control when the grip part 103 is not in contact with any other object. Their respective functions will be described in the following.

The relative position information acquiring unit 607 obtains relative position $\Delta r$ of the grip part 103 to the end effector 102 based on the measured value g of each of the gap sensors $s_{x1}$, $s_{y1}$, $s_{y2}$, $s_{y1}$, $s_{y2}$, and $s_{z3}$ acquired from the input/output IF 608. The relative position information being the obtained relative position $\Delta r$ is output from the relative position information acquiring unit 607 to the tracking control unit 606. Here, the interval between the gap sensors $s_{y1}$ and $s_{y2}$, the interval between the gap sensors $s_{z1}$ and $s_{z2}$, and the interval between the gap sensors $s_{z2}$ and $s_{z3}$ are each defined as p; the measured values of the gap sensors $s_{x1}$, $s_{y1}$, $s_{y2}$, $s_{z1}$, $s_{z2}$, and $s_{z3}$ are respectively defined as $x_1$, $y_1$, $y_2$, $z_1$, $z_2$, and $z_3$; and the relative position of the grip part 103 to the end effector 102 is defined as $\Delta r$. Then, $\Delta r$ is obtained by the relative position information acquiring unit 607 from the following Equation (3).

$$\Delta r = \begin{bmatrix} \Delta x \\ \Delta y \\ \Delta z \\ \Delta \alpha \\ \Delta \beta \\ \Delta \gamma \end{bmatrix}$$

$$= \begin{bmatrix} 1 & 0 & 0 & 0 & 0 & 0 \\ 0 & 1/2 & 1/2 & 0 & 0 & 0 \\ 0 & 0 & 0 & 1/3 & 1/3 & 1/3 \\ 0 & 0 & 0 & 1/2p & 1/2p & -1/p \\ 0 & 0 & 0 & 1/p & -1/2p & -1/2p \\ 0 & 1/p & -1/p & 0 & 0 & 0 \end{bmatrix} \begin{bmatrix} x_1 \\ y_1 \\ y_2 \\ z_1 \\ z_2 \\ z_3 \end{bmatrix}$$

Equation (3)

The tracking control unit 606 obtains, from the relative position information of the grip part 103 to the end effector 102 acquired from the relative position information acquiring unit 607, the shift amount with which the relative position information falls within the prescribed threshold value range. The obtained shift amount information is output from the tracking control unit 606 to the control unit 605. The prescribed threshold value range is defined as follows: when the interval between the gap sensors $s_{y1}$ and $s_{y2}$; the interval between the gap sensor $s_{z1}$ and $s_{z2}$; and the interval between the gap sensors $s_{z2}$ and $s_{z3}$ are each p, this is multiplied by a constant (e.g., 0.1). Then, the prescribed threshold value range is ($-0.1$ p to 0.1 p).

Further, the manner of obtaining the shift amount by the tracking control unit 606 is described as follows. Defining the relative position of the grip part 103 to the end effector 102 as $\Delta r$ (see Equation (3)); the target value of the relative position as $\Delta r_d$; and the obtained shift amount as y, the shift amount y is obtained by the tracking control unit 606 by the following Equation (4) (where k is a constant (e.g., 1.0)). However, when the relative position $\Delta r$ of the grip part 103 to the end effector 102 falls within the threshold value, the shift amount y is defined as 0. The value of constant k is determined by the value input from the input/output IF 608 by the user using an input device 608d such as a keyboard, a mouse, or a touch panel.

$$y = k(\Delta r_d - \Delta r)$$

Equation (4)

Note that the target value $\Delta r_d$ of the relative position is expressed by the following Equation (5). When the value g of the gap sensor is 3 mm, the target value is defined as $\Delta r_d = 0$. Here, the target value $\Delta r_d$ of the relative position is 0. Further, a description will be given of $\Delta x_d$, $\Delta y_d$, $\Delta z_d$, $\Delta \alpha_d$, $\Delta \beta_d$, and $\Delta \gamma_d$ used in Equation (4). $\Delta x_d$ is the target value of the relative position $\Delta x$ in the parallel shifting direction to x-axis in FIG. 2A. $\Delta y_d$ is the target value of the relative position $\Delta y$ in the parallel shifting direction to y-axis in FIG. 2A. $\Delta z_d$ is the target value of the relative position $\Delta z$ in the parallel shifting direction to z-axis in FIG. 2A. $\Delta \alpha_d$ is the target value of the relative position $\Delta \alpha$ in the rotary direction to x-axis in FIG. 2A. $\Delta \beta_d$ is the target value of the relative position $\Delta \beta$ in the rotary direction to y-axis in FIG. 2A. $\Delta \gamma_d$ is the target value of the relative position $\Delta \gamma$ in the rotary direction to z-axis in FIG. 2A. When the target value $\Delta r_d$ of the relative position is 0, the values of $\Delta x_d$, $\Delta y_d$, $\Delta z_d$, $\Delta \alpha_d$, $\Delta \beta_d$, and $\Delta \gamma d$ are each 0.

$$\Delta r_d = \begin{bmatrix} \Delta x_d \\ \Delta y_d \\ \Delta z_d \\ \Delta \alpha_d \\ \Delta \beta_d \\ \Delta \gamma_d \end{bmatrix}$$

Equation (5)

The contact information acquiring unit 610 receives, from the input/output IF 608, the measurement values of the contact sensors 105 (105A to 105E) and the time information from the timer installed in the input/output IF 608, to acquire information as to whether the grip part 103 is in contact with any other object (contact information). The contact information acquiring unit 610 regards the input measurement values of the contact sensors 105 as the contact information, and outputs the contact information from the contact information acquiring unit 610 to the grip detecting unit 611. As shown in FIG. 7, the contact information is the information as to whether or not the contact sensors 105A to 105E are in contact with any other object. In FIG. 7, "1" represents "in contact", and "0" represents "out of contact".

The grip detecting unit 611 receives, from the contact information acquiring unit 610, the contact information. Similarly, the grip detecting unit 611 receives, from the input/output IF 608, the time information from the timer installed in the input/output IF 608. The grip detecting unit 611 functions as a gripping determination unit which detects (determines) whether the user is gripping the grip part 103 based on the contact information from the contact information acquiring unit 610, and outputs the grip information represented by "gripping" or "not gripping" to the tracking control switching unit 612. Here, as the grip information, "1" is output from the grip detecting unit 611 to the tracking control switching unit 612 when "gripping", and "0" is output from the grip detecting unit 611 to the tracking control switching unit 612 when "not gripping".

As to the grip information, when gripping by the user is detected by the grip detecting unit 611, the following two grip detection conditions are satisfied (when the grip detecting unit 611 detects as "gripping").

The first grip detection condition is that, the two opposing contact sensors 105 (the contact sensor 105A and the contact sensor 105B, or the contact sensor 105C and the contact sensor 105D) are both "in contact" (output: 1). This is because, as shown in FIG. 8, when the grip part 103 is gripped by the user's hand 801, the thumb 801c, for example, of the user's hand 801 is in contact with the contact sensor 105A on the bottom plane side of the grip part 103, and the forefinger 801b is in contact with the contact sensor 105B on the top face side of the grip part 103, to grip the grip part 103 between the thumb 801c and the forefinger 801b. Thus, it becomes possible to prevent the grip detecting unit 611 from erroneously detecting that the user is gripping the grip part 103, when only one face of the grip part 103 is in contact with the ground, or when only one face of the grip part 103 is in contact with any other object. This is because, when only one contact sensor 105 is "in contact" and the other contact sensor 105 is "out of contact", the grip detecting unit 611 does not detects that the user is gripping the grip part 103.

The second grip detection condition is that the two contact sensors 105 are "in contact" (i.e., the output from the contact sensor 105 is "1") for a prescribed time (e.g., continuously two seconds or more). This is to prevent the grip detecting unit 611 from erroneously detect that the user is gripping the grip part 103, in the case where the user doesn't have an intention to grip the grip part 103, but the user hits the grip part 103 with the user's hand 801 or any other object.

Figure 9B:
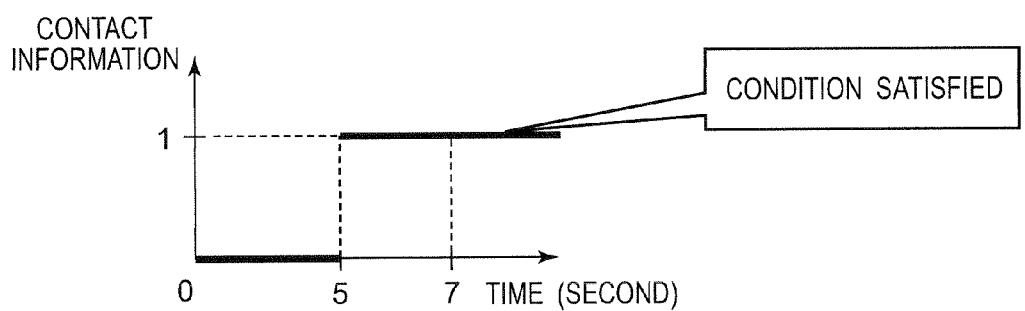
FIG. 9B is an explanatory view of the gripping time of the user's hand in the robot according to the first embodiment of the present disclosure.
Figure 9C:
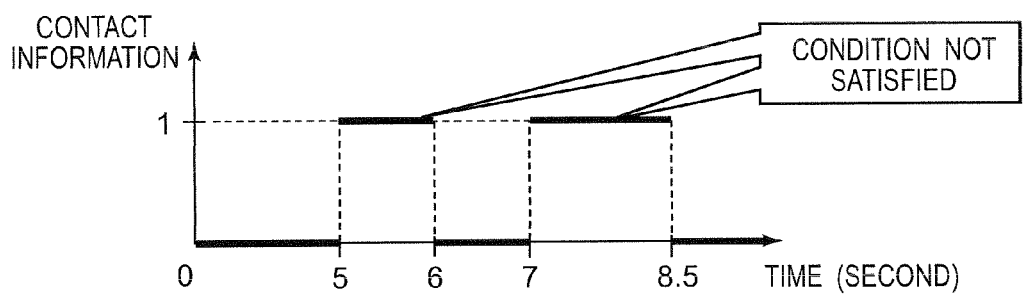
FIG. 9C is an explanatory view of the gripping time of the user's hand in the robot according to the first embodiment of the present disclosure.

With reference to FIGS. 9A to 9C, a description will be given of the second grip detection condition. In FIGS. 9A to 9C, the horizontal axis indicates time (second), and the vertical axis indicates the contact information (e.g., information of the contact sensor 105A). In FIG. 9A, the time during contact is 0.1 seconds which is between the time point of 5.1 seconds and the time point of 5.2 seconds. Hence, it does not satisfy the second grip detection condition. In FIG. 93, the contact starts from the time point of 5 seconds and passes the time point of 7 seconds, whereby the contact time exceeds 2 seconds. Hence, the time following the time point of 7 seconds satisfies the second grip detection condition. The time before the time point of 7 seconds does not satisfy the second grip detection condition. In FIG. 9C, since the continuously contacting time is 1 second from the time point of 5 seconds to the time point of 6 seconds, and 1.5 seconds from the time point of 7 seconds to the time point of 8.5 seconds. Therefore, both of them do not satisfy the second grip detection condition.

When the foregoing two grip detection conditions are both satisfied, the grip detecting unit 611 outputs, as the grip information, "gripping" (output: "1") from the grip detecting unit 611 to the tracking control switching unit 612. When the grip detection conditions are not fully satisfied, the grip detecting unit 611 outputs, as the grip information, "not gripping" (output: "0") from the grip detecting unit 611 to the tracking control switching unit 612.

The tracking control switching unit 612 determines the tracking control information represented by "tracking control ON" or "tracking control OFF" in accordance with the grip information from the grip detecting unit 611. The tracking control information determined at the tracking control switching unit 612 is output from the tracking control switching unit 612 to the control unit 605. Here, as the tracking control information, "1" is output when "tracking control ON", and "0" is output when "tracking control OFF". The selecting (switching) method of the tracking control information exerted by the tracking control switching unit 612 is as follows: the tracking control switching unit 612 selects "tracking control ON" when there is information of "gripping" (output: "1") in the grip information from the grip detecting unit 611; the tracking control switching unit 612 selects "tracking control OFF" when the information is "not gripping" (output: "0"). Hence, "tracking control ON" is selected only when the user is gripping the grip part 103, and when the user is not gripping the grip part 103, the "tracking control OFF" is selected.

Using the timer installed in the input/output IF 608, the control unit 605 outputs the shift amount information, which is input from the tracking control unit 606 to the control unit 605, to the input/output IF 608 for every certain time (e.g., every 1 msec). Here, when the tracking control information being input from the tracking control switching unit 612 is "tracking control ON" (output: "1"), the shift amount information is output from the control unit 605 to the input/output IF 608; and when the tracking control information is "tracking control OFF" (output: "0"), a command for stopping tracking control is output from the control unit 605 to the input/output IF 608.

The input/output IF 608 outputs the measured values g of the gap sensors $s_{x1}$, $s_{y1}$, $s_{y2}$, $s_{z1}$, $s_{z2}$, and $s_{z3}$ acquired from the manipulator 101 and the time information from the timer installed in the input/output IF 608 to the relative position information acquiring unit 607.

The measured value of the contact sensors 105 from the contact sensors 105 and the time information from the timer installed in the input/output IF 608 are output from the input/output IF 608 to the contact information acquiring unit 610.

Further, the input/output IF 608 outputs, to the motor driver 609, the shift amount information acquired from the control unit 605 or the command for stopping tracking control.

The value of constant (the constant by which the interval p is multiplied when the threshold value is derived, i.e., coefficient k in Equation (4) when the shift amount is derived) used at the tracking control unit 606 is input by the user to the input/output IF 608 using the input device 608d such as a keyboard, a mouse, or a touch panel, and the value input to the input/output IF 608 is output from the input/output IF 608 to the tracking control unit 606.

The motor driver 609 outputs, to the manipulator 101, a command value to each motor 1013 of the manipulator 101 for controlling the manipulator 101, based on the shift amount information acquired from the input/output IF 608. Further, when the command for stopping tracking control is input from the input/output IF 608 to the motor driver 609, the command value to the motor 1013 for stopping control is output from the motor driver 609 to the manipulator 101.

The manipulator 101 uses the timer installed in the input/output IF 608, to output the positional information of the manipulator 101 for every certain time (e.g., every 1 msec) from each encoder 1014 of the manipulator 101 to the input/output IF 608. Further, the measured values g of the gap sensors from the relative position sensors 104 (the gap sensors $s_{x1}$, $s_{y1}$, $s_{y2}$, $s_{z1}$, $s_{z2}$, and $s_{z3}$) are similarly output, using the timer installed in the input/output IF 608, from the gap sensor $s_{x1}$, $s_{y1}$, $s_{y2}$, $s_{z1}$, $s_{z2}$, and $s_{z3}$ to the input/output IF 608 every certain time (e.g., every 1 msec). Further, the manipulator 101 is controlled according to the command value from the motor driver 609. The detail thereof will be described with reference to FIG. 10. The manipulator 101 structures a multi-link manipulator of six-degree of freedom as being rotatable about six axes in total.

Figure 10:
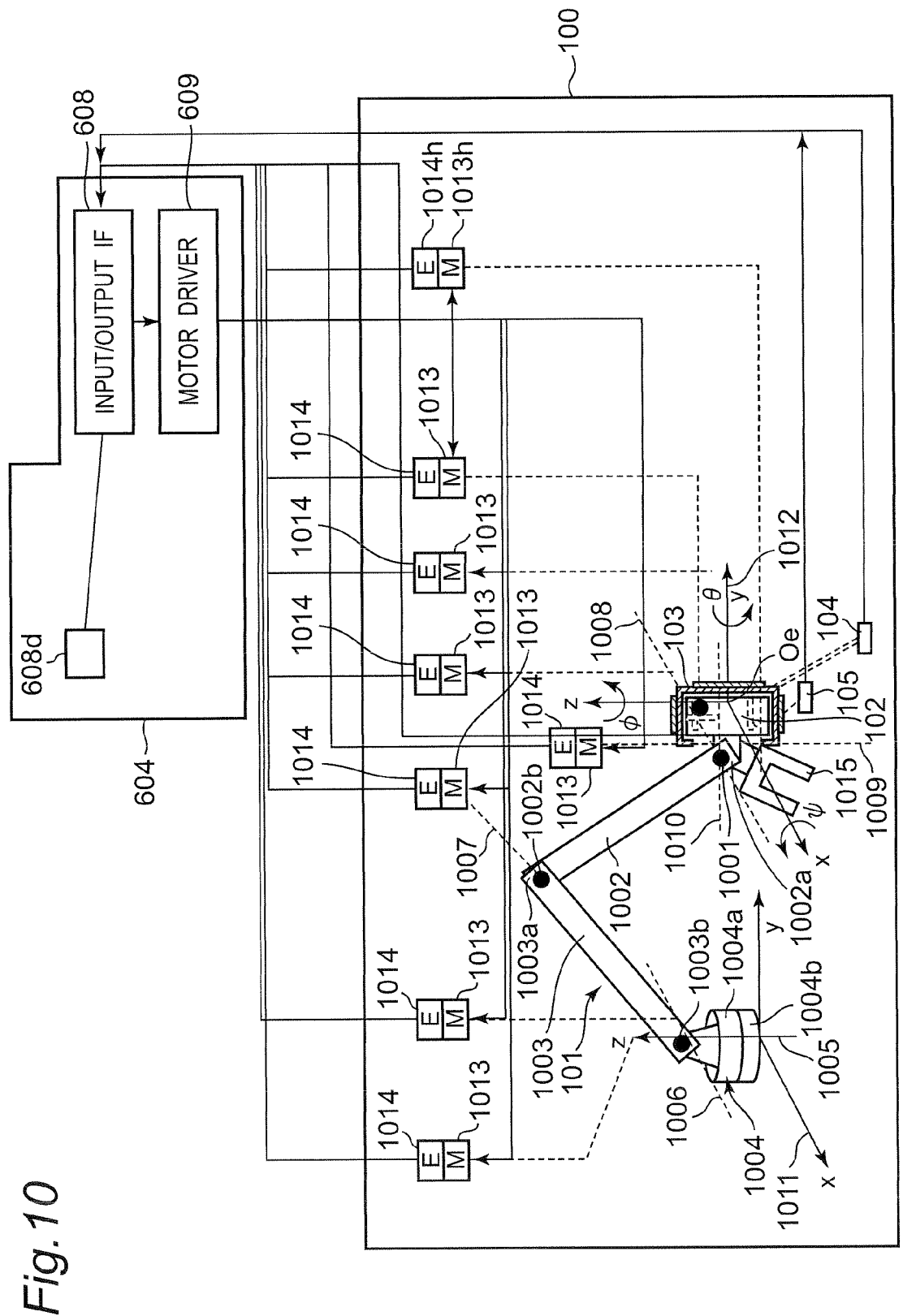
FIG. 10 is an explanatory view of the robot arm in the robot according to the first embodiment of the present disclosure.

As shown in FIG. 10, the manipulator 101 is, as an example of a multi-joint robot arm, and specifically, is a multi-link manipulator of six-degree of freedom. The manipulator 101 includes: the end effector 102; a front arm link 1002 having a wrist part 1001 to which the end effector 102 is attached, at its leading end 1002a; an upper arm link 1003 having its leading end 1003a rotatably coupled to a proximal end 1002b of the front arm link 1002; and a pedestal part 1004 by which a proximal end 1003b of the upper arm link 1003 is rotatably coupled and supported. Though the pedestal part 1004 is fixed to a certain position, the pedestal part 1004 may be shiftably coupled to a not-shown rail. The wrist part 1001 has three rotary shafts, i.e., a fourth joint part 1008, a fifth joint part 1009, and a sixth joint part 1010, and can change the relative posture (orientation) of the end effector 102 to the front arm link 1002. That is, in FIG. 10, the fourth joint part 1008 can change the relative posture of the end effector 102 to the wrist part 1001 about the horizontal axis. The fifth joint part 1009 can change the relative posture of the end effector 102 to the wrist part 1001 about the vertical axis, which is perpendicular to the horizontal axis of the fourth joint part 1008. The sixth joint part 1010 can change the relative posture of the end effector 102 to the wrist part 1001 about the horizontal axis, which is perpendicular to the horizontal axis of the fourth joint part 1008 and the vertical axis of the fifth joint part 1009. The other end 1002b of the front arm link 1002 is rotatable relative to the leading end 1003a of the upper arm link 1003 about the third joint part 1007, that is, about the horizontal axis being parallel to the horizontal axis of the fourth joint part 1008. The other end 1003b of the upper arm link 1003 is rotatable relative to the pedestal part 1004 about the second joint part 1006, that is, about the horizontal axis being parallel to the horizontal axis of the fourth joint part 1008. Further, the upper movable part 1004a of the pedestal part 1004 is rotatable relative to the lower fixed part 1004b of the pedestal part 1004 about the first joint part 1005, that is, about the vertical axis being parallel to the vertical axis of the fifth joint part 1009.

As a result, the manipulator 101 structures the multi-link manipulator of six-degree of freedom as being rotatable about six axes in total.

The joint parts that structure the rotary parts of the shafts of the manipulator 101 each include a rotary driver device such as the motor 1013 for driving the joint part, and the encoder 1014 (which is actually installed in each of the joint parts of the manipulator 101) which detects the rotary phase angle (i.e., the joint angle) of the rotary shaft of the motor 1013 to output the positional information. The motor 1013 (which is actually installed in each of the joint parts of the manipulator 101) has its drive controlled by the motor driver 609, which is provided at one member out of paired members (e.g., a rotated member and a supporting member supporting the rotated member) structuring each joint part. The rotary shaft of the motor 1013 provided at one member of each joint part is coupled to the other member of each joint part. By the rotary shaft being positively and negatively rotated, the other member can rotate about the shaft relative to the one member.

Further, 1011 denotes the absolute coordinate system in which the relative positional relationship to the lower fixed part 1004b of the pedestal part 1004 is fixed; 1012 denotes the arm end coordinate system in which the relative positional relationship to the end effector 102 is fixed. It is defined that: the origin position $O_e$ (x, y, z) of the arm end coordinate system 1012 as seen from the absolute coordinate system 1011 is the arm end position of the manipulator 101; ($\phi$, $\theta$, $\psi$) expressing the posture of the arm end coordinate system 1012 as seen from the absolute coordinate system 1011 using the roll angle, the pitch angle, and the yaw angle is the arm end posture of the manipulator 101; and arm end position and posture vector is vector $r=[x, y, z, \phi, \theta, \psi]^T$. Hence, as an example, the vertical axis of the first joint part 1005 can be positioned to be in parallel with z-axis of the absolute coordinate system 1011, and the horizontal axis of the second joint part 1006 can be positioned to be in parallel with x-axis. Further, for example, the horizontal axis of the sixth joint part 1010 can be positioned to be in parallel with x-axis of the arm end coordinate system 1012; the horizontal axis of the fourth joint part 1008 can be positioned to be in parallel with y-axis; and the vertical axis of the fifth joint part 1009 can be positioned to be in parallel with z-axis. It is to be noted that the rotation angle to x-axis of the arm end coordinate system 1012 is defined as yaw angle $\psi$, the rotation angle to y-axis being defined as pitch angle $\theta$, and the rotation angle to z-axis being defined as roll angle $\phi$.

Further, a hand 1015 can be attached to the arm end (e.g., the leading end 1002a) of the manipulator 101. The hand 1015 is fixed to the end effector 102 such that the angle formed between the hand 1015 and the end effector 102 becomes constant. The hand 1015 is removably attached to the end effector 102, and can be fixed with the angle between the hand 1015 and the end effector 102 being freely changed depending on the attaching manner to the end effector 102. Further, to the hand 1015, a motor 1013h and an encoder 714h for opening and closing the hand 1015 are attached, and opening and closing of the hand 1015 can be controlled similarly to the manipulator 101.

FIGS. 11A to 11E show the procedure of the manipulator 101 performing tracking when the manipulator 101 and the user cooperatively convey a target object (gripping target object) 1101. The hand 1015 is attached to the arm end part of the manipulator 101, e.g., to the leading end 1002a, and the hand 1015 is caused to grip the target object 1101. Thereafter, the state transits in an order of FIG. 11A→FIG. 11B→FIG. 11C→FIG. 11D→FIG. 11E.

Figure 11A:
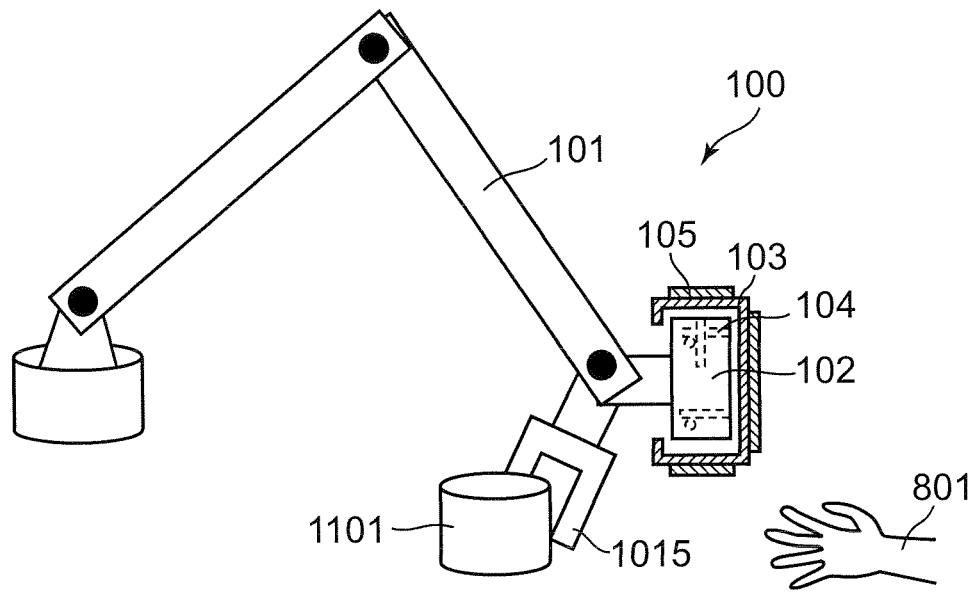
FIG. 11A is an explanatory view of cooperative conveyance using the robot arm in the robot according to the first embodiment of the present disclosure.

First, FIG. 11A shows the state where the user's hand 801 is not gripping the grip part 103, and the manipulator 101 is stopped.

Figure 11B:
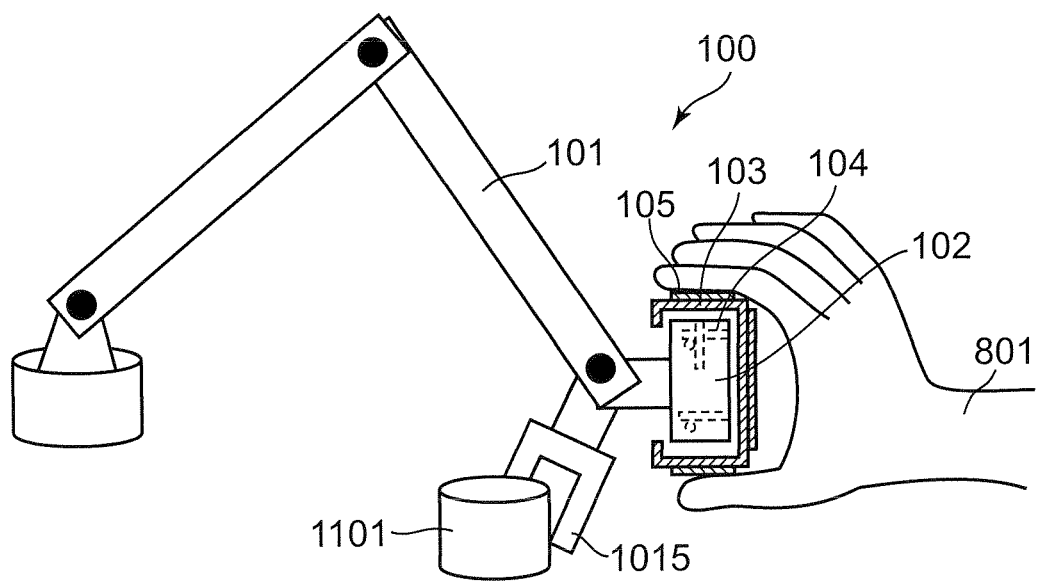
FIG. 11B is an explanatory view of cooperative conveyance using the robot arm in the robot according to the first embodiment of the present disclosure.

Next, FIG. 11B shows the standby state where the user's hand 801 is gripping the grip part 103; the grip detecting unit 611 detects as "gripping"; and the manipulator 101 can be caused by the control device 602 to perform tracking control.

Figure 11C:
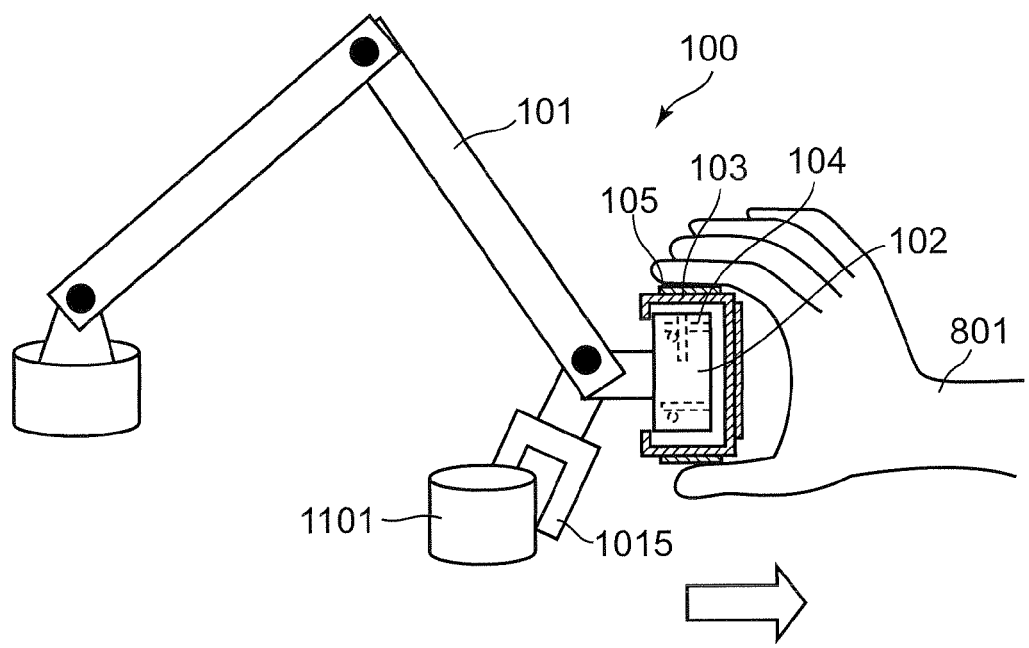
FIG. 11C is an explanatory view of cooperative conveyance using the robot arm in the robot according to the first embodiment of the present disclosure.

Next, FIG. 11C shows the state where the user's hand 801 is shifting the grip part 103, whereby the relative position $\Delta r$ of the grip part 103 to the end effector 102 exceeds the threshold value. Specifically, FIG. 11C shows the state where the user's hand 801 is shifting the grip part 103 in the right direction (see the arrow) in FIG. 11C, and the relative position $\Delta r$ (in particular, $\Delta z$) of the grip part 103 to the end effector 102 exceeds the threshold value.

Figure 11D:
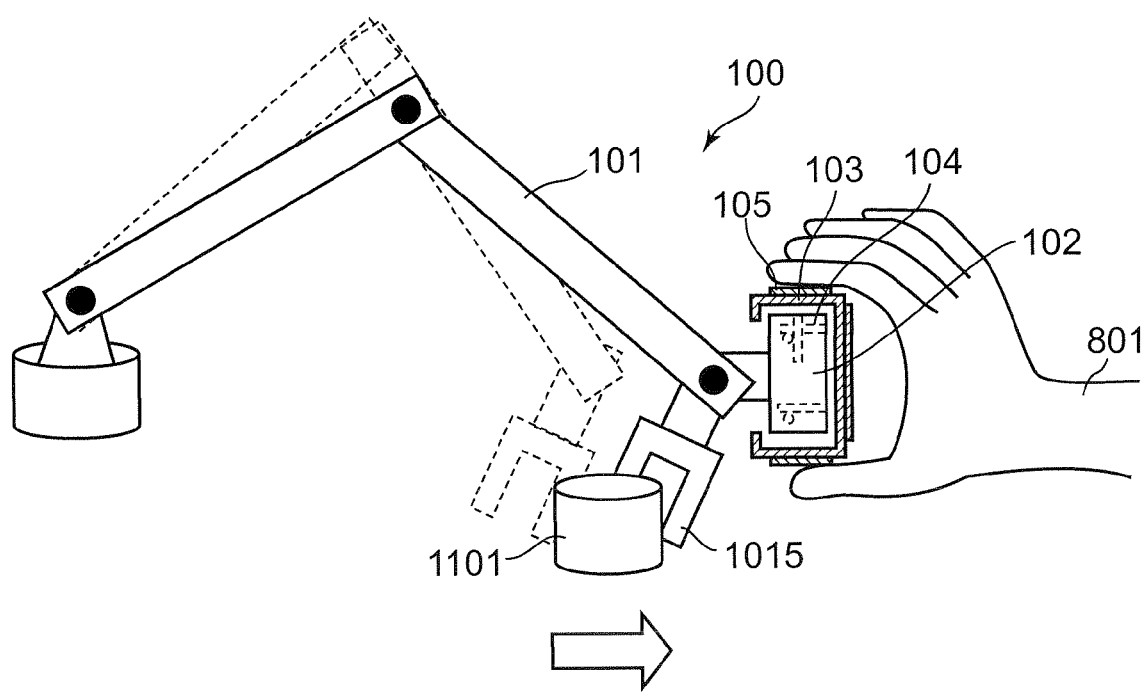
FIG. 11D is an explanatory view of cooperative conveyance using the robot arm in the robot according to the first embodiment of the present disclosure.

Next, FIG. 11D shows the state where the manipulator 101 is allowed to perform tracking control by the control device 602 so that the relative position $\Delta r$ of the grip part 103 to the end effector 102 falls within the threshold value. Specifically, FIG. 11D shows the state where, since the user's hand 801 is shifting the grip part 103 in the right direction (see the arrow) in FIG. 11C, the manipulator 101 is allowed to perform tracking control by the control device 602 in the arrow direction in FIG. 11D so that the relative position $\Delta r$ of the grip part 103 to the end effector 102 falls within the threshold value, whereby the target object 1101 is conveyed by the manipulator 101 from the position represented by the dotted line to the position represented by the solid line.

Figure 11E:
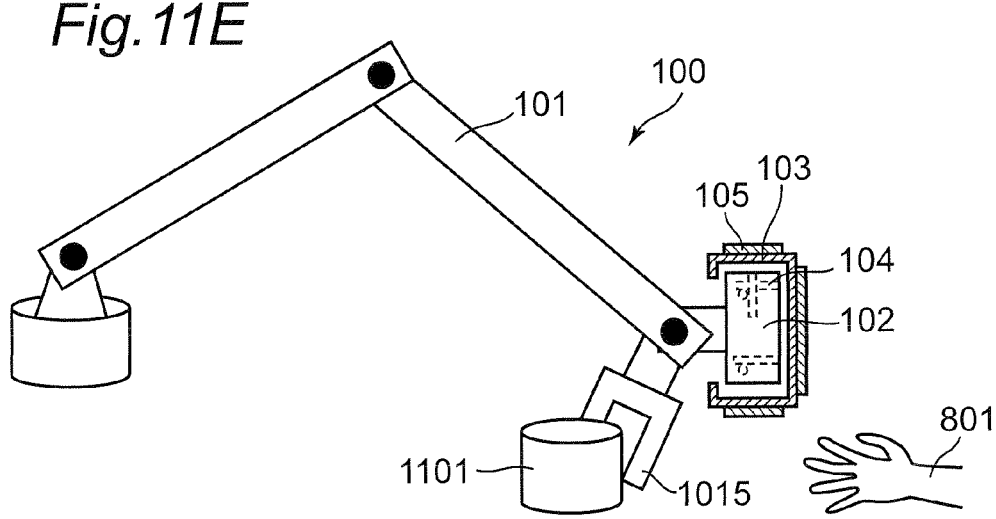
FIG. 11E is an explanatory view of cooperative conveyance using the robot arm in the robot according to the first embodiment of the present disclosure.

Next, FIG. 11E shows the state where the user's hand 801 is not gripping the grip part 103 and the manipulator 101 is stopped.

As described above, when the user's hand 801 grips and shifts the grip part 103, the manipulator 101 is allowed by the control device 602 to perform tracking of the grip part 103 by the shift amount. Since the end effector 102 and the grip part 103 are separately structured, the user can shift the target object 1101 using the manipulator 101, just by the force of shifting the grip part 103.

However, the end effector 102 and the grip part 103 are separated from each other and the control device 602 causes the manipulator 101 to perform tracking control such that the relative position falls within the threshold value. Therefore, there is a possible issue that, when the user's hand 801 is not gripping the grip part 103, the manipulator 101 continuously falls down until the manipulator 101 hits the ground.

This issue will be described with reference to FIGS. 12A to 12D, each showing an example of cooperative conveyance without use of the contact sensors 105. The state transits in an order of FIG. 12A→FIG. 12B→FIG. 12C→FIG. 12D.

Figure 12A:
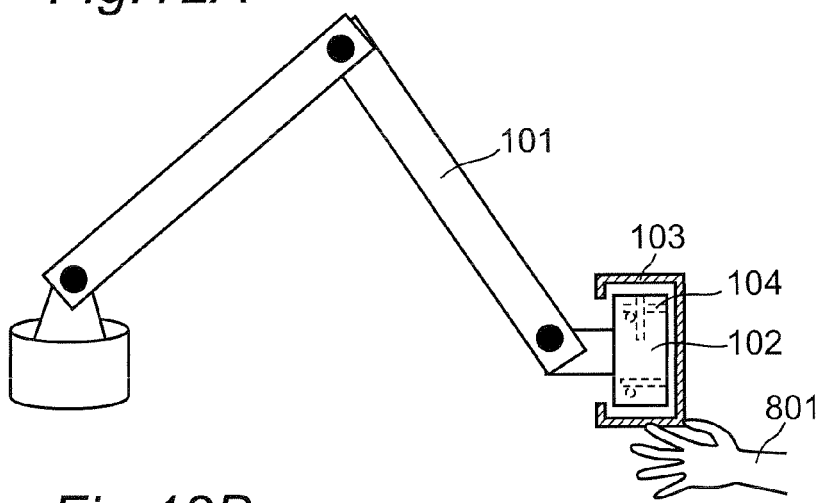
FIG. 12A is an explanatory view in the case where the user's hand is not gripping in the robot according to the first embodiment of the present disclosure.

First, FIG. 12A shows the state where the user's hand 801 is gripping the grip part 103 and the work of cooperative conveyance has finished.

Figure 12B:
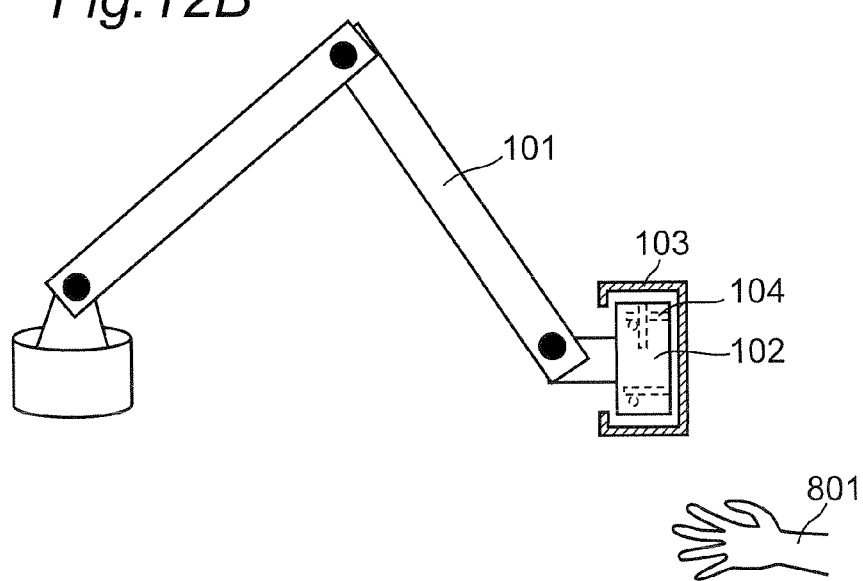
FIG. 12B is an explanatory view in the case where the user's hand is not gripping in the robot according to the first embodiment of the present disclosure.

Next, FIG. 12B shows the state where the user's hand 801 releases the grip part 103 immediately after the work ends.

Figure 12C:
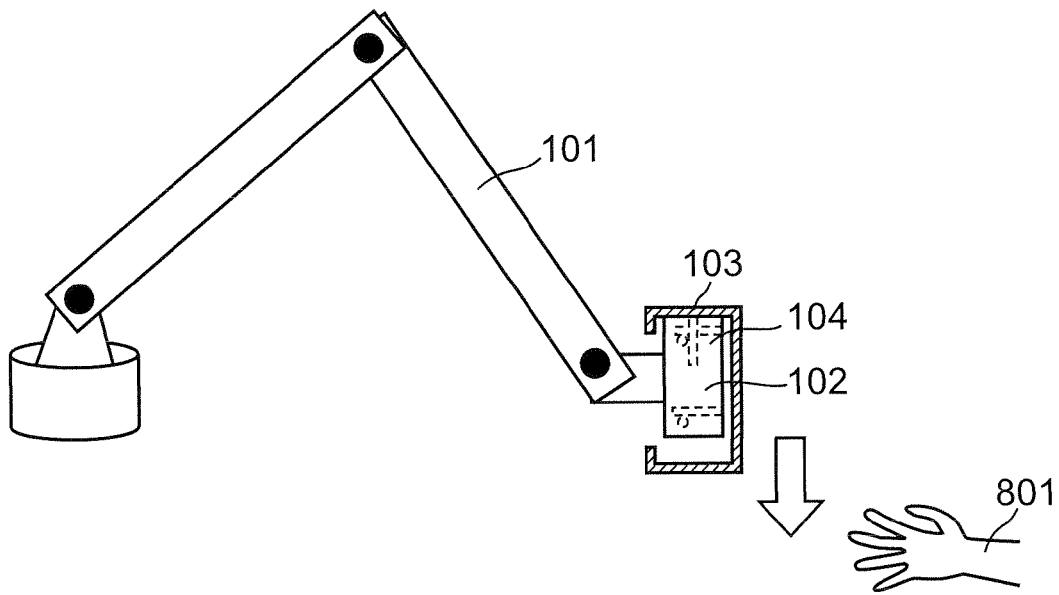
FIG. 12C is an explanatory view in the case where the user's hand is not gripping in the robot according to the first embodiment of the present disclosure.

Next, FIG. 12C shows the state where the grip part 103 is falling under the influence of gravity because of the user's hand 801 releasing the grip part 103.

Figure 12D:
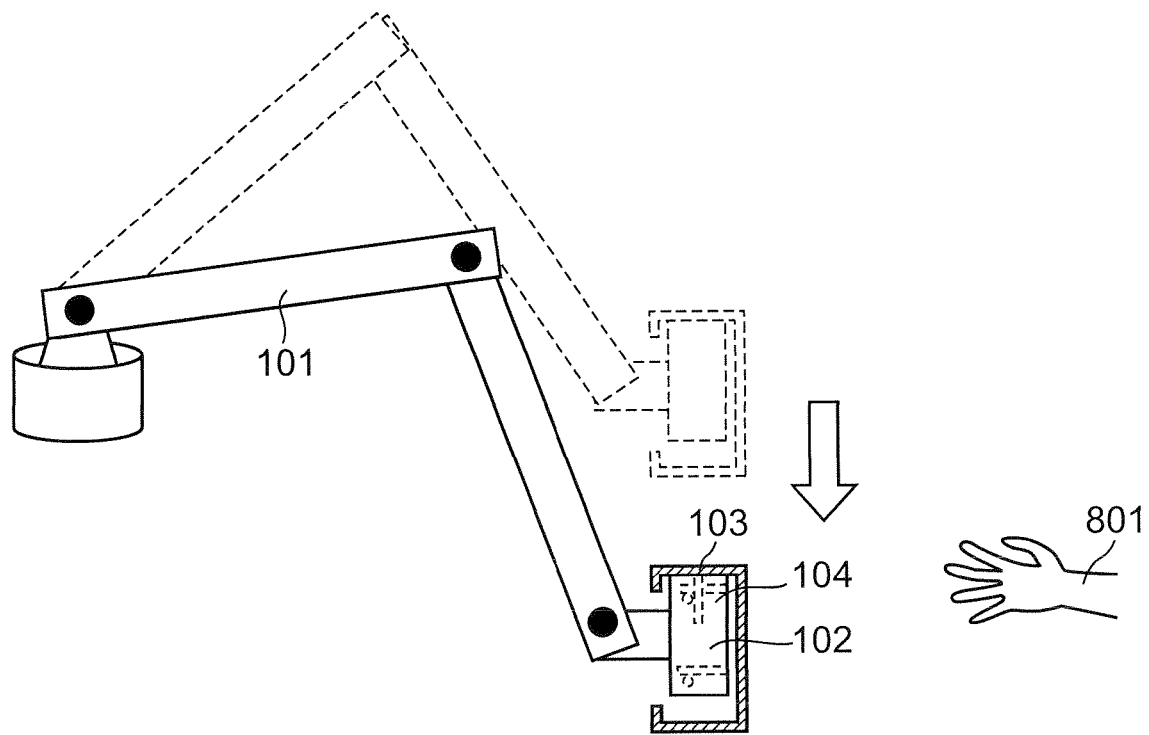
FIG. 12D is an explanatory view in the case where the user's hand is not gripping in the robot according to the first embodiment of the present disclosure.

Next, FIG. 12D shows the state where, since the relative position of the grip part 103 to the end effector 102 is increased because the grip part 103 is falling, the manipulator 101 keeps tracking downward so as to set the relative position to fall within the threshold value. Since the grip part 103 continues to fall down under the influence of gravity until the grip part 103 hits the ground, the manipulator 101 also continues to fall down until the manipulator 101 hits the ground.

In order to address such an issue, in the first embodiment, only when the user's hand 801 is gripping the grip part 103, the control device 602 causes the manipulator 101 to perform tracking control. With such a structure, when the user's hand 801 is not gripping the grip part 103, the control device 602 does not cause the manipulator 101 to perform tracking control. Thus, the issue that the manipulator 101 continues to fall down can be resolved.

Figure 13:
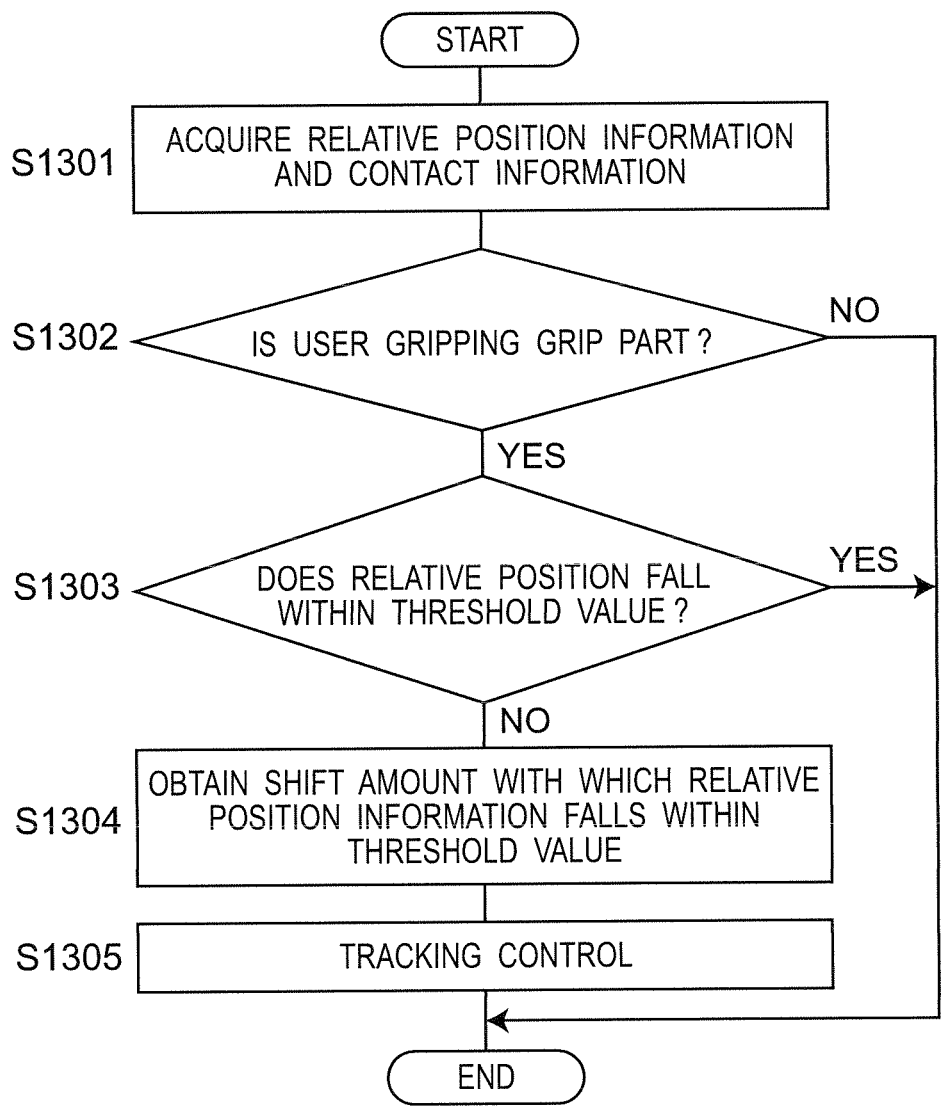
FIG. 13 is a flowchart showing the flow of the processing starting from acquiring the relative position information and the contact information until exerting tracking control in the robot according to the first embodiment of the present disclosure.

With reference to the flowchart of FIG. 13, a description will be given of the operation procedure of the control device 602 of the robot arm 100 in the robot 601 according to the first embodiment.

In Step S1301, the relative position information acquiring unit 607 acquires relative position information of the grip part 103 to the end effector 102. The contact information acquiring unit 610 acquires contact information from the outside of the contact sensor 105.

In Step S1302, the grip detecting unit 611 detects whether the user is gripping the grip part 103, based on the contact information acquired by the contact information acquiring unit 610. The result detected by the grip detecting unit 611 is output to the tracking control switching unit 612. When the tracking control unit 606 detects that the user is gripping the grip part 103, the procedure proceeds to Step S1303. When the tracking control unit 606 detects that the user is not gripping the grip part 103, the flow ends.

In Step S1303, the tracking control unit 606 determines whether the relative position information acquired by the relative position information acquiring unit 607 falls within the prescribed threshold value range. When the tracking control unit 606 determines that the relative position information falls within threshold value range, the flow ends. When the tracking control unit 606 determines that the relative position information does not fall within threshold value range, the procedure proceeds to Step S1304.

In Step S1304, the tracking control unit 606 obtains the shift amount with which the relative position information exceeding the threshold value range falls within the threshold value. The shift amount obtained by the tracking control unit 606 is output from the tracking control unit 606 to the control unit 605, and the procedure proceeds to Step S1305.

In Step S1305, the control unit 605 exerts tracking control over the manipulator 101 based on the shift amount acquired from the tracking control unit 606, and the flow ends.

With the structure of the first embodiment, the grip part 103 gripped by the user and the end effector 102 are mechanistically separated from each other, and the manipulator 101 tracks the position where the grip part 103 is shifted. Therefore, even with the robot arm 100 of poor operability in performing work, e.g., cooperative conveyance or direct teaching, the user can easily shift the robot arm 100 with a light force, and the burden of the user can be alleviated. Accordingly, the operability of the robot arm 100 can be improved. Further, the grip detecting unit 611 can detect whether the user is gripping the grip part 103 based on the contact information acquired by the contact information acquiring unit 610, and only when the grip detecting unit 611 detects that the user is gripping the grip part 103, the control unit 605 exerts tracking control over the manipulator 101. Accordingly, there is no danger of the manipulator 101 continuing falling down until the manipulator 101 hits the ground in the case where the user is not gripping the grip part 103, and safety is secured. It is to be noted that, when the grip detecting unit 611 detects that the user is not gripping the grip part 103, the control unit 605 exerts shifting operation control over the manipulator 101 without tracking control. When the grip detecting unit 611 detects that the user is not gripping the grip part 103 when tracking control is exerted, the control unit 605 stops tracking control of the manipulator 101, and thereafter the control unit 605 exerts shifting operation control over the manipulator 101 without tracking control.

(Second Embodiment)

In the following, a description will be given of a robot according to a second embodiment of the present disclosure.

In the first embodiment, the control unit 605 exerts tracking control of the manipulator 101 only when the user is gripping the grip part 103, to thereby resolve the issue that the manipulator 101 keeps falling down when the user is not gripping the grip part 103. Thus, safety is enhanced.

However, when the user starts gripping the grip part 103, if the value of relative position Δr of the grip part 103 to the end effector 102 is not 0, it is possible that the manipulator 101 sharply shifts and becomes dangerous immediately after the user grips the grip part 103. That is, in the case where the relative position Δr is not 0 when tracking control is started, irrespective of the magnitude of the relative position Δr, tracking control is abruptly performed immediately after the tracking control is started, and it is highly possible to become dangerous. On the other hand, in the second embodiment, even when the relative position Δr is 0, tracking control is slowly exerted immediately after the tracking control is started. Thus, the aforementioned dangerous state can be avoided and safety is enhanced. This state will be described with reference to FIGS. 14A to 14C.

Figure 14A:
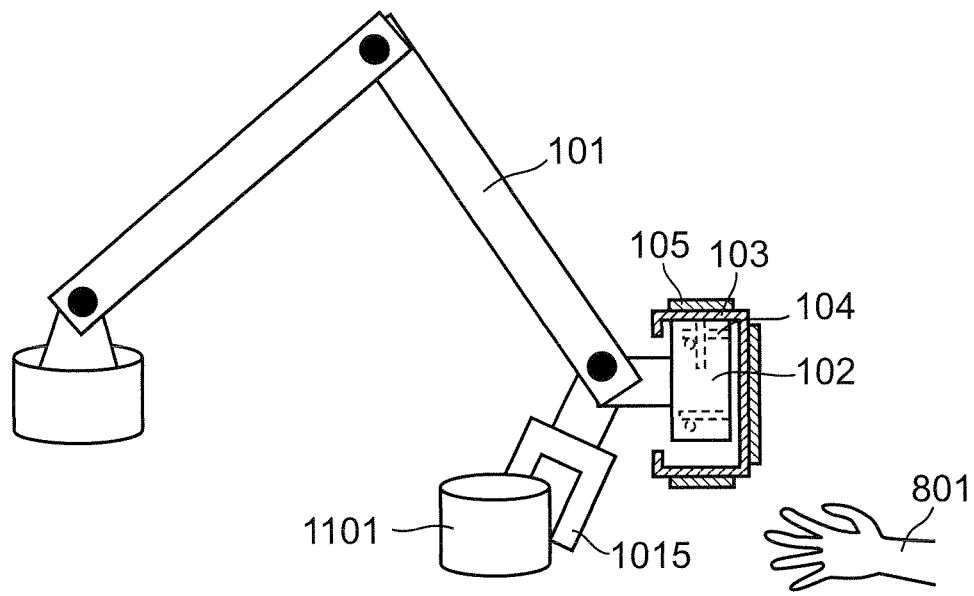
FIG. 14A is an explanatory view at the time of starting cooperative conveyance using the robot arm in the robot according to the first embodiment of the present disclosure.
Figure 14B:
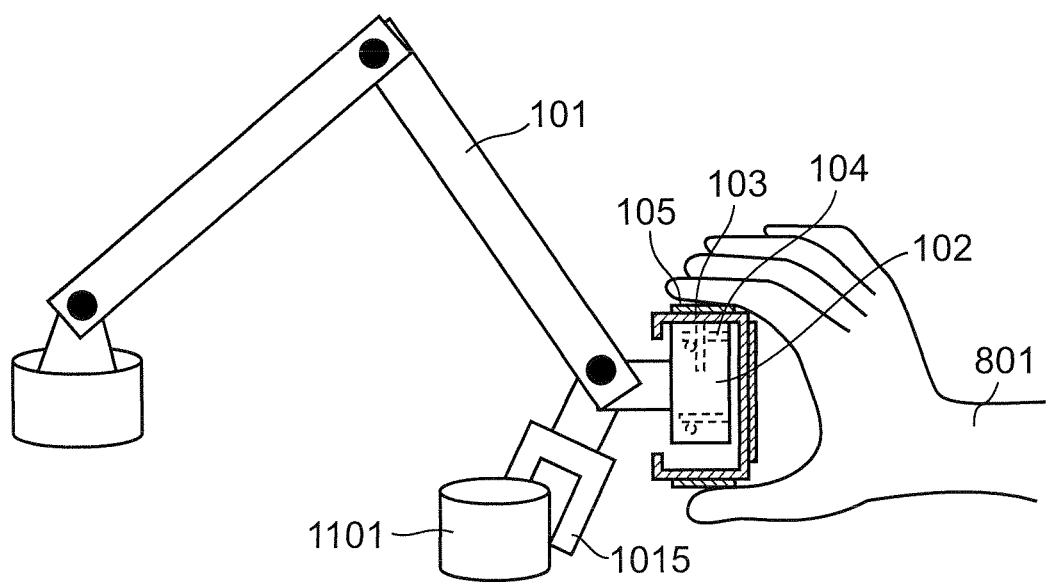
FIG. 14B is an explanatory view at the time of starting cooperative conveyance using the robot arm in the robot according to the first embodiment of the present disclosure.
Figure 14C:
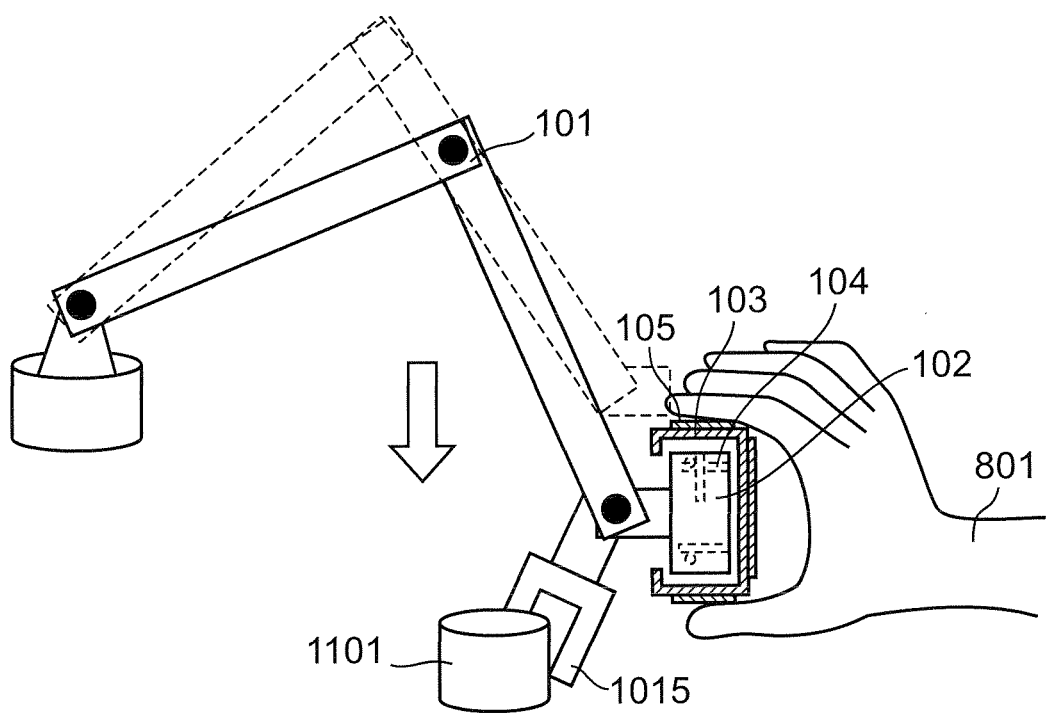
FIG. 14C is an explanatory view at the time of starting cooperative conveyance using the robot arm in the robot according to the first embodiment of the present disclosure.

FIGS. 14A to 14C show the procedure of the manipulator 101 performing tracking, when the user and the manipulator 101 cooperatively convey the target object 1101. The state transits in an order of FIG. 14A→FIG. 14B→FIG. 14C.

Firstly, FIG. 14A shows the state where the user's hand 801 is not gripping the grip part 103, and the manipulator 101 is stopped. Here, the grip part 103 is hooked by the end effector 102. In other words, the upper side face part 103b of the grip part 103 in FIG. 14A and the side face part 102b of the end effector 102 opposing to the upper side face part 103b are brought into contact with each other, and the interval of the clearance 90 between the upper side face part 103b and the side face part 102b is 0. Conversely, in FIG. 14A, the interval between the lower side face part 103b of the grip part 103 and the side face part 102b of the end effector 102 opposing to the lower side face part 103b is wide. As a result, the interval of the clearance 90 between the lower side face part 103b and the side face part 102b is twice as great as the clearance interval (width Δx or width Δy) of the initial position (the position where the grip part 103 maintains uniform interval to the end effector 102).

Next, FIG. 14B shows the standby state where the user's hand 801 is gripping the grip part 103; which is the moment at which the grip detecting unit 611 detects "gripping"; and the manipulator 101 can be caused by the control unit 605 to perform tracking control.

Next, FIG. 14C shows the state immediately after a gripping of the user's hand 801 is detected; and the manipulator 101 is sharply shifting by the control operation of the control unit 605, because the value of relative position Δr of the grip part 103 to the end effector 102 is not 0.

Figure 15:
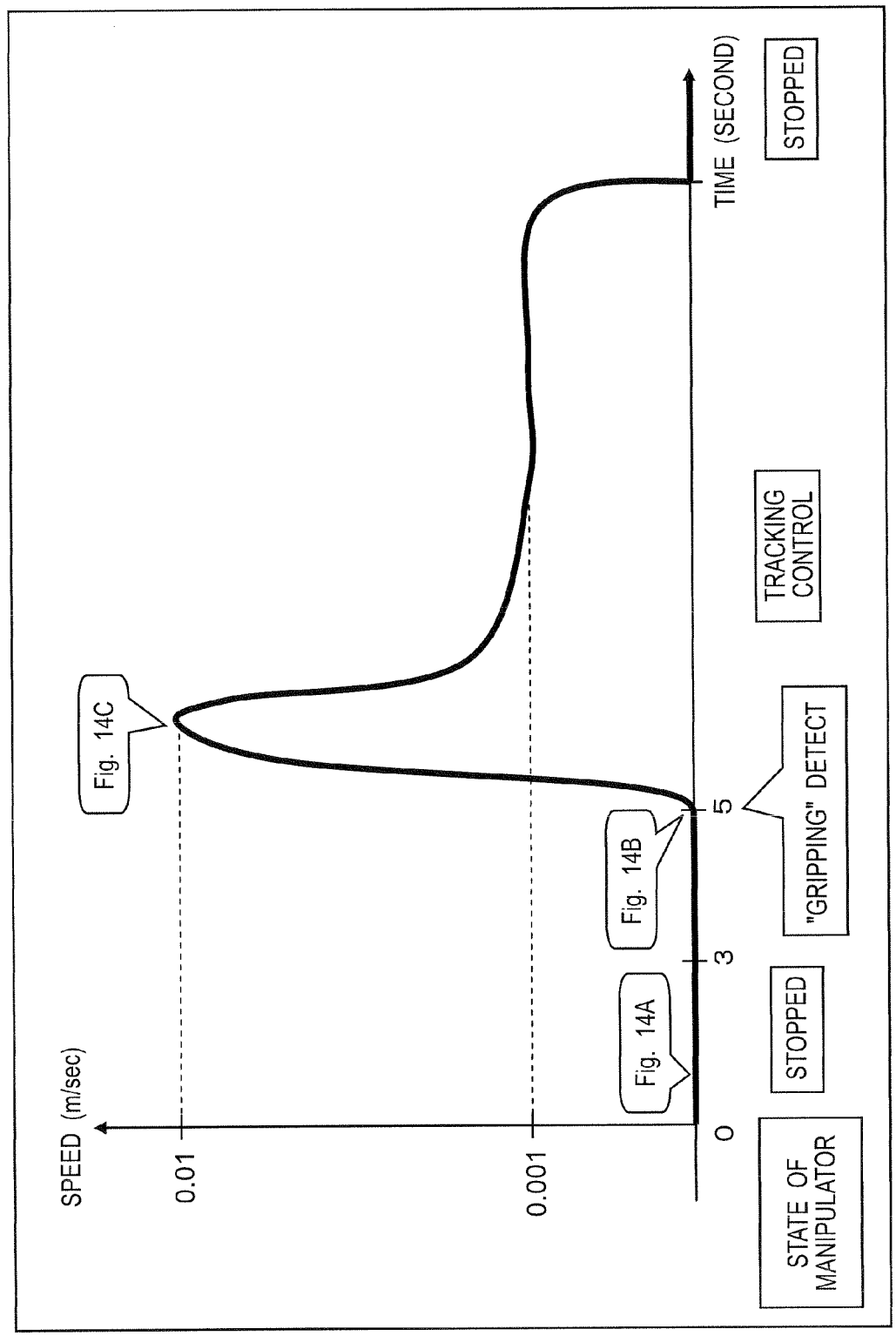
FIG. 15 is an explanatory view of the relationship between the time and speed of cooperative conveyance using the robot arm in the robot according to the first embodiment of the present disclosure.

The relationship at this time between the time and the speed of the arm end position of the manipulator 101 is shown in FIG. 15. The horizontal axis in the graph shown in FIG. 15 indicates time (second), and the vertical axis indicates speed. The bold line on the graph shows the speed to the time. Further, under the horizontal axis, the state of the manipulator at the corresponding time is shown. From FIG. 15, it can be seen that, when the user's hand 801 grips the grip part 103 and immediately after the grip detecting unit 611 detects "gripping", the speed of the arm end position of the manipulator 101 sharply increases.

As described above, if the value of the relative position Δr of the grip part 103 to the end effector 102 when the user starts gripping the grip part 103 is not 0, the manipulator 101 may sharply shift immediately after the detection of gripping, and become dangerous. Accordingly, the second embodiment takes countermeasures against this issue.

Figure 16:
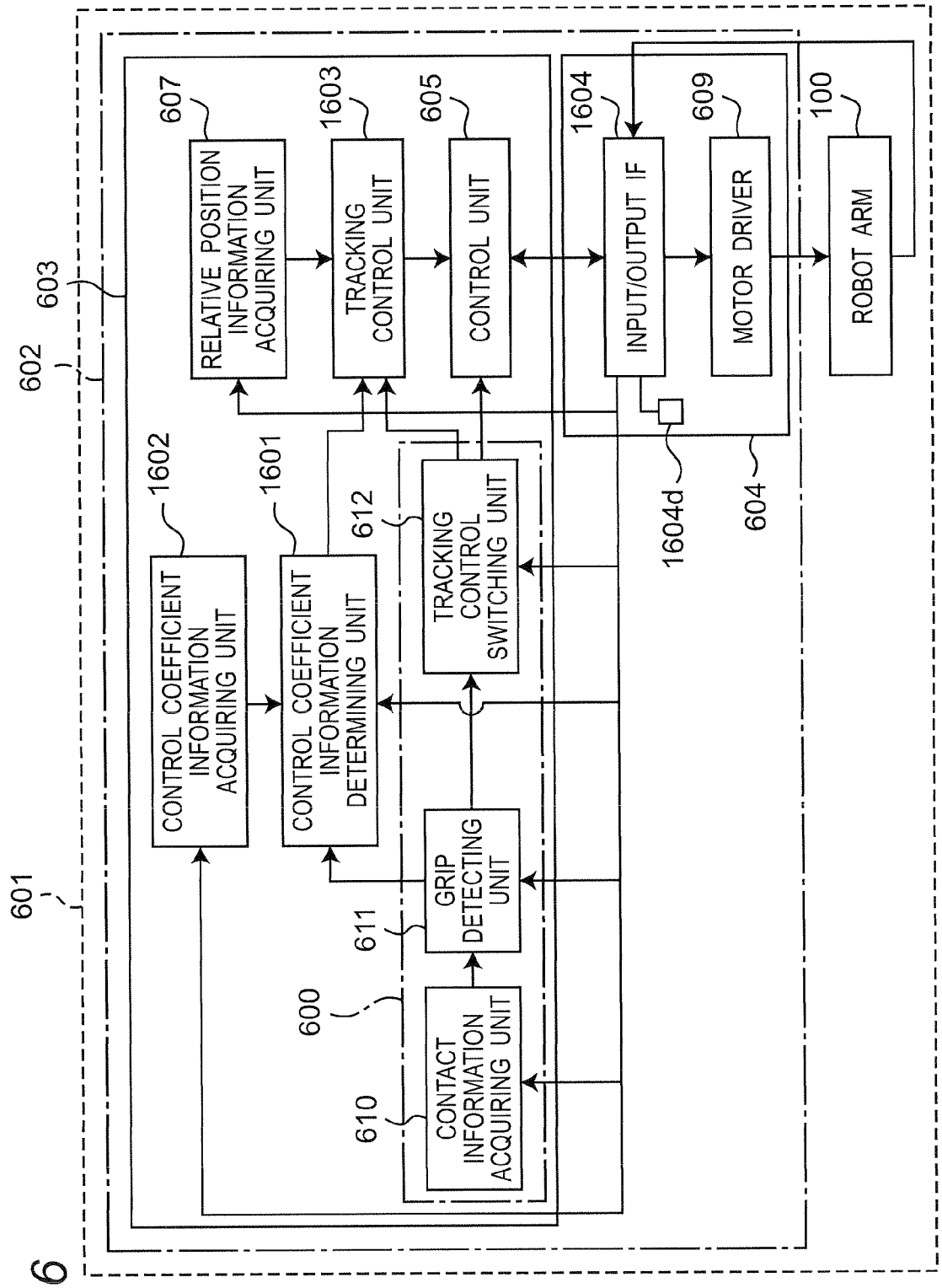
FIG. 16 is a block diagram of a robot arm in a robot according to a second embodiment of the present disclosure.

FIG. 16 is a block diagram of the robot arm 100 in the robot 601 according to the second embodiment of the present disclosure. Since the manipulator 101, the control unit 605, the relative position information acquiring unit 607, the motor driver 609, the contact information acquiring unit 610, the grip detecting unit 611, and the tracking control switching unit 612 according to the robot 601 of the second embodiment of the present disclosure are identical to those in the first embodiment of the present disclosure, common reference characters are allotted thereto and the description thereof will not be repeated. In the following, a detailed description will be given solely of the different parts (i.e., a control coefficient information determining unit 1601, a control coefficient information acquiring unit 1602 and the like).

The control coefficient information determining unit 1601 obtains the coefficient information in accordance with the grip information from the grip detecting unit 611, and outputs the obtained coefficient information to the tracking control unit 1603. Here, the coefficient information represents the value of coefficient (control coefficient) k in Equation (4). In the control coefficient information determining unit 1601, from Equation (4), when the value of coefficient k becomes great, the shift amount for every certain time (e.g., every 1 msec) when the manipulator 101 is performing tracking control becomes great. On the other hand, when the value of coefficient k becomes small, the shift amount for every certain time when the manipulator 101 is performing tracking control becomes small. The coefficient information determination method is as follows. Firstly, the grip detecting unit 611 detects whether the user is gripping the grip part 103. Further, when the grip detecting unit 611 detects that the user is gripping the grip part 103, the control coefficient information determining unit 1601 acquires the elapsed time from when the user starts gripping the grip part 103, based on the time information from the timer installed in the input/output IF 1604. The control coefficient information determining unit 1601 determines coefficient information based on the acquired elapsed time.

With reference to FIG. 17, the determination method of a specific value will be described. Here, the database shown in FIG. 17 is structured by the control coefficient information acquiring unit 1602 acquiring the associated information in which information as to whether the user is gripping the grip part 103, the elapsed time from a start of gripping, and information of the control coefficient (e.g., the value of the control coefficient) are associated with one another, and storing in the inner storage unit in the control coefficient information acquiring unit 1602. Specifically, when the user is not gripping the grip part 103, the value of coefficient k is set to 0.0. In the case where the user is gripping the grip part 103, when the elapsed time from when the user starts gripping the grip part 103 is less than a certain arbitrary time (an elapsed time-use threshold value) (e.g., 3 seconds), the value of coefficient k is set to 0.5, and in the elapsed time from that time point, the value of coefficient k is set to 1.0. That is, a shift amount in a time slot (the time slot less than the elapsed time-use threshold value), i.e., from when the user starts gripping the grip part 103 until a certain time, is set to be smaller than the shift amount in other time slot (the time slot of the normal operation), e.g., half or less than that. This means that, in the time slot from when the user starts gripping the grip part 103 until a certain time, the tracking control is exerted at low speeds to the extent that the robot arm does not sharply move. As to the determination method of the arbitrary time (the elapsed time-use threshold value), it is determined by the value input to the control coefficient information acquiring unit 1602 from the input/output IF 1604 by the user using the input device 1604d such as a keyboard, a mouse, or a touch panel. Further, the value of coefficient k in each state is also determined by the value input from the input/output IF 1604 to the control coefficient information acquiring unit 1602 by the user using the input device 1604d such as a keyboard, a mouse, or a touch panel. Still further, as described above, the elapsed time from when the user starts gripping the grip part 103 is measured by the control coefficient information determining unit 1601 using the timer installed in the input/output IF 1604. In this manner, it is structured such that the control coefficient information determining unit 1601 determines the coefficient information so that the shift amount in the time slot (the time slot in which the values are less than the elapsed time-use threshold value) from when the user starts gripping the grip part 103 until a certain time becomes smaller than the shift amount in other time slot (the time slot in which the normal operation is performed). With such a structure, it becomes possible to prevent the manipulator 101 from sharply shifting immediately after the user starts gripping the grip part 103.

As to the determination method of the value of coefficient k in Equation (4), though the tracking control unit 1603 determines the value in accordance with the value input from the input/output IF 608 in the first embodiment, the tracking control unit 1603 determines the value in accordance with the coefficient information input from the control coefficient information determining unit 1601 in the second embodiment.

In addition to the function described in the first embodiment, with the input/output IF 1604, the elapsed time from when the user starts gripping the grip part 103 for the control coefficient information acquiring unit 1602 to switch the value of coefficient k to any numerical value stored in the database in FIG. 17 can be input by the user using the input/output IF 1604. The input time is output from the input/output IF 1604 to the control coefficient information acquiring unit 1602. Further, the values of coefficients k in various states shown in FIG. 17 can be input to the input/output IF 1604 by the user using the input device 1604*d* such as a keyboard, a mouse, or a touch panel, and the values of coefficients k input to the input/output IF 1604 are output from the input/output IF 1604 to the control coefficient information acquiring unit 1602.

FIGS. 18A to 18E show the procedure of the manipulator 101 performing tracking, when the user and the manipulator 101 cooperatively convey the target object 1101. The hand 1015 is attached to the arm end part of the manipulator 101, e.g., at the leading end 1002*a*, and the hand 1015 is caused to grip the target object 1101. Thereafter, the state transits in an order of FIG. 18A→FIG. 18B→FIG. 18C→FIG. 18D→FIG. 18E.

Figure 18A:
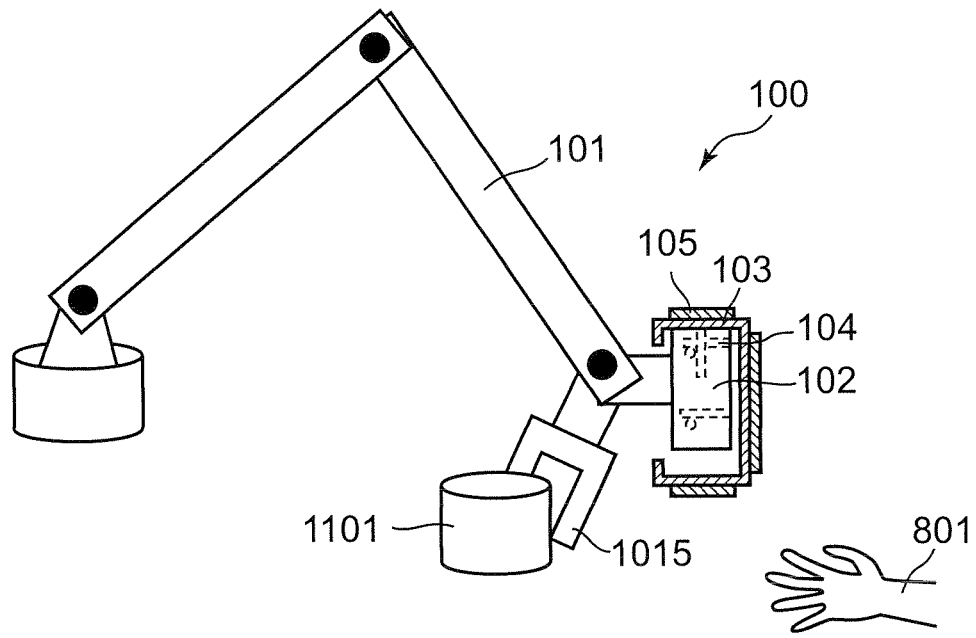
FIG. 18A is an explanatory view of cooperative conveyance using the robot arm in the robot according to the second embodiment of the present disclosure.

Firstly, FIG. 18A shows the state where the user's hand 801 is not gripping the grip part 103, and the manipulator 101 is stopped. Here, the grip part 103 is hooked by the end effector 102. In other words, the upper side face part 103*b* of the grip part 103 in FIG. 18A and the side face part 102*b* of the end effector 102 opposing to the upper side face part 103*b* are in contact with each other, and the interval of the clearance 90 between the upper side face part 103*b* and the side face part 102*b* is 0. Conversely, in FIG. 18A, the interval between the lower side face part 103*b* of the grip part 103 and the side face part 102*b* of the end effector 102 opposing to the lower side face part 103*b* is wide.

Figure 18B:
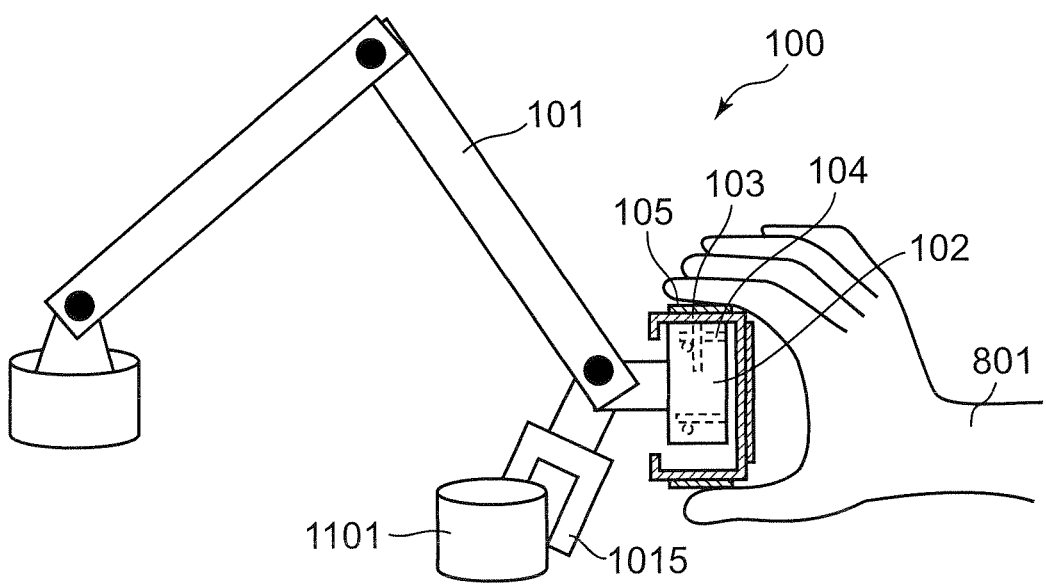
FIG. 18B is an explanatory view of cooperative conveyance using the robot arm in the robot according to the second embodiment of the present disclosure.

Next, FIG. 18B shows the standby state where the user's hand 801 is gripping the grip part 103; which is the moment at which the grip detecting unit 611 detects "gripping"; and the manipulator 101 can be caused by the control device 602 to perform tracking control.

Figure 18C:
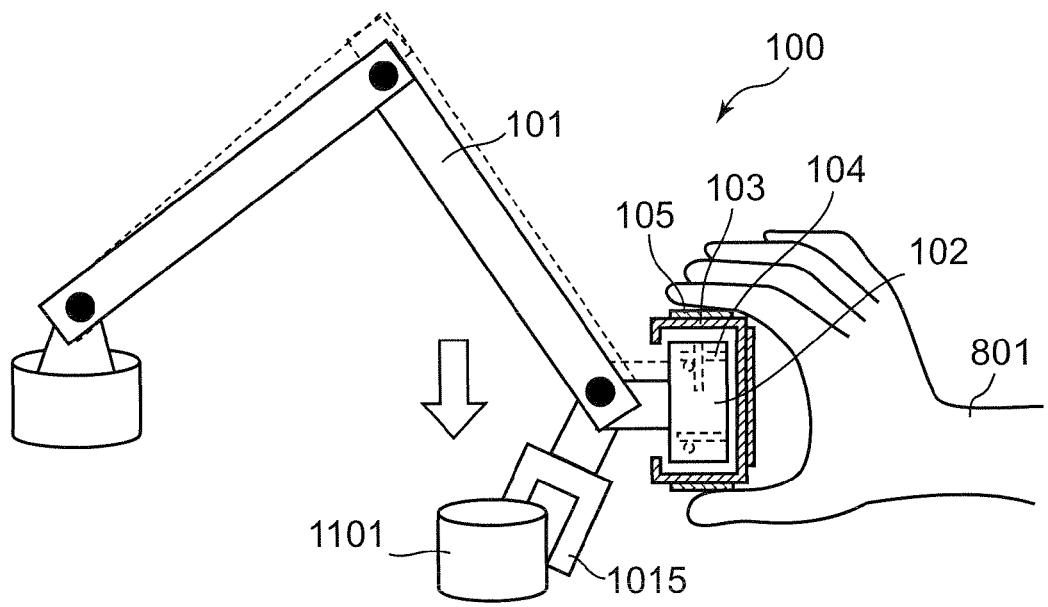
FIG. 18C is an explanatory view of cooperative conveyance using the robot arm in the robot according to the second embodiment of the present disclosure.

Next, FIG. 18C shows the state immediately after a gripping of the user's hand 801 is detected; and the manipulator 101 is caused by the control device 602 to slowly perform tracking control.

Figure 18D:
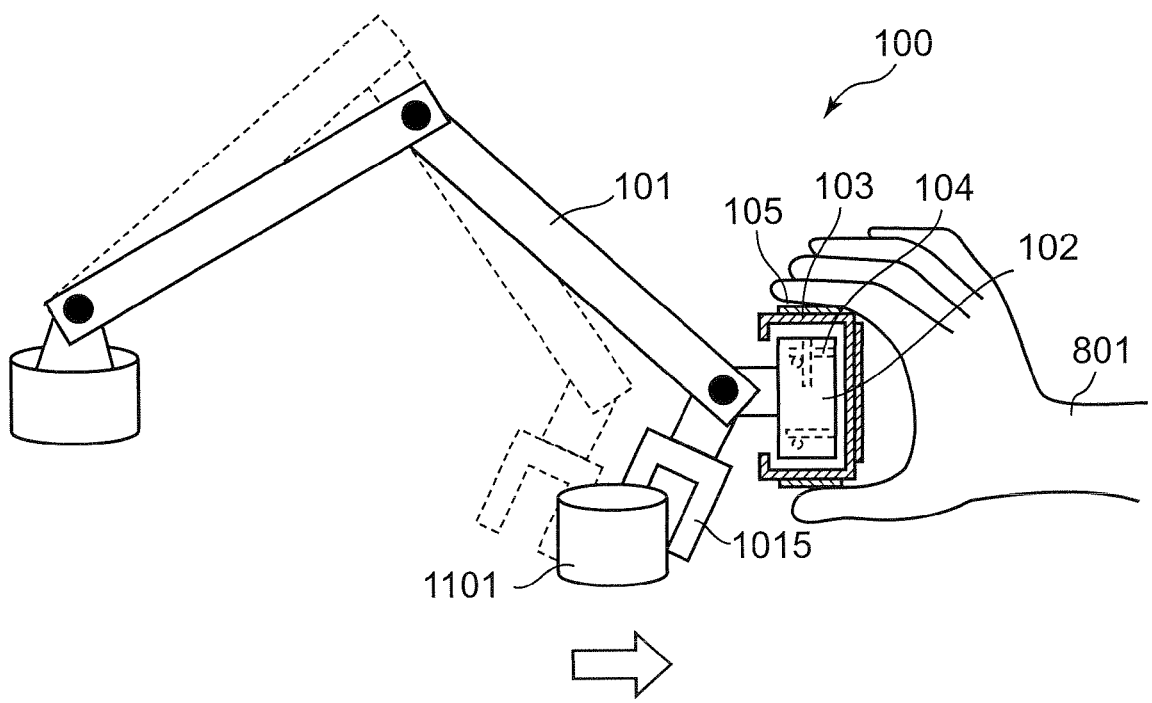
FIG. 18D is an explanatory view of cooperative conveyance using the robot arm in the robot according to the second embodiment of the present disclosure.

Next, FIG. 18D shows the state where time of 3 seconds or more has elapsed since the gripping of the user's hand 801 is detected; and the manipulator 101 is caused by the control device 602 to quickly perform tracking control.

Figure 18E:
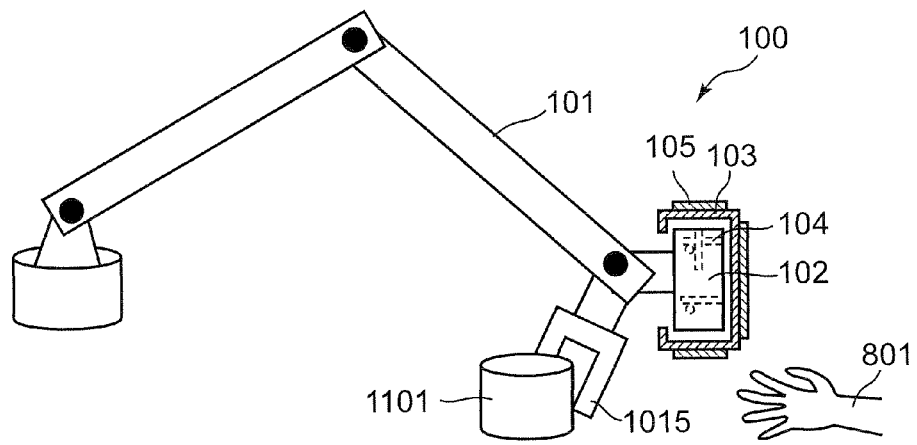
FIG. 18E is an explanatory view of cooperative conveyance using the robot arm in the robot according to the second embodiment of the present disclosure.

Next, FIG. 18E shows the state where the user's hand 801 is not gripping the grip part 103, and the manipulator 101 is stopped.

Figure 19:
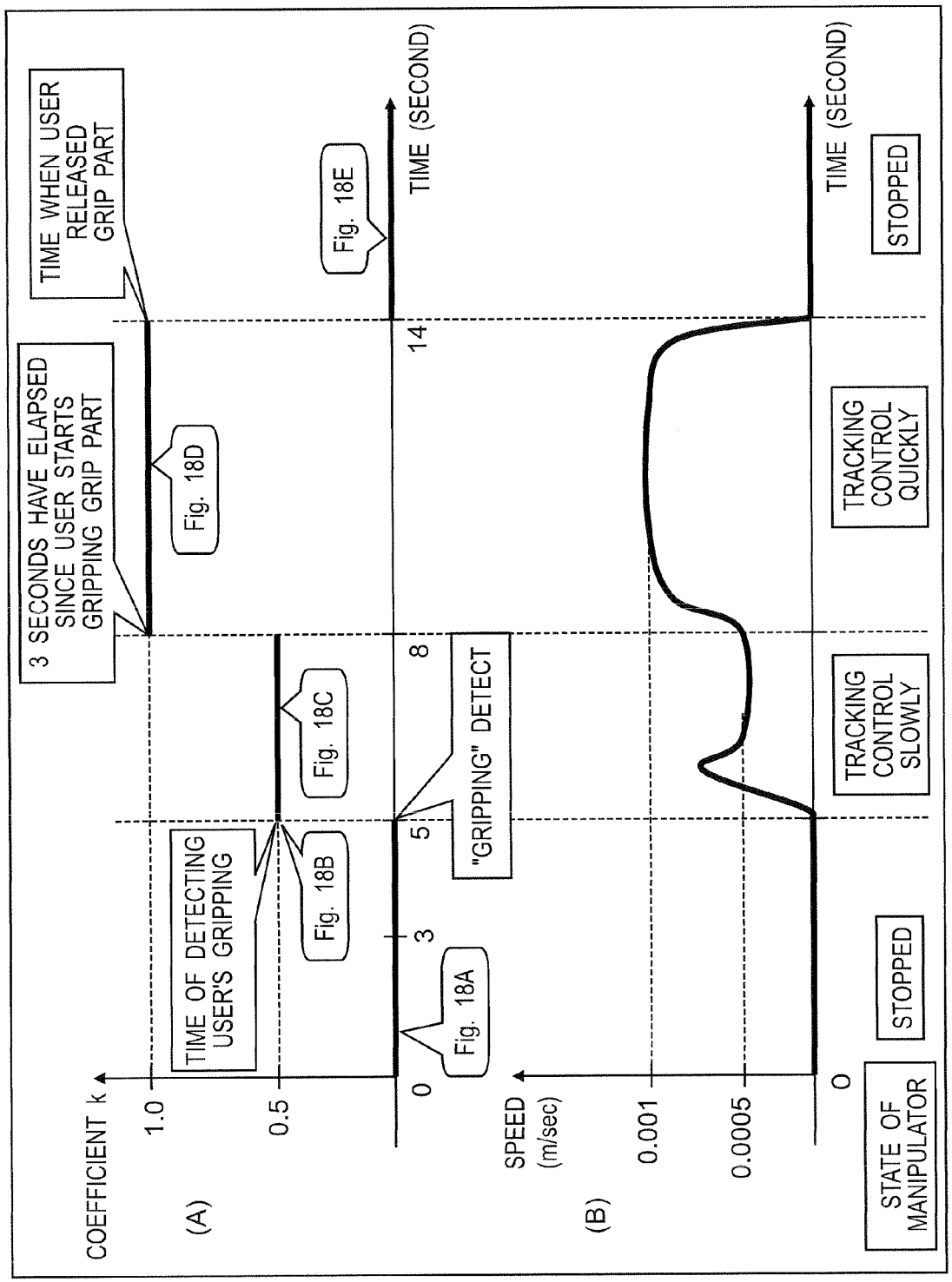
FIG. 19 is an explanatory view of cooperative conveyance using the robot arm in the robot according to the second embodiment of the present disclosure, in which FIG. 19 (A) is an explanatory view of the relationship between the time and coefficient of cooperative conveyance using the robot arm in the robot according to the second embodiment of the present disclosure, and FIG. 19 (B) is an explanatory view of the relationship between the time and speed of cooperative conveyance using the robot arm in the robot according to the second embodiment of the present disclosure.

The graph (A) on the top side in FIG. 19 shows the relationship between time and the value of coefficient k in FIGS. 18A to 18E. The horizontal axis indicates time (second), and the vertical axis indicates the value of coefficient k. The bold line on the graph represents the value of coefficient k to time. The graph (B) on the lower side in FIG. 19 shows the relationship between the time and speed of the arm end position of the manipulator 101 shown in FIGS. 18A to 18E. The horizontal axis represents time (second) and the vertical axis represents the speed of the arm end position of the manipulator 101. The bold line on the graph represents the speed to time. Further, under the horizontal axis, the state of the manipulator at the corresponding time is shown. From the graph (A) and graph (B) in FIG. 19, it can be seen that, during the 3 seconds immediately after a gripping of the grip part 103 by the user is detected, the manipulator 101 slowly performs tracking control. Comparing to FIG. 15, it can be seen that the speed of the arm end position of the manipulator 101 immediately after a gripping of the grip part 103 by the user is detected is small.

Figure 20:
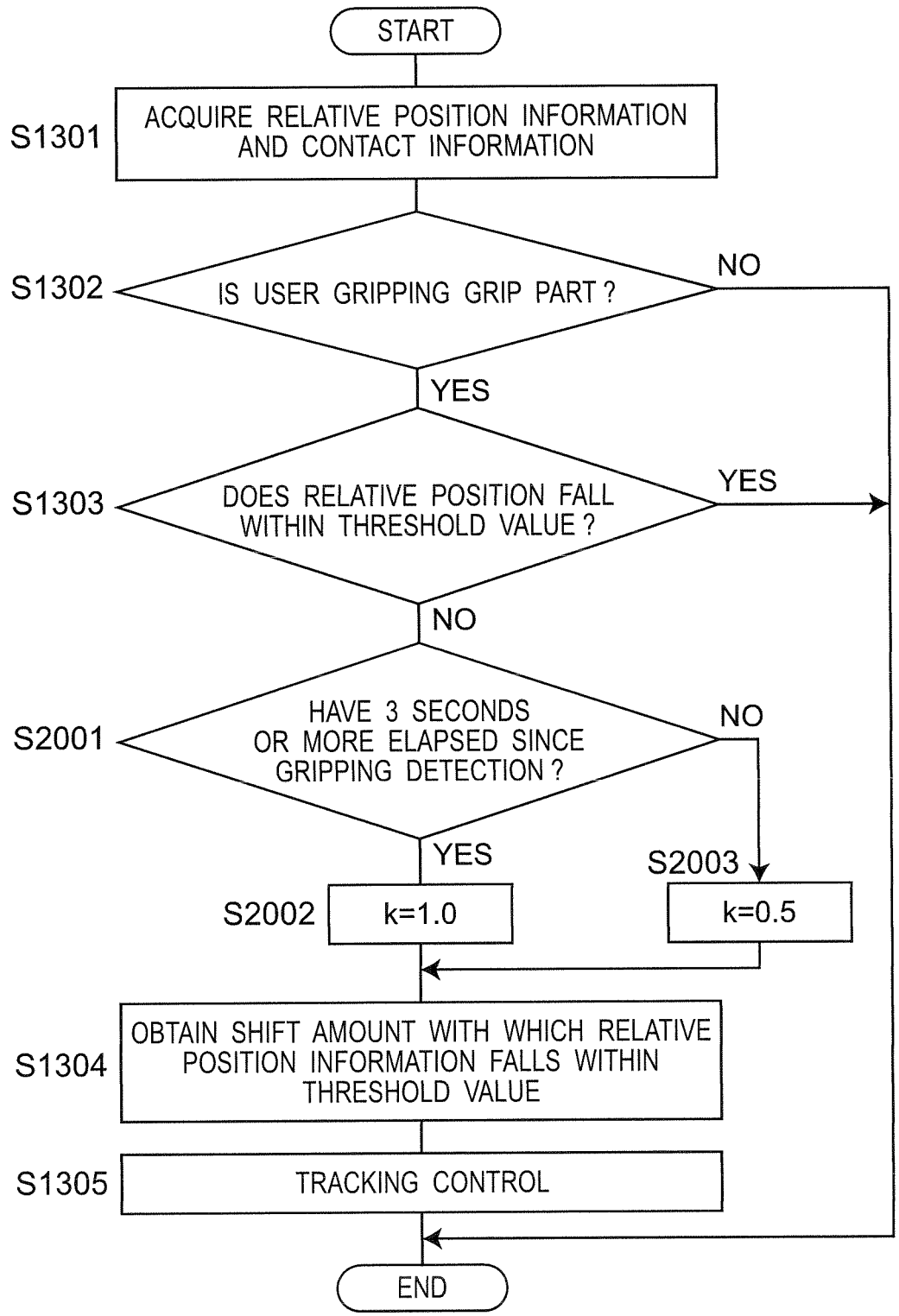
FIG. 20 is a flowchart showing the flow of processing starting from acquiring the relative position information and the contact information until exerting tracking control in the robot according to the second embodiment of the present disclosure.

With reference to the flowchart of FIG. 20, a description will be given of the operation procedure of the control device 602 of the robot arm 100 in the robot 601 according to the second embodiment.

In Step S1301, the relative position information acquiring unit 607 acquires relative position information of the grip part 103 to the end effector 102. The contact information acquiring unit 610 acquires contact information from the outside of the contact sensors 105 via the input/output IF 1604.

In Step S1302, the grip detecting unit 611 detects whether the user is gripping the grip part 103, based on the contact information acquired from the contact information acquiring unit 610. The result detected by the grip detecting unit 611 is output to the tracking control switching unit 612 and the control coefficient information determining unit 1601. When the grip detecting unit 611 detects that the user is gripping the grip part 103, the procedure proceeds to Step S1303. When the grip detecting unit 611 detects that the user is not gripping the grip part 103, the flow ends.

In Step S1303, the tracking control unit 606 determines whether the relative position information acquired from the relative position information acquiring unit 607 falls within the prescribed threshold value range. When the tracking control unit 606 determines that the relative position information falls within the threshold value range, the flow ends. When the tracking control unit 606 determines that the relative position information does not fall within the threshold value range, the procedure proceeds to Step S2001.

In Step S2001, the control coefficient information determining unit 1601 determines whether 3 seconds or more have elapsed since the detection of the gripping of the user, based on the grip information acquired by the grip detecting unit 611. When the control coefficient information determining unit 1601 determines that 3 seconds or more have elapsed since the detection of the gripping of the user, the procedure proceeds to Step S2002. When the control coefficient information determining unit 1601 determines that 3 seconds or more have not elapsed since the detection of the gripping of the user, the procedure proceeds to Step S2003.

In Step S2002, the control coefficient information determining unit 1601 sets the value of coefficient k relating to the shift amount in Equation (4) to 1.0, and the procedure proceeds to Step S1304.

In Step S2003, the control coefficient information determining unit 1601 sets the value of coefficient k relating to the shift amount in Equation (4) to 0.5, and the procedure proceeds to Step S1304.

In Step S1304, the tracking control unit 606 obtains the shift amount with which the relative position information exceeding the threshold value range falls within the threshold value. The shift amount obtained by the tracking control unit 606 is output from the tracking control unit 606 to the control unit 605, and the procedure proceeds to Step S1305.

In Step S1305, the control unit 605 exerts tracking control over the manipulator 101 based on the shift amount acquired from the tracking control unit 606, and the flow ends.

According to the second embodiment, in addition to the operation and effect of the first embodiment, by the manipulator 101 slowly performing the tracking control during a certain time from when the user starts gripping the grip part 103, it becomes possible to prevent the manipulator 101 from sharply shifting when tracking control is started, and hence safety can be improved.

(Third Embodiment)

In the following, a description will be given of a robot according to a third embodiment of the present disclosure.

In the second embodiment, by the control device 602 causing the manipulator 101 to perform tracking control slowly during a certain time from when the user starts gripping the grip part 103, safety at the start of tracking control is improved.

However, when the tracking control ends, the grip part 103 may fall and hit the end effector 102 hardly.

Figure 21A:
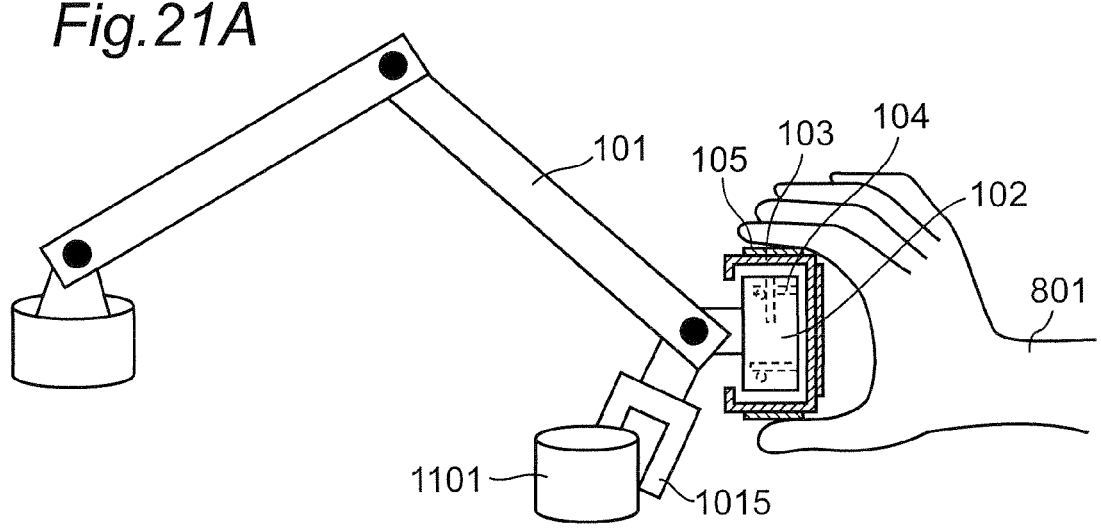
FIG. 21A is an explanatory view at the time of ending cooperative conveyance using the robot arm in the robot according to the second embodiment of the present disclosure.
Figure 21B:
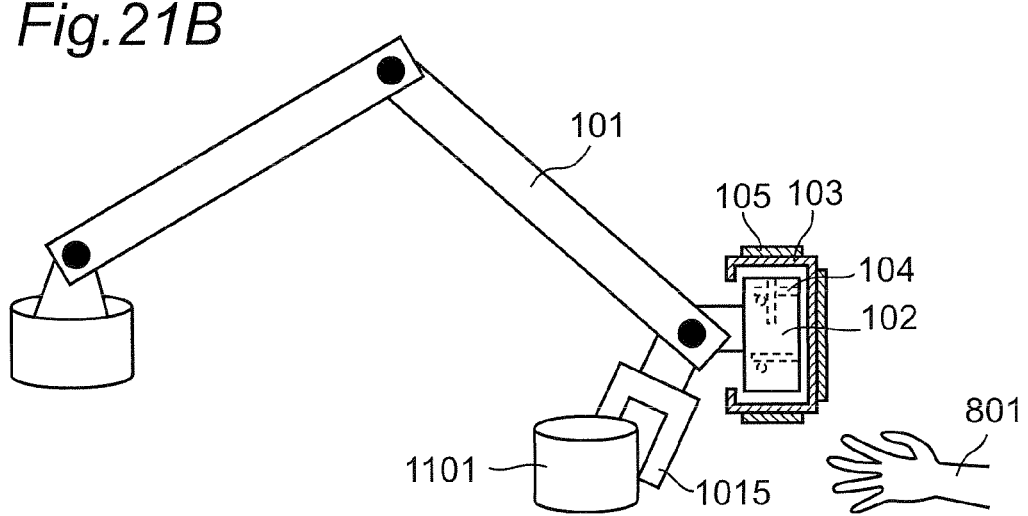
FIG. 21B is an explanatory view at the time of ending cooperative conveyance using the robot arm in the robot according to the second embodiment of the present disclosure.
Figure 21C:
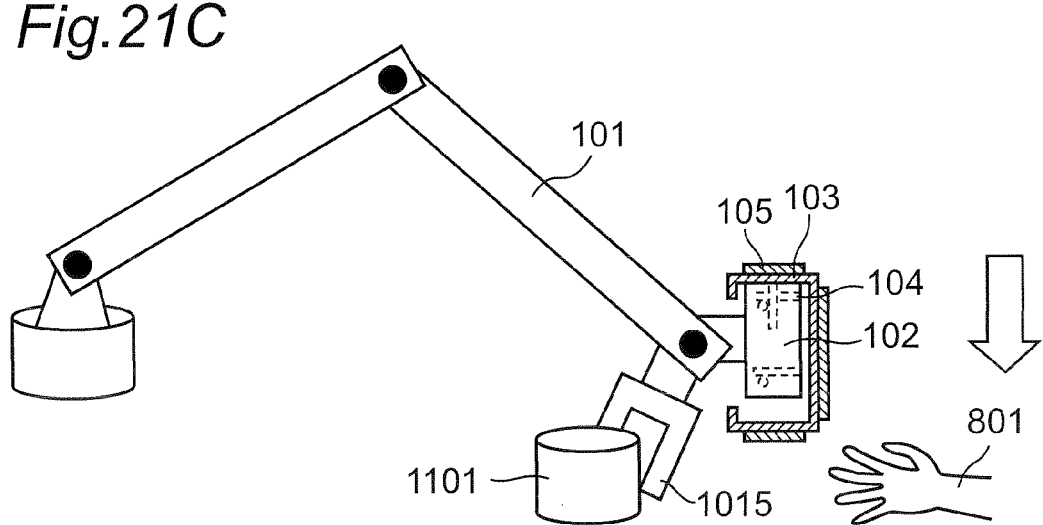
FIG. 21C is an explanatory view at the time of ending cooperative conveyance using the robot arm in the robot according to the second embodiment of the present disclosure.

This state will be described using FIGS. 21A to 21C. FIGS. 21A to 21C show the procedure of the manipulator 101 performing the tracking when the user and the manipulator 101 cooperatively convey the target object 1101. The state transits in an order of FIG. 21A→FIG. 21B→FIG. 21C.

Firstly, FIG. 21A shows the state where the user's hand 801 is gripping the grip part 103 and the manipulator 101 is performing tracking control.

Next, FIG. 21B shows the state of the moment when the user's hand 801 releases the grip part 103, and the manipulator 101 is stopped.

Next, FIG. 21C shows the state immediately after the user's hand 801 releases the grip part 103, and the grip part 103 falls and the grip part 103 hits the end effector 102 hardly.

As described above, in the case where the relative position Δr of the grip part 103 to the end effector 102 is not 0 when the user releases the grip part 103, the grip part 103 may fall and hit the end effector 102 hardly. Accordingly, the third embodiment addresses this issue. That is, in the case where the relative position Δr is not 0 when tracking control is started, irrespective of the magnitude of the relative position Δr, it is highly possible that, immediately after the user's hand 801 releases the grip part 103, the grip part 103 drops and hits the end effector 102 hardly, causing a dangerous situation. Addressing thereto, in the third embodiment, when the relative position Δr is 0, tracking control is slowly performed immediately after the user's hand 801 releases the grip part 103. Thus, the dangerous situation described above can be avoided, and safety is improved.

Figure 22A:
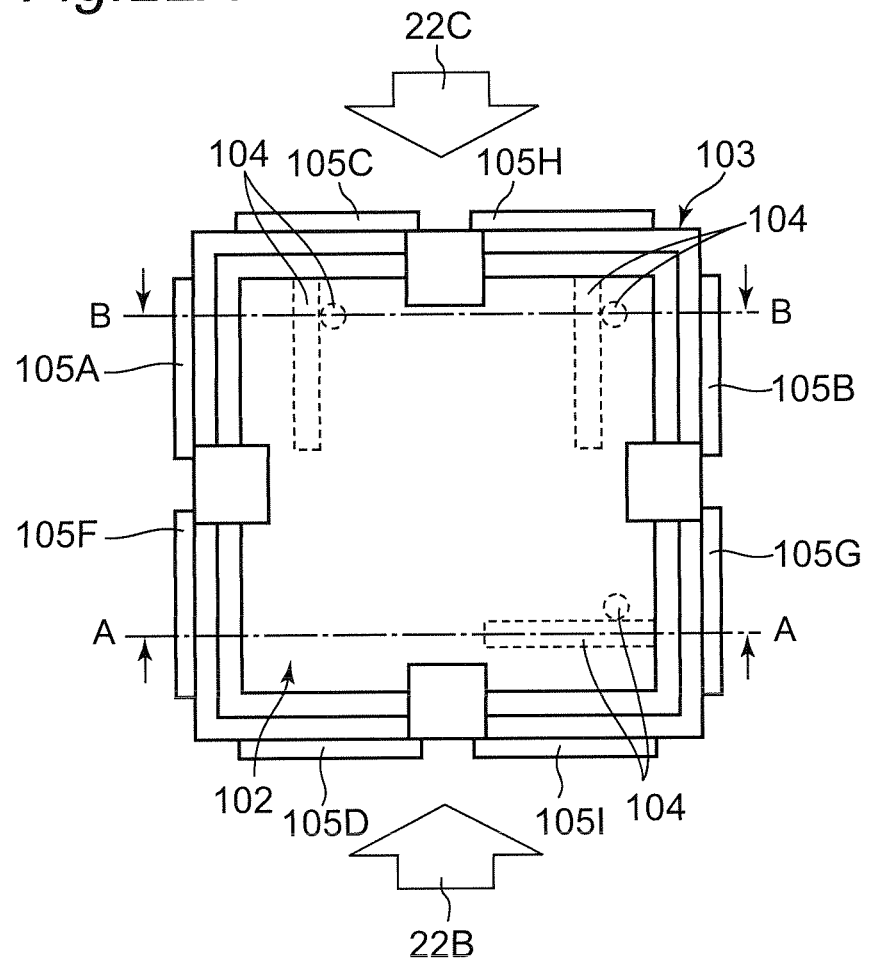
FIG. 22A is a plan view of an end effector, a grip part, relative position sensors, and contact sensors in a robot according to the third embodiment of the present disclosure.
Figure 22B:
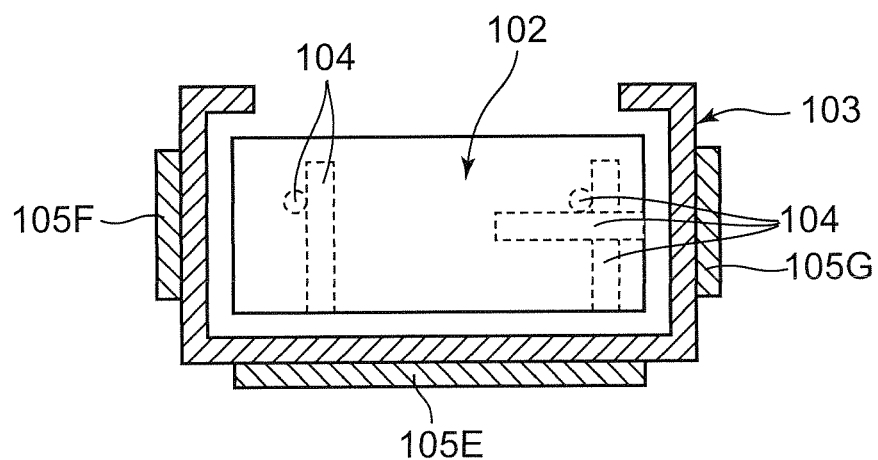
FIG. 22B is a cross-sectional view of the end effector, the grip part, the relative position sensors, and the contact sensors in the robot according to the third embodiment of the present disclosure.
Figure 22C:
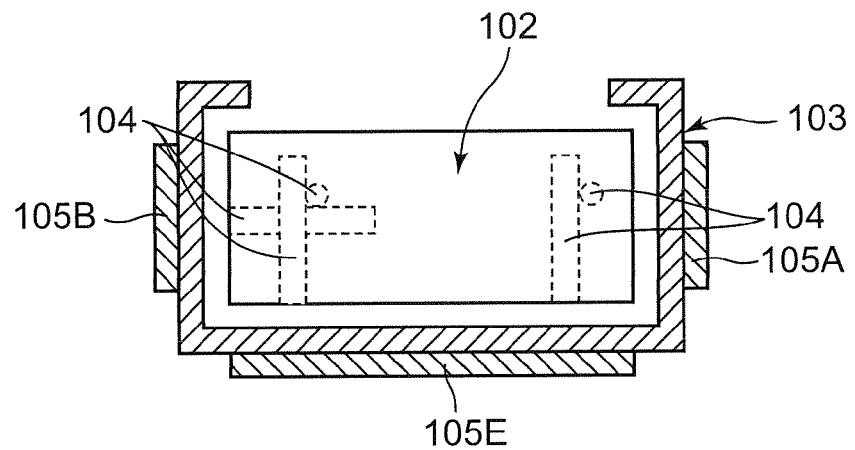
FIG. 22C is across-sectional view of the end effector, the grip part, the relative position sensors, and the contact sensors in the robot according to the third embodiment of the present disclosure.
Figure 23A:
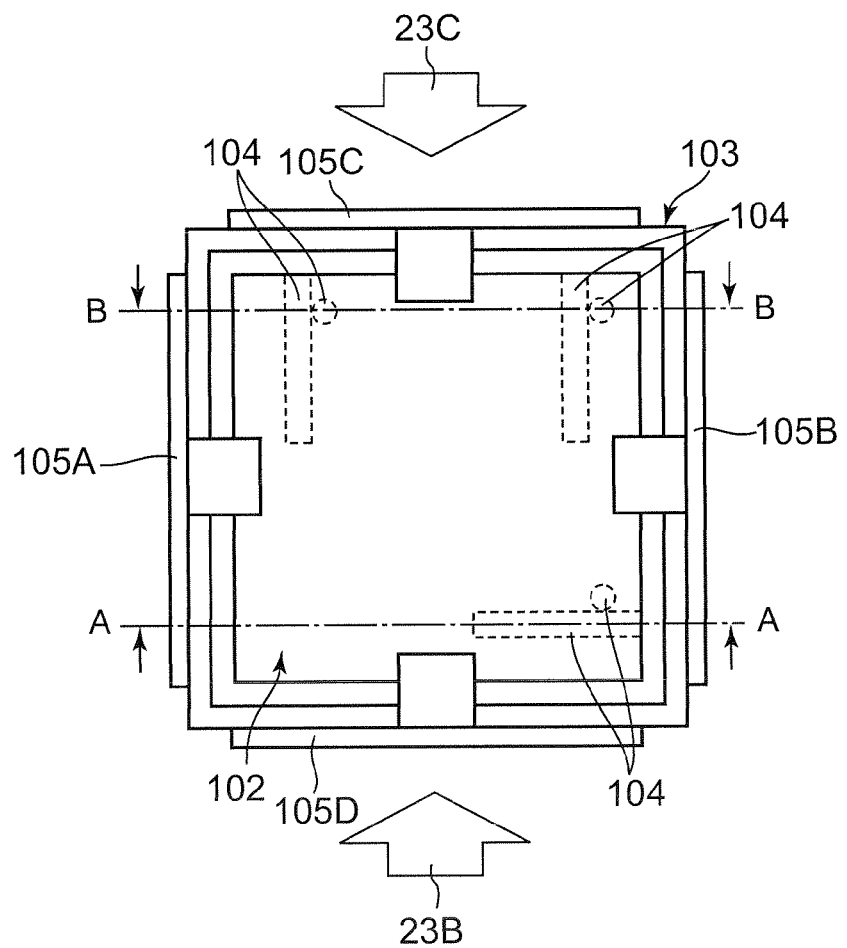
FIG. 23A is a plan view of the end effector, the grip part, the relative position sensors, and the contact sensors in the robot according to the third embodiment of the present disclosure being different from FIG. 22A.
Figure 23B:
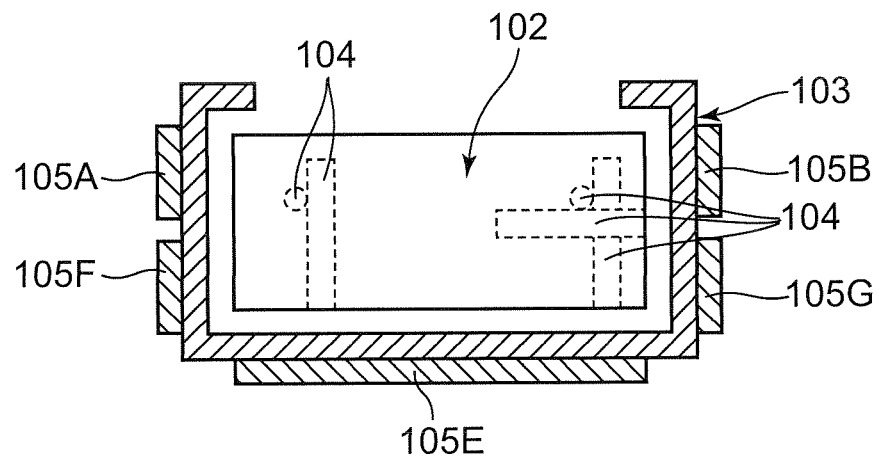
FIG. 23B is a cross-sectional view of the end effector, the grip part, the relative position sensors, and the contact sensors in the robot according to the third embodiment of the present disclosure being different from FIG. 22B.
Figure 23C:
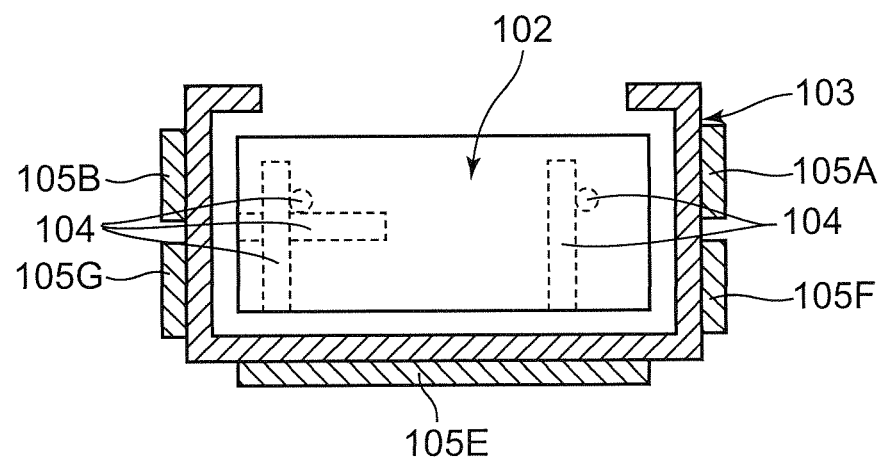
FIG. 23C is a cross-sectional view of the end effector, the grip part, the relative position sensors, and the contact sensors in the robot according to the third embodiment of the present disclosure being different from FIG. 22C.

FIG. 22A is a plan view of the end effector 102, the grip part 103, the relative position sensors 104, and the contact sensors 105 in the robot 601 according to the third embodiment of the present disclosure. FIG. 22B is a cross-sectional view of the end effector 102, the grip part 103, the relative position sensors 104, and the contact sensors 105 in the robot according to the third embodiment of the present disclosure taken along line A-A in FIG. 22A and as seen from arrow 22B. FIG. 22C is a cross-sectional view of the end effector 102, the grip part 103, the relative position sensors 104, and the contact sensors 105 in the robot according to the third embodiment of the present disclosure taken along line B-B in FIG. 22A and as seen from arrow 22C. The difference from FIGS. 2A to 2C lies in that contact sensors 105F to 105I are added, as shown in FIGS. 22A to 22C. Further, in adding the contact sensors 105F to 105I, it is possible to employ the structure shown in FIGS. 23A to 23C. In other words, in place of arranging one rectangular plate-like contact sensor 105 at each of the rectangular side face parts 103b of the grip part 103 as in FIGS. 2A to 2C, two quadrangular plate-like contact sensors 105 are arranged adjacent to each other along the longitudinal direction and at each of the rectangular side face parts 103b of the grip part 103 in FIGS. 22A to 22C. In FIGS. 23A to 23C, two quadrangular plate-like contact sensors 105 are arranged adjacent to each other along the width direction and at each of the rectangular side face parts 103b of the grip part 103. It is to be noted that, in FIG. 23A, the contact sensor 105H and the contact sensor 105I are respectively arranged at the positions overlapping with the contact sensor 105B and the contact sensor 105D (the positions on the depth side in the direction penetrating through FIG. 23A).

Figure 24:
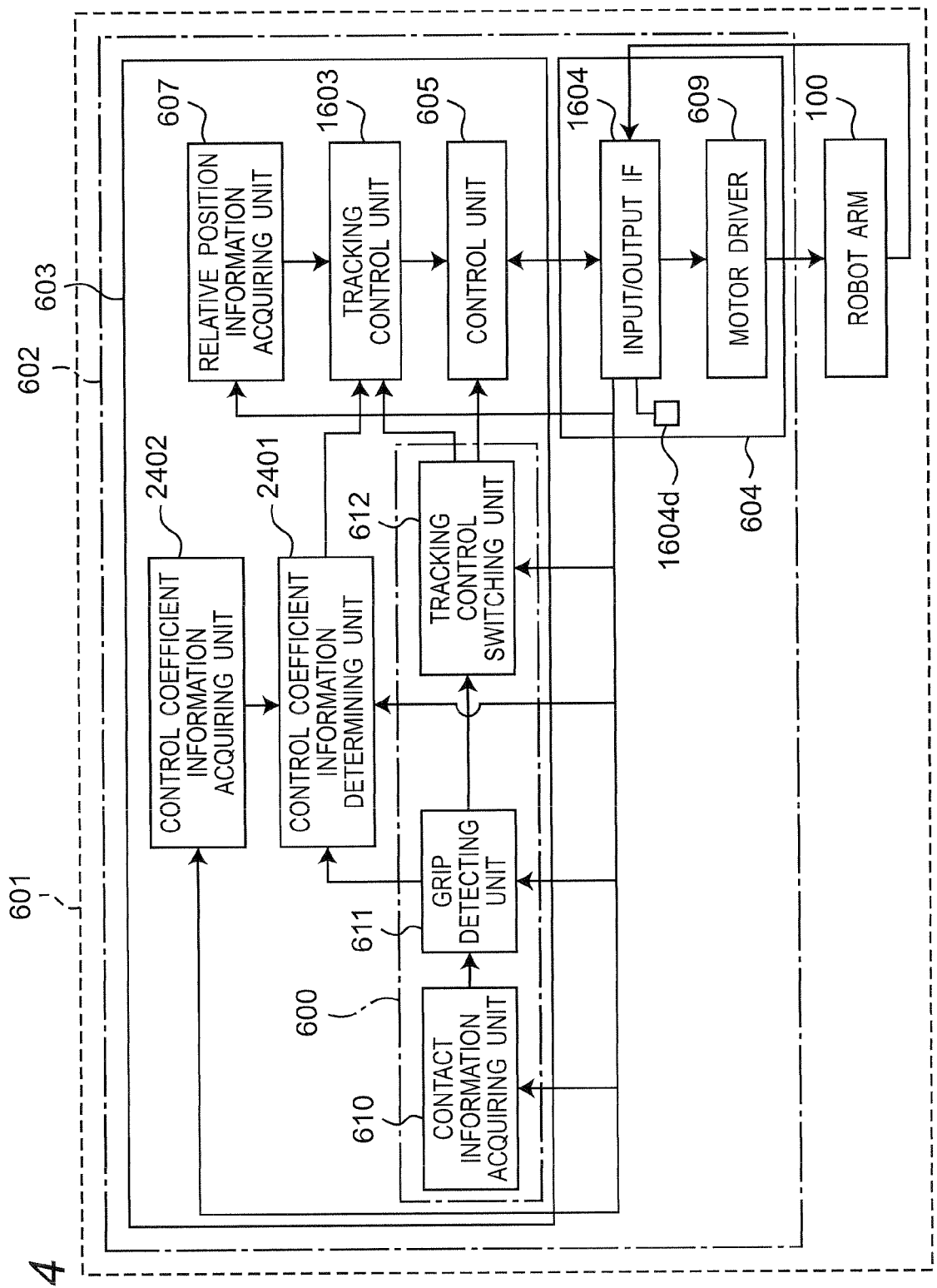
FIG. 24 is a block diagram of a robot arm in the robot according to the third embodiment of the present disclosure.

FIG. 24 is a block diagram of the robot arm 100 in the robot 601 according to the third embodiment of the present disclosure. Since the manipulator 101, the control unit 605, the relative position information acquiring unit 607, the motor driver 609, the contact information acquiring unit 610, the grip detecting unit 611, the tracking control switching unit 612, the tracking control unit 1603, and the input/output IF 1604 in the robot 601 according to the third embodiment of the present disclosure are identical to those in the second embodiment, common reference characters are allotted thereto and the description thereof will not be repeated. In the following, a detailed description will be given solely of the different parts.

A control coefficient information determining unit 2401 determines the coefficient information in accordance with the grip information input from the grip detecting unit 611. Here, similarly to the control coefficient information determining unit 1601, the coefficient information represents the value of coefficient k in Equation (4). From Equation (4), when the value of coefficient k becomes great, the shift amount for every certain time (e.g., every 1 msec) when the manipulator 101 is performing tracking control becomes great. On the other hand, when the value of coefficient k becomes small, the shift amount for every certain time when the manipulator 101 is performing tracking control becomes small. The coefficient information determination method is as follows. Firstly, the grip detecting unit 611 detects whether the user is gripping the grip part 103. Then, when the grip detecting unit 611 detects that the user is gripping the grip part 103, the value of coefficient is changed in accordance with the position of the "in contact" contact sensor 105 as to the grip information which is input from the grip detecting unit 611 and represented in FIG. 7. The specific method of determining the value will be described with reference to FIG. 25. Here, the database shown in FIG. 25 is structured by the control coefficient information acquiring unit 2402 acquiring the associated information in which information as to whether the user is gripping the grip part 103, the position where the user grips the grip part 103, and the control coefficient information (e.g., value of control coefficient) are associated with one another, and storing in the inner storage unit in the control coefficient information acquiring unit 2402. It is to be noted that, in FIG. 25, the combination of the contact sensors 105 not opposing to each other is the case where the user is not gripping the grip part 103.

Figure 26A:
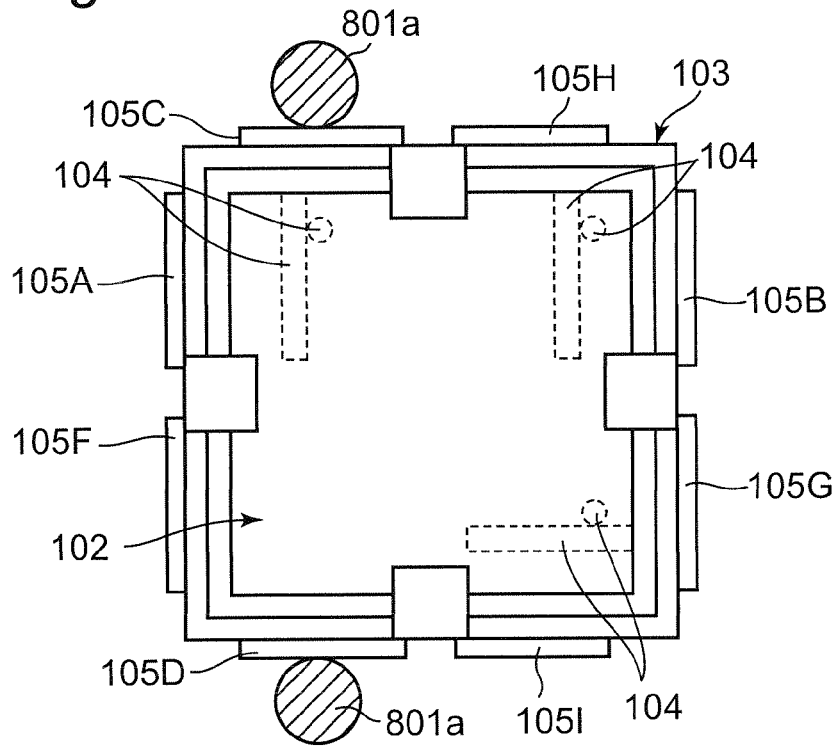
FIG. 26A is an explanatory view of a gripping method of the grip part in the robot according to the third embodiment of the present disclosure.
Figure 26B:
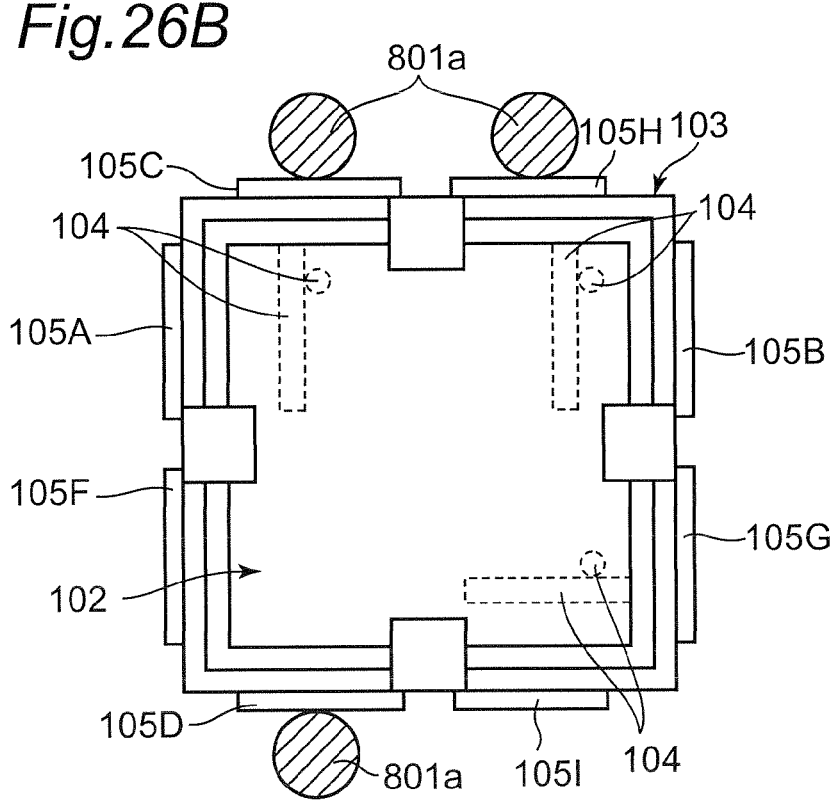
FIG. 26B is an explanatory view of the gripping method of the grip part in the robot according to the third embodiment of the present disclosure.

Specifically, when the user is not gripping the grip part 103, the value of coefficient k is set to 0.0. In the case where the user is gripping the grip part 103, when two contact sensors 105 opposing to each other (e.g., the contact sensor 105A and the contact sensor 105B, the contact sensor 105C and the contact sensor 105D, the contact sensor 105F and the contact sensor 105G, or the contact sensor 105H and the contact sensor 105I) are both "in contact" (output: 1) and only the combination of these contact sensors 105 is involved with gripping, the value of coefficient k is set to 0.5. When the two opposing contact sensors 105 and at least one other contact sensor 105 are "in contact" (output: 1) and the combination of these contact sensors 105 is involved with gripping, the value of coefficient k is set to 1.0. That is, the shift amount in the state where the two opposing contact sensors 105 are "in contact" (output: 1) and the user is gripping the opposing two side face parts 103b of the grip part 103 is smaller than the shift amount in the state where the two opposing contact sensors 105 and other at least one contact sensor 105 are "in contact" (output: 1) and the user is gripping other side face part 103b, in addition to the two opposing side face parts 103b of the grip part 103. For example, it is approximately half or less as great as the former shift amount. This means that, when the state transits from the situation where the user is gripping other side face part 103b in addition to the two opposing side face parts 103b of the grip part 103 to the situation where the user is gripping the two opposing side face parts 103b of the grip part 103, tracking control is performed at low speeds to the extent that the robot arm does not sharply move. The value of coefficient k in each situation is determined by the value input from the input/output IF 1604 by the user using the input device 1604d such as a keyboard, a mouse, or a touch panel. In this manner, by determining the coefficient information such that shift amount in the situation where the user is gripping the opposing two side face parts 103b of the grip part 103 becomes smaller than the shift amount in the situation where the user is gripping other side face part 103b in addition to the two opposing side face parts 103b of the grip part 103, in the situation where only the two opposing contact sensors 105 are gripped, the control device 602 causes the manipulator 101 to slowly perform tracking control; in the situation where the user is gripping the two opposing contact sensors 105 and other at least one contact sensor 105, the control device 602 causes the manipulator 101 to quickly perform tracking control. The method of changing the coefficient in this manner will be described with reference to FIGS. 26A and 26B. When the fingers 801a are in contact with only the contact sensor 105C and the contact sensor 105D in the situation where the grip part 103 is gripped by the user's hand 801, the control device 602 causes the manipulator 101 to slowly perform tracking control (see FIG. 26A). When the fingers 801a are in contact with the contact sensor 105C, the contact sensor 105D, and the contact sensor 105H in the situation where the grip part 103 is gripped by the user's hand 801, the control device 602 causes the manipulator 101 to quickly perform tracking control (see FIG. 26B).

FIGS. 27A to 27G show the procedure of the control device 602 causing the manipulator 101 to perform tracking when the user and the manipulator 101 cooperatively convey the target object 1101. The hand 1015 is attached to the arm end part of the manipulator 101, e.g., at the leading end 1002a, and the hand 1015 is caused to grip the target object 1101. Thereafter, the state transits in an order of FIG. 27A→FIG. 27B→FIG. 27C→FIG. 27D→FIG. 27E→FIG. 27F→FIG. 27G. Further, the gripping method of the user's hand 801 to the grip part 103 in each state is shown in FIGS. 27H to 27N.

Figure 27A:
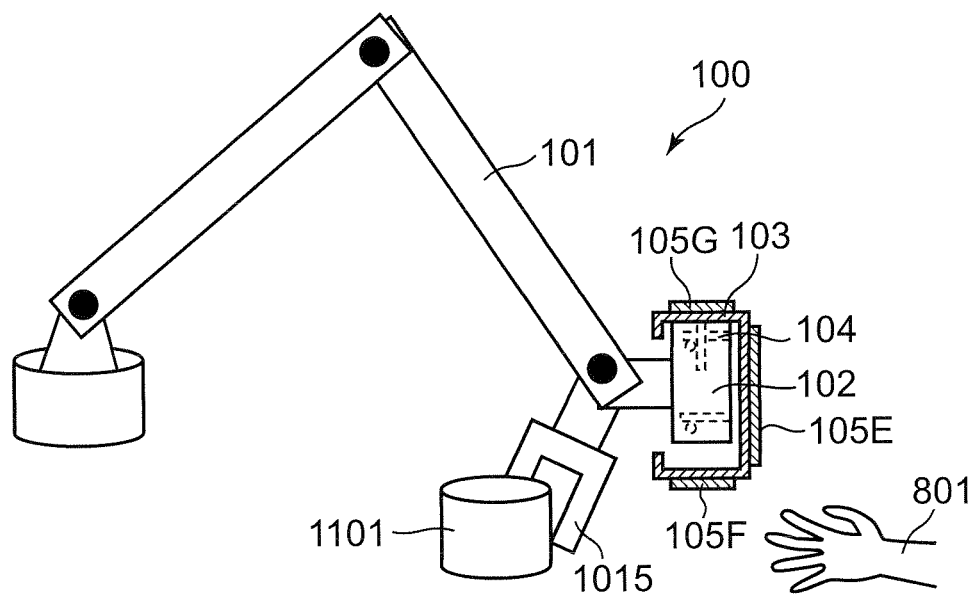
FIG. 27A is an explanatory view of cooperative conveyance using the robot arm in the robot according to the third embodiment of the present disclosure.
Figure 27B:
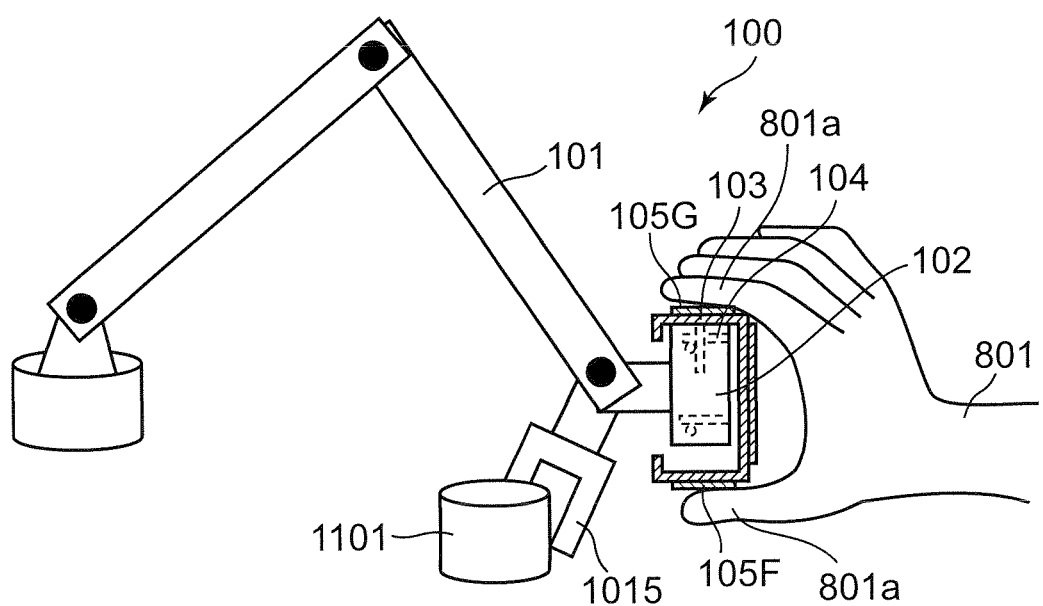
FIG. 27B is an explanatory view of cooperative conveyance using the robot arm in the robot according to the third embodiment of the present disclosure.
Figure 27C:
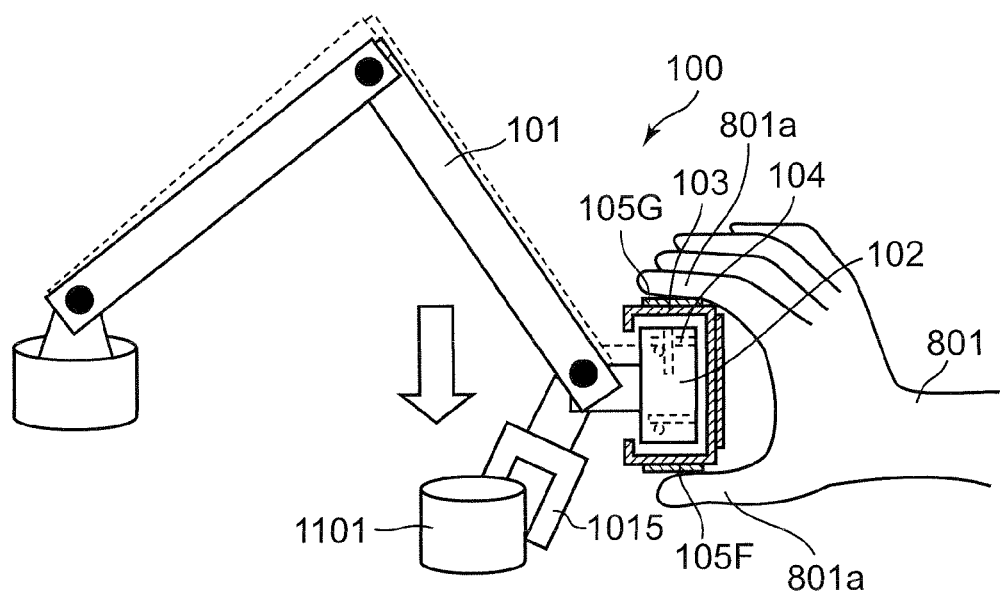
FIG. 27C is an explanatory view of cooperative conveyance using the robot arm in the robot according to the third embodiment of the present disclosure.
Figure 27D:
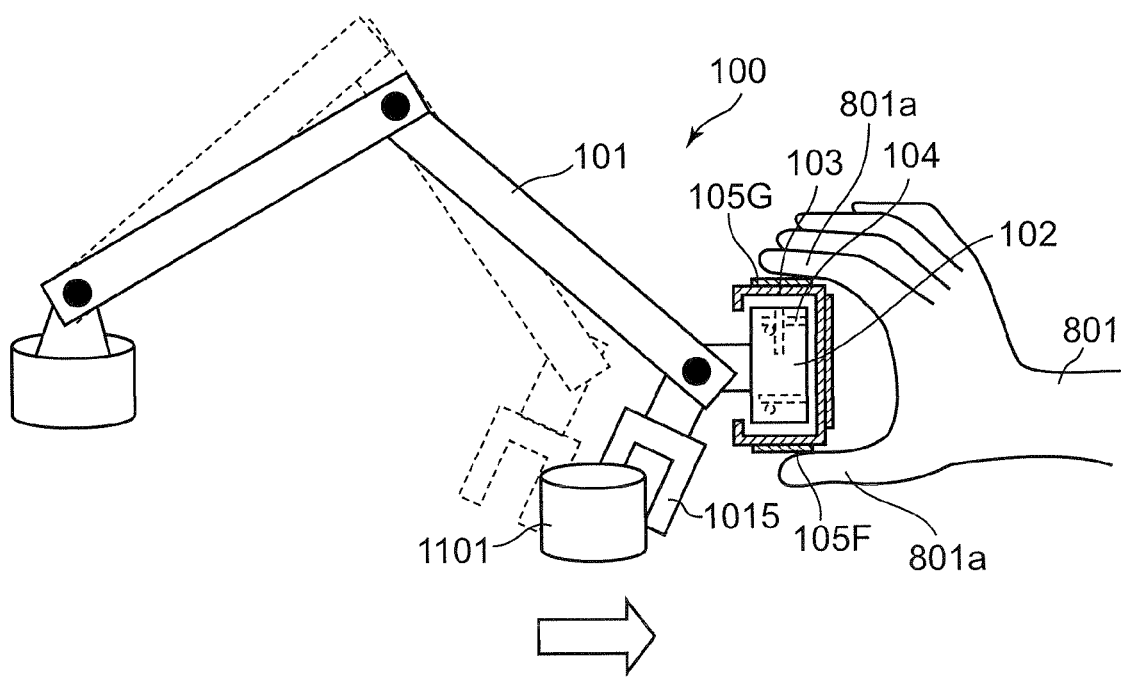
FIG. 27D is an explanatory view of cooperative conveyance using the robot arm in the robot according to the third embodiment of the present disclosure.
Figure 27E:
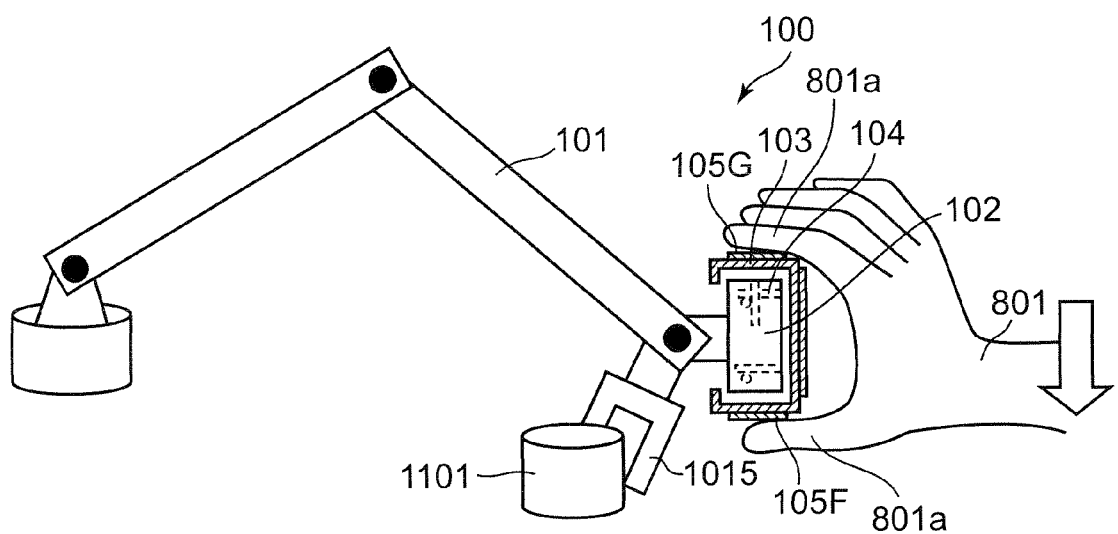
FIG. 27E is an explanatory view of cooperative conveyance using the robot arm in the robot according to the third embodiment of the present disclosure.
Figure 27F:
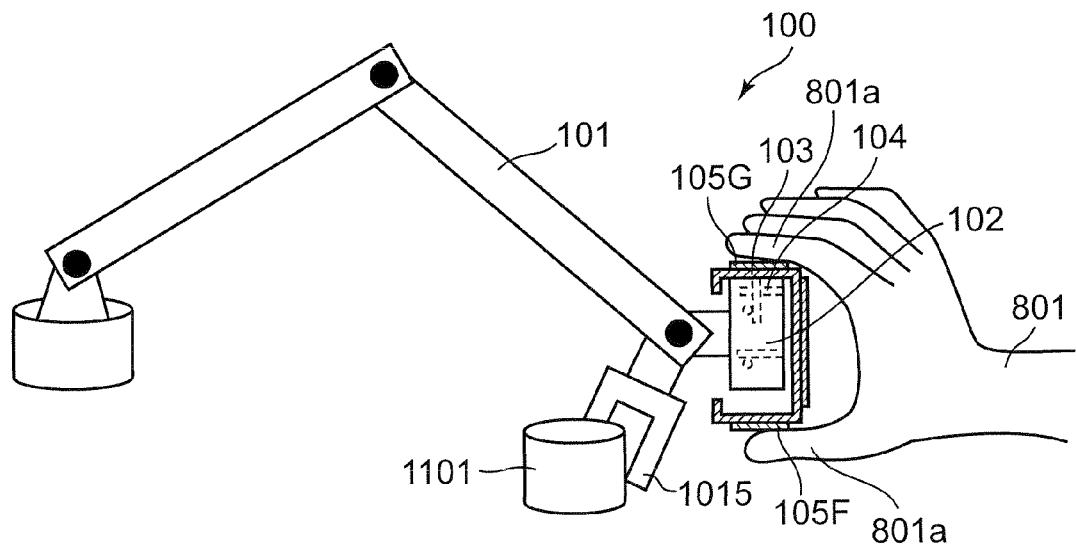
FIG. 27F is an explanatory view of cooperative conveyance using the robot arm in the robot according to the third embodiment of the present disclosure.
Figure 27G:
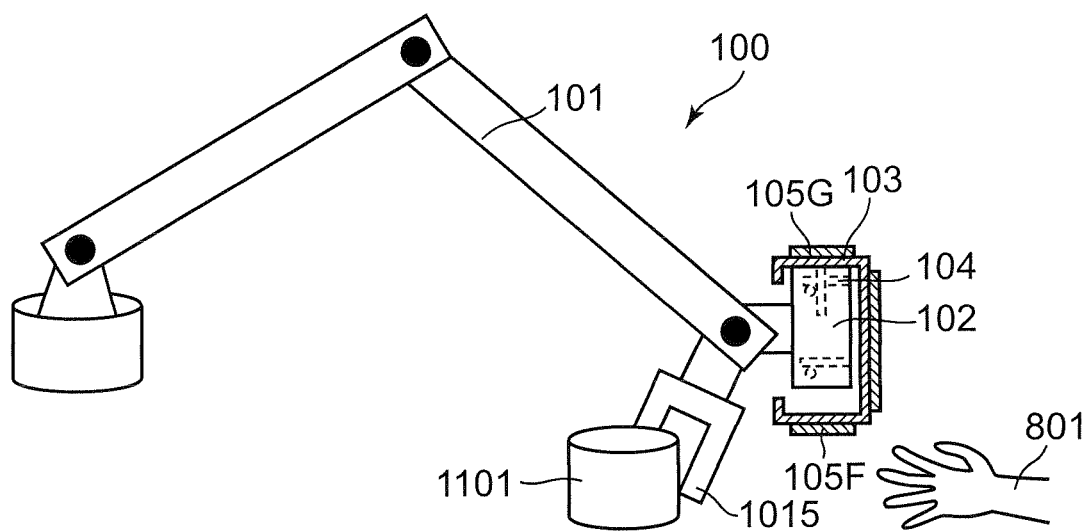
FIG. 27G is an explanatory view of cooperative conveyance using the robot arm in the robot according to the third embodiment of the present disclosure.
Figure 27H:
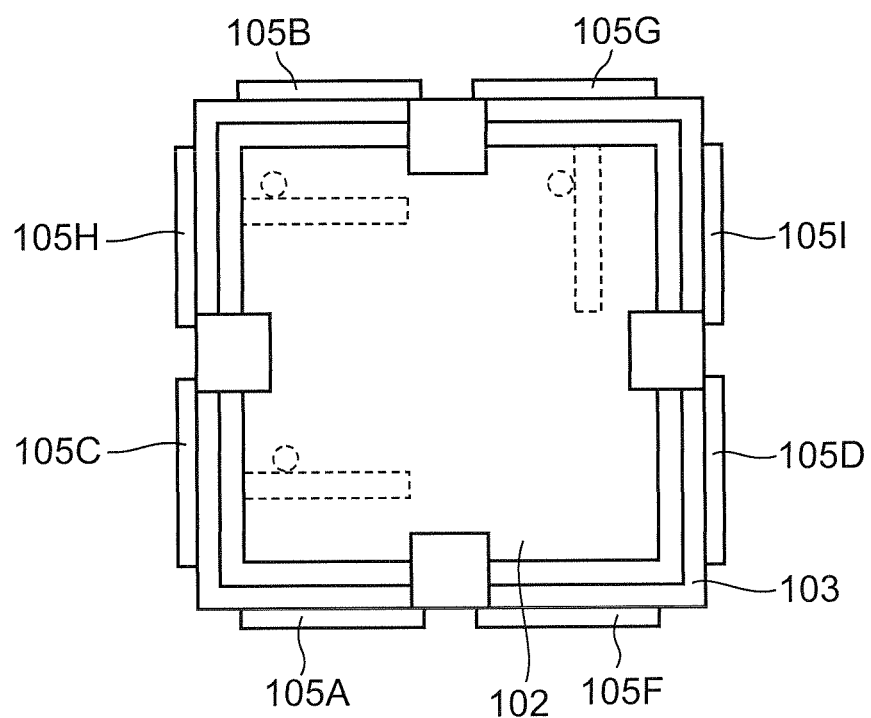
FIG. 27H is an explanatory view of the gripping method in cooperative conveyance using the robot arm in the robot according to the third embodiment of the present disclosure.

Firstly, FIGS. 27A and 27H show the state where the user's hand 801 is not gripping the grip part 103, and the manipulator 101 is stopped. Here, the grip part 103 is hooked by the end effector 102. In other words, the upper side face part 103b of the grip part 103 and the side face part 102b of the end effector 102 opposing to the upper side face part 103b shown in FIG. 27A are in contact with each other, whereby the interval of the clearance 90 between the upper side face part 103b and the side face part 102b is 0. Conversely, the interval between the lower side face part 103b of the grip part 103 and the side face part 102b of the end effector 102 opposing to the lower side face part 103b shown in FIG. 27A is wide.

Figure 27I:
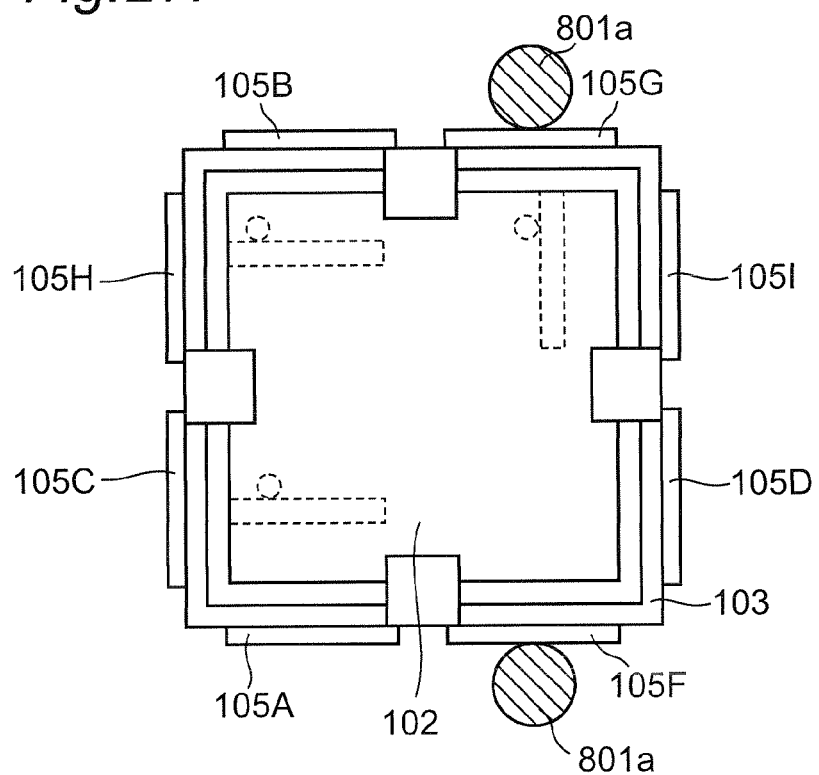
FIG. 27I is an explanatory view of the gripping method in cooperative conveyance using the robot arm in the robot according to the third embodiment of the present disclosure.

Next, FIGS. 27B and 27I show the standby state where the user's hand 801 is gripping the top and bottom opposing side face parts 103b (directly, the contact sensor 105G and the contact sensor 105F) of the grip part 103 shown in FIG. 27B; which is the moment at which the grip detecting unit 611 detects "gripping"; and the manipulator 101 can be caused by the control device 602 to perform tracking control.

Figure 27J:
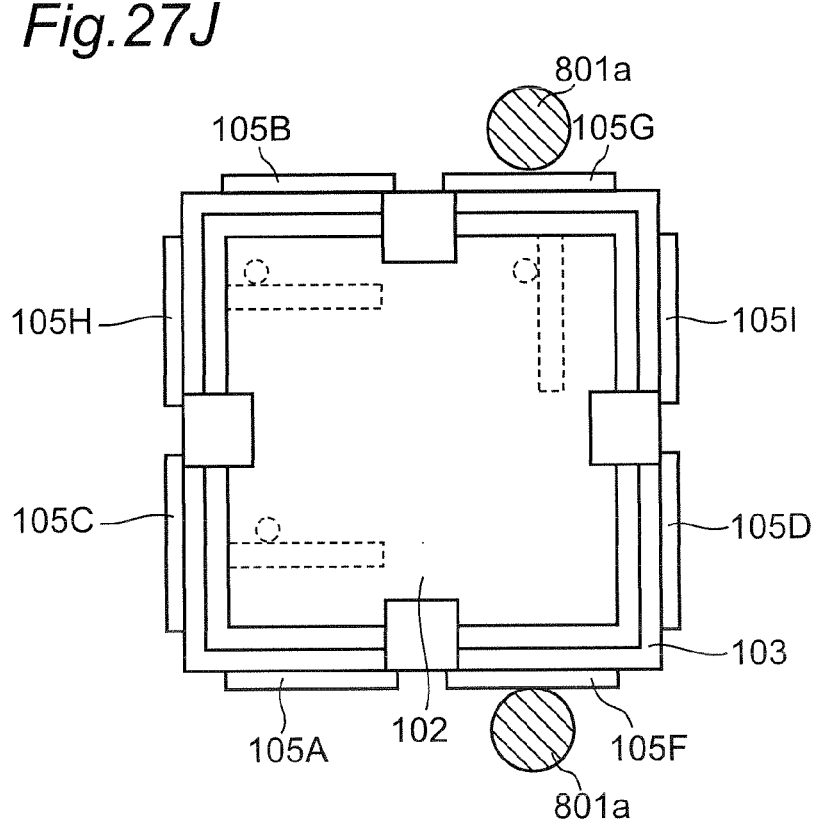
FIG. 27J is an explanatory view of the gripping method in cooperative conveyance using the robot arm in the robot according to the third embodiment of the present disclosure.

Next, FIGS. 27C and 27J show the state immediately after a gripping of the user's hand 801 is detected; the fingers 801a of the user's hand 801 are in contact with the two opposing contact sensors 105G and 105F and are gripping the same; and the control device 602 causes the manipulator 101 to perform tracking control slowly.

Figure 27K:
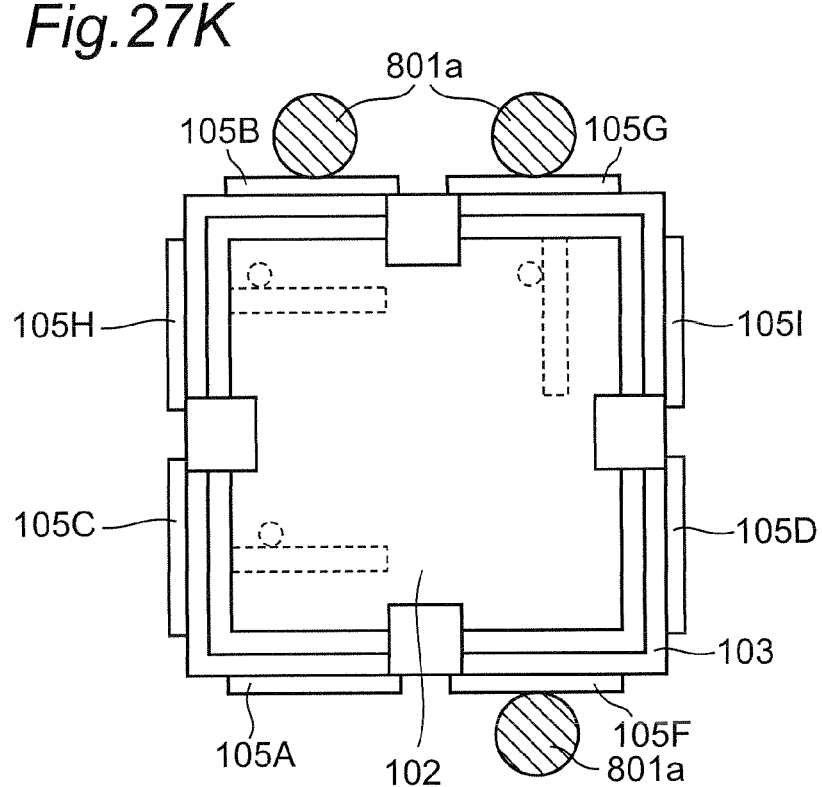
FIG. 27K is an explanatory view of the gripping method in cooperative conveyance using the robot arm in the robot according to the third embodiment of the present disclosure.

Next, FIGS. 27D and 27K show the state where the user's hand 801 is gripping the grip part 103, and the control device 602 causes the manipulator 101 to perform tracking control. That is, the fingers 801a of the user's hand 801 also grips the contact sensor 105B in addition to the two opposing contact sensors 105G and 105F, and therefore the manipulator 101 is caused by the control device 602 to quickly perform tracking control.

Figure 27L:
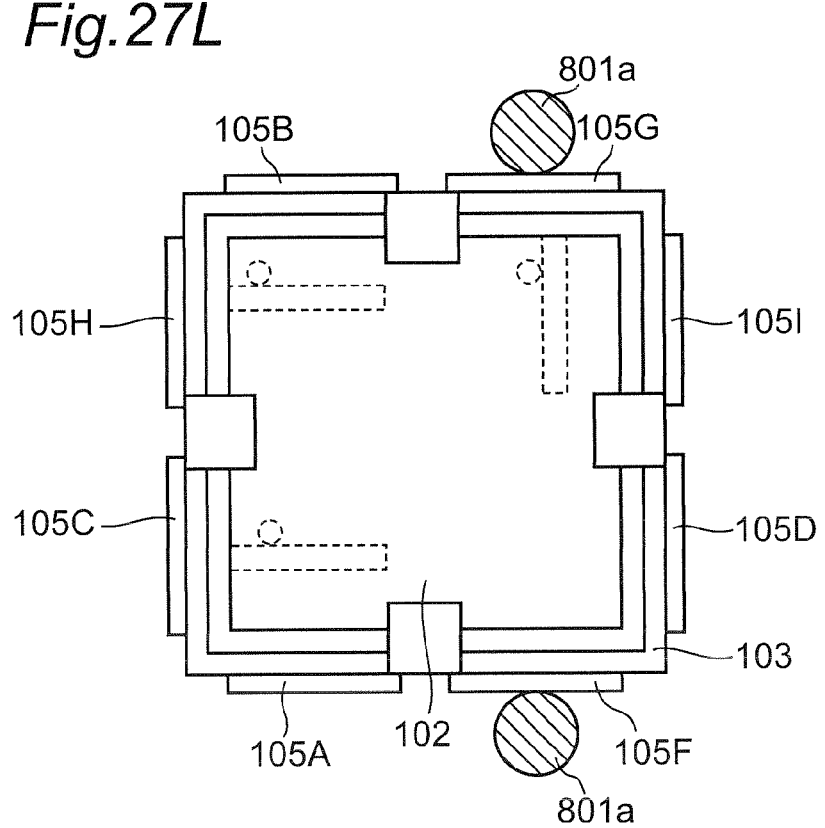
FIG. 27L is an explanatory view of the in cooperative conveyance using the robot arm in the robot according to the third embodiment of the present disclosure.

Next, FIGS. 27E and 27L show the state before the tracking control ends. Since the fingers 801a of the user's hand 801 are gripping the two opposing contact sensors 105G and 105F, the manipulator 101 is caused by the control device 602 to perform tracking control slowly.

Figure 27M:
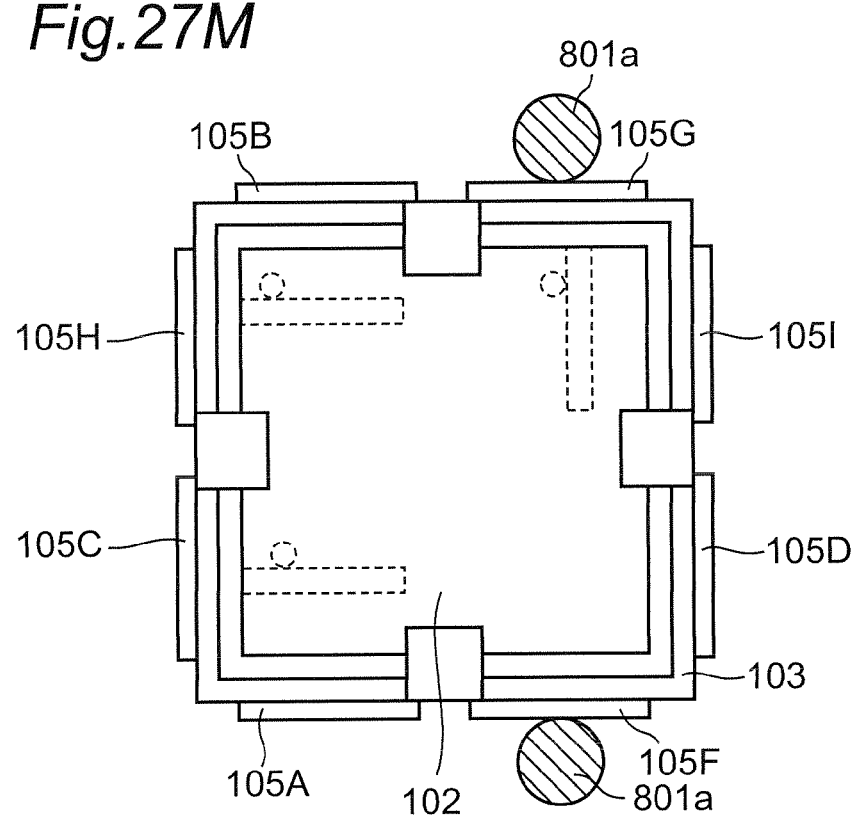
FIG. 27M is an explanatory view of the gripping method in cooperative conveyance using the robot arm in the robot according to the third embodiment of the present disclosure.

Next, FIGS. 27F and 27M show the state immediately before the tracking control ends. Since the fingers 801a of the user's hand 801 are gripping the two opposing contact sensors 105G and 105F, the manipulator 101 is caused by the control device 602 to perform tracking control slowly. Here, since the manipulator 101 is caused by the control device 602 to perform tracking control slowly, the grip part 103 is brought into contact with the end effector 102 gently.

Figure 27N:
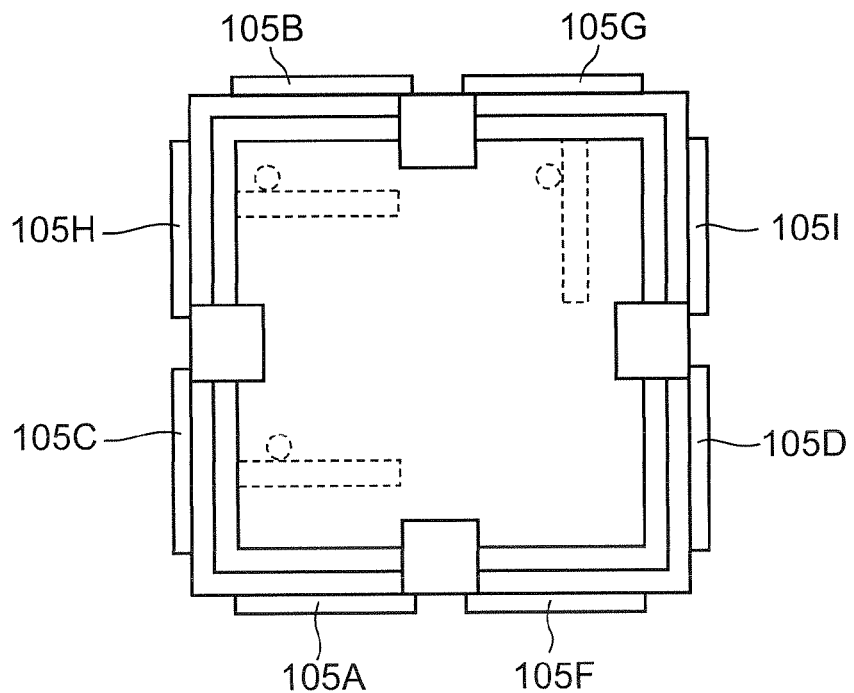
FIG. 27N is an explanatory view of the gripping method in cooperative conveyance using the robot arm in the robot according to the third embodiment of the present disclosure.

Next, FIGS. 27G and 27N show the state where the user's hand 801 is not gripping the grip part 103, and the manipulator 101 is stopped.

Figure 28:
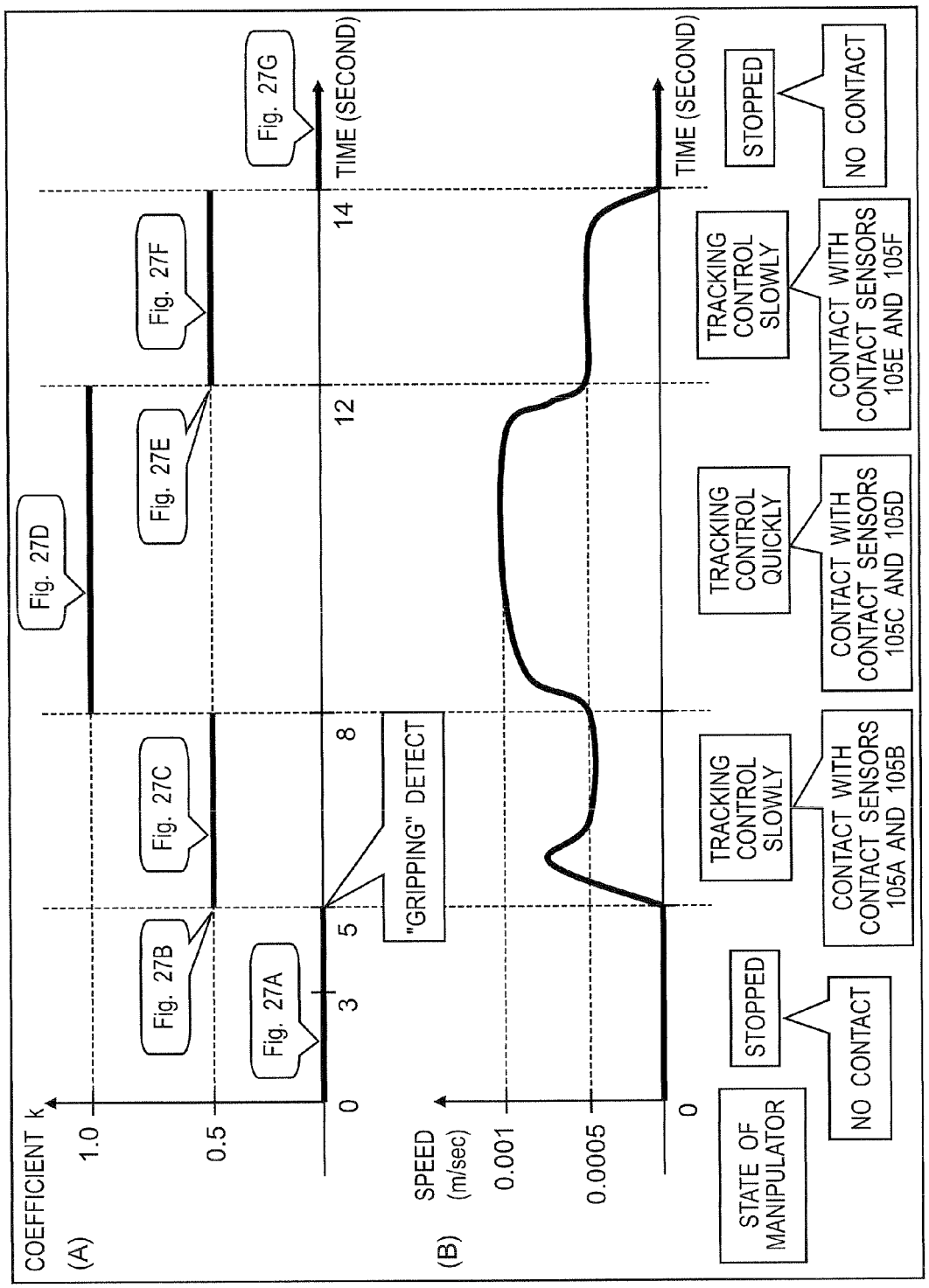
FIG. 28 is an explanatory view of cooperative conveyance using the robot arm in the robot according to the third embodiment of the present disclosure, in which FIG. 28 (A) is an explanatory view of the relationship between the time and coefficient of cooperative conveyance using the robot arm in the robot according to the third embodiment of the present disclosure, and FIG. 28 (B) is an explanatory view of the relationship between the time and speed of cooperative conveyance using the robot arm in the robot according to the third embodiment of the present disclosure.

The graph (A) on the upper side in FIG. 28 shows the relationship between time and the value of coefficient k in FIGS. 27A to 27G. The horizontal axis indicates time (second), and the vertical axis indicates the value of coefficient k. The bold line on the graph (A) represents the value of coefficient k to time. The graph (B) on the lower side in FIG. 28 shows the relationship between time and speed in FIGS. 27A to 27G. The horizontal axis indicates time (second) and the vertical axis indicates speed (m/sec). The bold line on the graph (B) represents speed to time. Further, under the horizontal axis, the state of the manipulator 101 at the corresponding time is shown. From the upper graph (A) and the lower graph (B) in FIG. 28, it can be seen that, by changing the gripping position of the grip part 103 by the user's hand 801 at the start and at the end of tracking control, it can be seen that the manipulator 101 performs tracking control slowly. Comparing the upper graph (A) and lower graph (B) in FIG. 28 against the graph (A) and the graph (B) in FIG. 19, it can be seen that the speed of the arm end position of the manipulator 101 at the end of the tracking control is smaller in FIG. 28.

Figure 29:
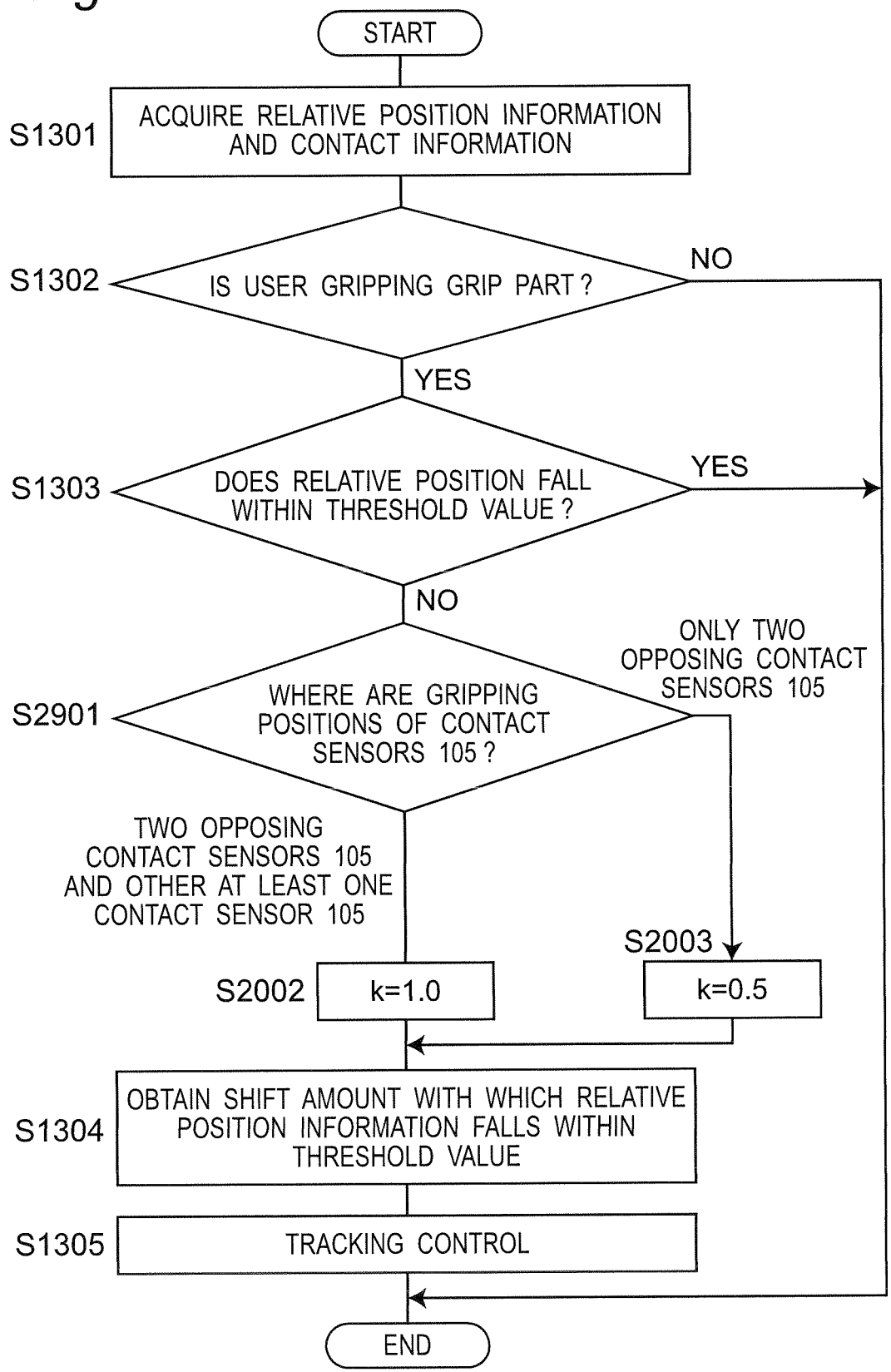
FIG. 29 is a flowchart showing the flow of processing starting from acquiring the relative position information and the contact information until exerting tracking control in the robot according to the third embodiment of the present disclosure.

With reference to the flowchart of FIG. 29, a description will be given of the operation procedure of the control device 602 of the robot arm 100 in the robot 601 according to the third embodiment.

In Step S1301, the relative position information acquiring unit 607 acquires relative position information of the grip part 103 to the end effector 102. The contact information acquiring unit 610 acquires, via the input/output IF 1604, the contact information from the outside of the contact sensors 105.

In Step S1302, the grip detecting unit 611 detects whether the user is gripping the grip part 103, based on the contact information acquired from the contact information acquiring unit 610. The result detected by the grip detecting unit 611 is output from the grip detecting unit 611 to the tracking control switching unit 612 and the control coefficient information determining unit 2401. When the grip detecting unit 611 detects that the user is gripping the grip part 103, the procedure proceeds to Step S1303. When the grip detecting unit 611 detects that the user is not gripping the grip part 103, the flow ends.

In Step S1303, the tracking control unit 606 determines whether the relative position information acquired from the relative position information acquiring unit 607 falls within a prescribed threshold value range. When the tracking control unit 606 determines that the relative position information falls within the threshold value range, the flow ends. When the tracking control unit 606 determines that the relative position information does not fall within the threshold value range, the procedure proceeds to Step S2901.

In Step S2901, the control coefficient information determining unit 2401 determines whether the user is gripping only the two opposing contact sensors 105 or the user is gripping the two opposing contact sensors 105 and other at least one contact sensor 105, based on the grip information acquired from the grip detecting unit 611. When the control coefficient information determining unit 2401 determines that the two opposing contact sensors 105 only are gripped, the procedure proceeds to Step S2003. When the control coefficient information determining unit 2401 determines that the two opposing contact sensors 105 and other at least one contact sensor 105 are gripped, the procedure proceeds to Step S2002.

In Step S2003, the control coefficient information determining unit 2401 sets the value of coefficient k relating to the shift amount in Equation (4) to 0.5, and the procedure proceeds to Step S1304.

In Step S2002, the control coefficient information determining unit 2401 sets the value of coefficient k relating to the shift amount in Equation (4) to 1.0, and the procedure proceeds to Step S1304.

In Step S1304, the tracking control unit 606 obtains the shift amount with which the relative position information exceeding the threshold value range falls within the threshold value. The shift amount obtained by the tracking control unit 606 is output from the tracking control unit 606 to the control unit 605, and the procedure proceeds to Step S1305.

In Step S1305, the control unit 605 exerts tracking control over the manipulator 101 based on the shift amount acquired from the tracking control unit 606, and the flow ends.

According to the third embodiment, in addition to the operation and effect of the first embodiment, by the manipulator 101 performing tracking control slowly in accordance with the position at which the user grips the grip part 103, safety can be improved at the start and at the end of tracking control. Further, since the manipulator 101 can perform tracking control slowly or quickly in accordance with the position gripped by the user, the tracking speed of the tracking control can be changed by the intention of the user.

(Fourth Embodiment)

In the following, a description will be given of a robot according to a fourth embodiment of the present disclosure.

In the third embodiment, by the control device 602 causing the manipulator 101 to perform tracking control slowly in accordance with the position where the user grips the grip part 103, safety at the start and at the end of tracking control is improved.

However, the user is required to again grip the gripping position of the grip part 103. Therefore, depending on the user or the work content, the re-gripping operation may be troublesome. Accordingly, in the fourth embodiment, safety at the start and at the end of tracking control is improved by an easier method as compared to the method of re-gripping the gripping position as employed in the third embodiment.

Figure 30A:
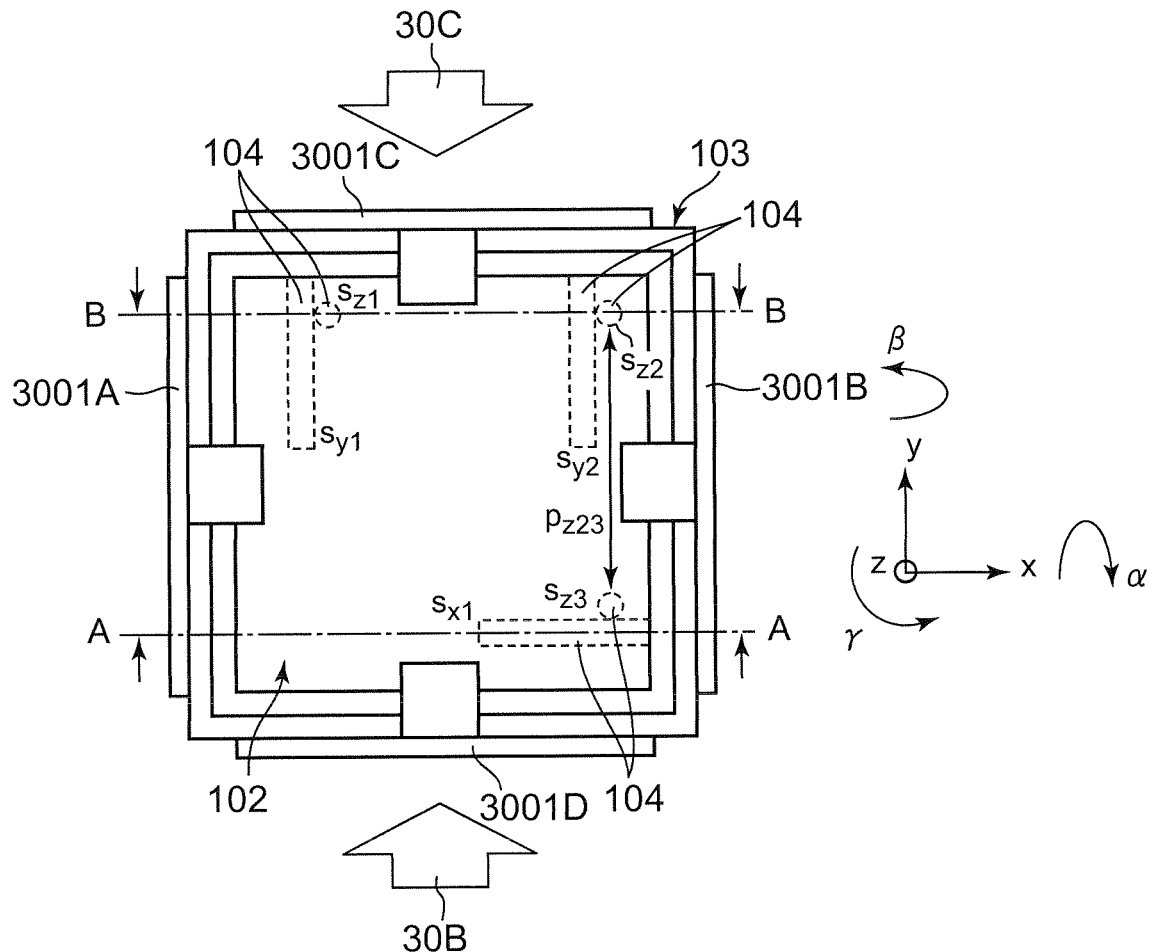
FIG. 30A is a plan view of an end effector, a grip part, relative position sensors, and force sensors in a robot according to a fourth embodiment of the present disclosure.
Figure 30B:
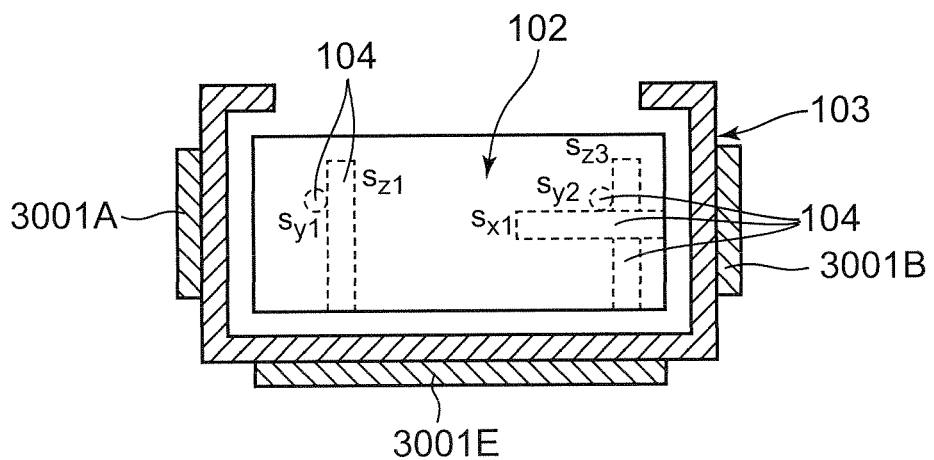
FIG. 30B is a cross-sectional view of the end effector, the grip part, the relative position sensors, and the force sensors in the robot according to the fourth embodiment of the present disclosure.
Figure 30C:
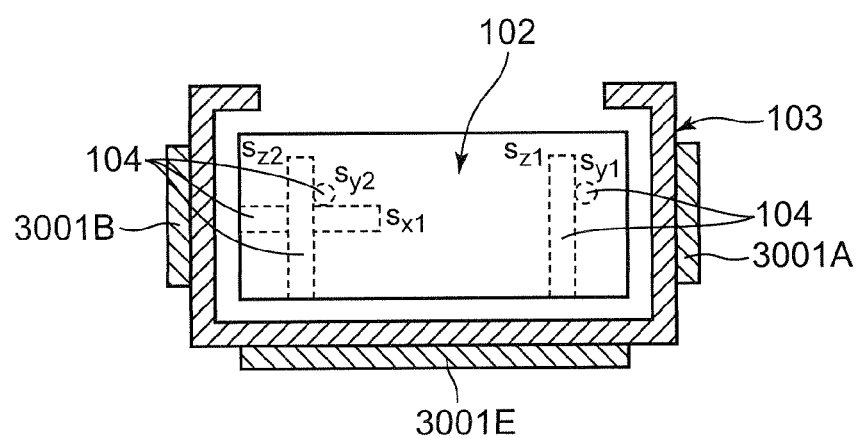
FIG. 30C is a cross-sectional view of the end effector, the grip part, the relative position sensors, and the force sensors in the robot according to the fourth embodiment of the present disclosure.

FIG. 30A is a plan view of the end effector 102, the grip part 103, the relative position sensors 104, and the force sensors 3001. FIG. 30B is a cross-sectional view of the end effector 102, the grip part 103, the relative position sensors 104, and the force sensors 3001 taken along line A-A in FIG. 30A, as seen from arrow 30B. FIG. 30C is a cross-sectional view of the end effector 102, the grip part 103, the relative position sensors 104, and the force sensors 3001 taken along line B-B in FIG. 30A, as seen from arrow 30C. Though five contact sensors 105 are used in the first, second, and third embodiments, five force sensors 3001 are used in the fourth embodiment in place of the contact sensors 105.

The force sensors 3001 are attached to the four side face parts 103b and the bottom face part 103a on the outer side of the grip part 103, to detect the magnitude of force applied from the outside. The magnitude of force detected by each of the force sensors 3001 is output to the input/output IF 1604. The difference from the contact sensors 105 lies in that, while whether the contact is occurred is detected by the contact sensors 105, the force sensors 3001 are capable of also detecting the magnitude of force applied when the contact occurs. As shown in FIGS. 30A to 30C, the force sensors 3001 are attached to five places, i.e., 3001A to 3001E. That is, the force sensors 3001A to 3001D are attached to the outer faces of the four side face parts 103b, and the force sensor 3001E is attached to the bottom face part 103a. When specific force sensors are individually described, they are denoted by reference characters 3001A to 3001E, and are denoted by reference character 3001 when they are generally described. Further, the force sensors 3001 are the force sensor detecting only the force along one axis. It is to be noted that, while the force sensors 3001 are arranged as shown in FIGS. 30A to 30C, any arrangement place or number of pieces of the force sensors 3001 can be selected so long as the magnitude of force applied to the grip part 103 when the grip part 103 and any other object are brought into contact is acquired.

Figure 31:
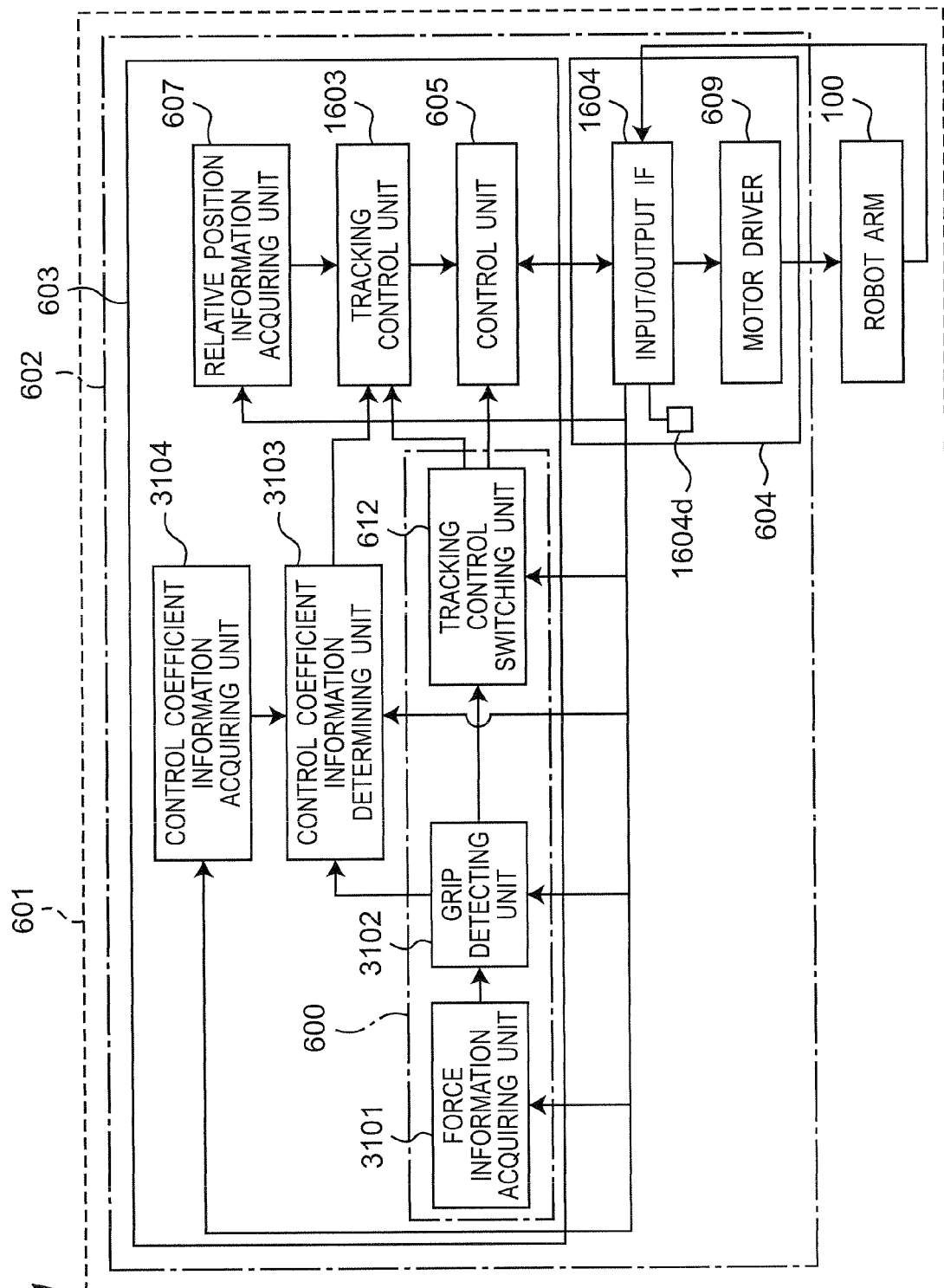
FIG. 31 is a block diagram of the robot arm in the robot according to the fourth embodiment of the present disclosure.

FIG. 31 is a block diagram of the robot arm 100 in the robot 601 according to the fourth embodiment of the present disclosure. Since the manipulator 101, the control unit 605, the relative position information acquiring unit 607, the motor driver 609, the tracking control switching unit 612, the tracking control unit 1603, and the input/output IF 1604 in the robot 601 according to the fourth embodiment of the present disclosure are identical to those in the second and third embodiments, common reference characters are allotted thereto and the description thereof will not be repeated. In the following, a detailed description will be given solely of the different parts.

A force information acquiring unit 3101 receives the measurement values of the force sensors 3001 from the input/output IF 1604 and time information from the timer installed in the input/output IF 1604, and acquires the magnitude of force applied to the grip part 103 from the outside. The measurement values of the force sensors 3001 input to the force information acquiring unit 3101 are employed as the force information, and output from the force information acquiring unit 3101 to a grip detecting unit 3102. The force information is information of the magnitude of force of each of the force sensors 3001A to 3001E as shown in FIG. 32.

It is to be noted that, in the present embodiment, the tracking control switch control unit 600 is structured by the force information acquiring unit 3101 in place of the contact information acquiring unit 610, the grip detecting unit 3102 corresponding to the grip detecting unit 611, and the tracking control switching unit 612. The tracking control switch control unit 600 outputs tracking control information which switches tracking control such that: when the grip part 103 is in contact with any object other than the end effector, the tracking control unit 606 exerts tracking control; on the other hand, when the grip part 103 is not in contact with any object other than the end effector, the tracking control unit 606 does not exert tracking control.

The grip detecting unit 3102 receives the force information from the force information acquiring unit 3101. The grip detecting unit 3102 receives, from the input/output IF 1604, time information from the timer installed in the input/output IF 1604. The grip detecting unit 3102 detects whether the user is gripping the grip part 103 based on the force information from the force information acquiring unit 3101, and the grip detecting unit 3102 outputs the grip information to the tracking control switching unit 612.

The method of detecting user's grip information is to satisfy the following two grip information detection conditions. The first grip information detection condition is that the two opposing force sensors 3101 (the force sensor 3101A and the force sensor 3101B, or the force sensor 3101C and the force sensor 3101D) both indicate that the magnitude of force is 0.3 N or more. The second grip information detection condition is that the magnitude of force detected by the force sensors 3101 is a prescribed force for a prescribed time (e.g., being 0.3 N or more continuously for 2 seconds or more). When the foregoing two grip information detection conditions are satisfied, the grip information outputs "gripping" (output: "1"); and when the grip detection conditions are not fully satisfied, the grip information outputs "not gripping" (output: "0").

The control coefficient information determining unit 3103 changes the value of coefficient k depending on the magnitude of force when the user grips the grip part 103. Here, in the control coefficient information determining unit 3103, when the gripping force becomes great, the value of coefficient k is increased. On the other hand, when the gripping force becomes small, the value of coefficient k is reduced. When the grip detecting unit 3102 detects that the user is gripping the grip part 103, at the start and at the end of gripping, the magnitude of force of the user gripping the grip part 103 is made smaller than the magnitude of force during gripping operation (during the operation other than at the start and at the end of gripping). By structuring in this manner, the control device 602 allows the manipulator 101 to perform tracking control slowly at the start and at the end of tracking control, i.e., slower than the quick control during the gripping operation.

This is specifically described with reference to FIG. 33. Here, the database shown in FIG. 33 is structured by the control coefficient information acquiring unit 3104 acquiring the associated information in which information as to whether the user is gripping the grip part 103, the magnitude of force of the user gripping the grip part 103, and the control coefficient information (e.g., value of control coefficient) are associated with one another, and storing in the inner storage unit in the control coefficient information acquiring unit 3104. When the user is not gripping the grip part 103, the value of coefficient k is set to 0.0. In the state where the user is gripping the grip part 103, when the force information from the force information acquiring unit 3101 is less than the magnitude of an arbitrary force (force information threshold value) (e.g., 2.0 N), the value of coefficient k is set to 0.5, and when the force information from the force information acquiring unit 3101 is the magnitude of force equal to or greater than that, the value of coefficient k is set to 1.0. That is, the shift amount in the case where the force information from the force information acquiring unit 3101 is less than the force information threshold value is set to be smaller than the shift amount in the case where the force information from the force information acquiring unit 3101 is equal to or greater than the force information threshold value. For example, it is approximately half or less as great as the former shift amount. This means that, when the state transits from the situation where the force information is equal to or greater than the force information threshold value to the situation where the force information is less than the force information threshold value, and when the state transits from the situation where the force information is less than the force information threshold value to the situation where the force information is equal to or greater than the force information threshold value, tracking control is exerted at low speeds to the extent that the robot arm does not sharply move. The determination method of the arbitrary force (force information threshold value) is determined by the value input by the user from the input/output IF 1604 using the input device 1604d such as a keyboard, a mouse, a touch panel and the like. Further, the value of coefficient k in each of the state is also determined by the value input by the user from the input/output IF 1604 using the input device 1604d such as a keyboard, a mouse, or a touch panel.

FIGS. 34A to 34G show the procedure of the control device 602 causing the manipulator 101 to perform tracking when the user and the manipulator 101 cooperatively convey the target object 1101. The hand 1015 is attached to the arm end part of the manipulator 101, e.g., at the leading end 1002a, and the hand 1015 is caused to grip the target object 1101. Thereafter, the state transits in an order of FIG. 34A→FIG. 34B→FIG. 34C→FIG. 34D→FIG. 34E→FIG. 34F→FIG. 34G.

Figure 34A:
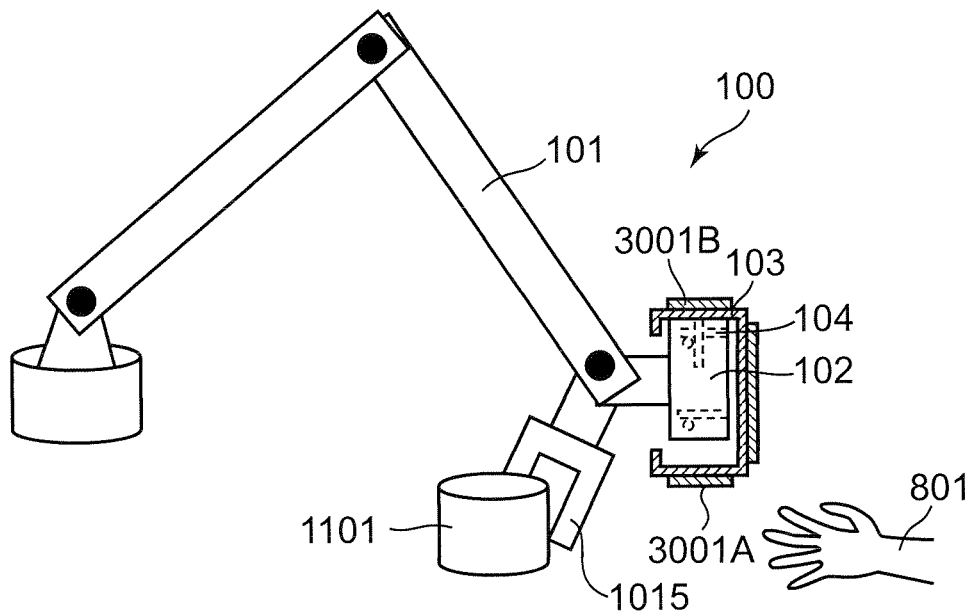
FIG. 34A is an explanatory view of cooperative conveyance using the robot arm in the robot according to the fourth embodiment of the present disclosure.

Firstly, FIG. 34A shows the state where the user's hand 801 is not gripping the grip part 103, and the manipulator 101 is stopped. Here, the grip part 103 is hooked by the end effector 102. In other words, the upper side face part 103b of the grip part 103 and the side face part 102b of the end effector 102 opposing to the upper side face part 103b shown in FIG. 34A are in contact with each other, whereby the interval of the clearance 90 between the upper side face part 103b and the side face part 102b is 0. Conversely, the interval between the lower side face part 103b of the grip part 103 and the side face part 102b of the end effector 102 opposing to the lower side face part 103b shown in FIG. 34A is wide.

Figure 34B:
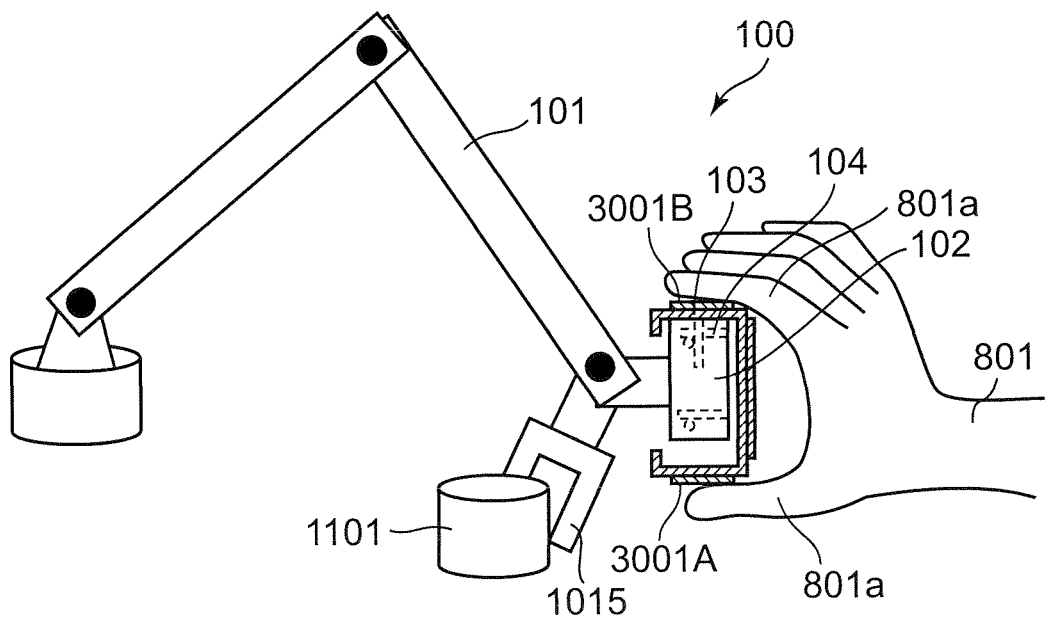
FIG. 34B is an explanatory view of cooperative conveyance using the robot arm in the robot according to the fourth embodiment of the present disclosure.

Next, FIG. 34B shows the standby state where the user's hand 801 is gripping the top and bottom opposing side face parts 103b (directly, the force sensor 3001B and the force sensor 3001A) of the grip part 103 shown in FIG. 34B; which is the moment at which the grip detecting unit 3102 detects "gripping"; and the manipulator 101 can be caused by the control device 602 to perform tracking control.

Figure 34C:
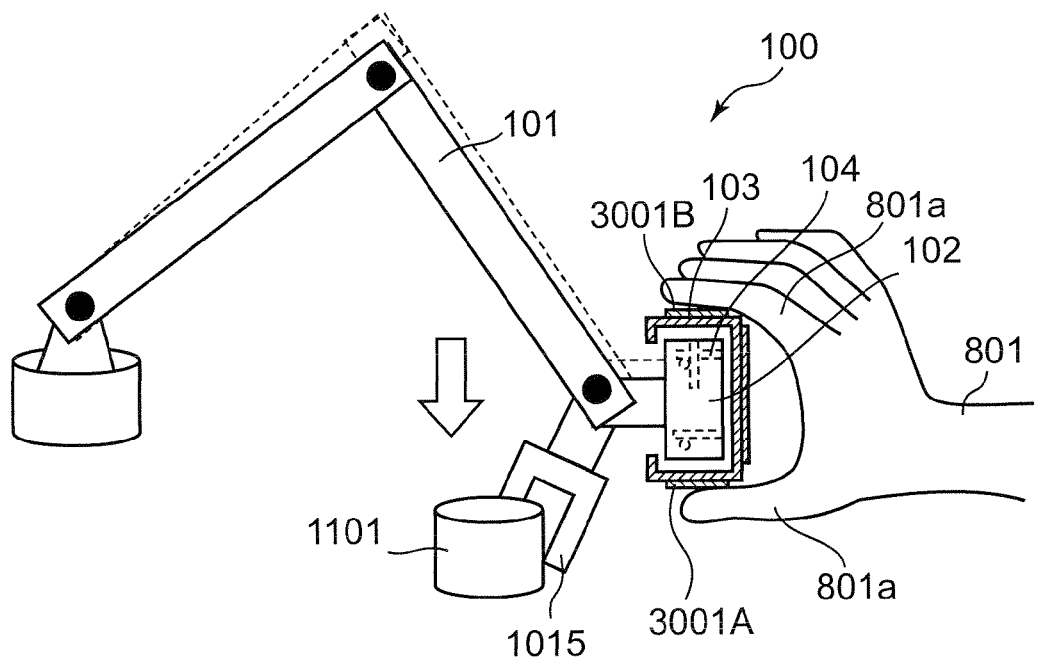
FIG. 34C is an explanatory view of cooperative conveyance using the robot arm in the robot according to the fourth embodiment of the present disclosure.

Next, FIG. 34C shows the state immediately after a gripping of the user's hand 801 is detected; the control device 602 causes the manipulator 101 to perform tracking control slowly by the following. The fingers 801a of the user's hand 801 are in contact with the two opposing top and bottom force sensors 3001B and 3001A shown in FIG. 34C, and reduce the magnitudes of forces gripping them.

Figure 34D:
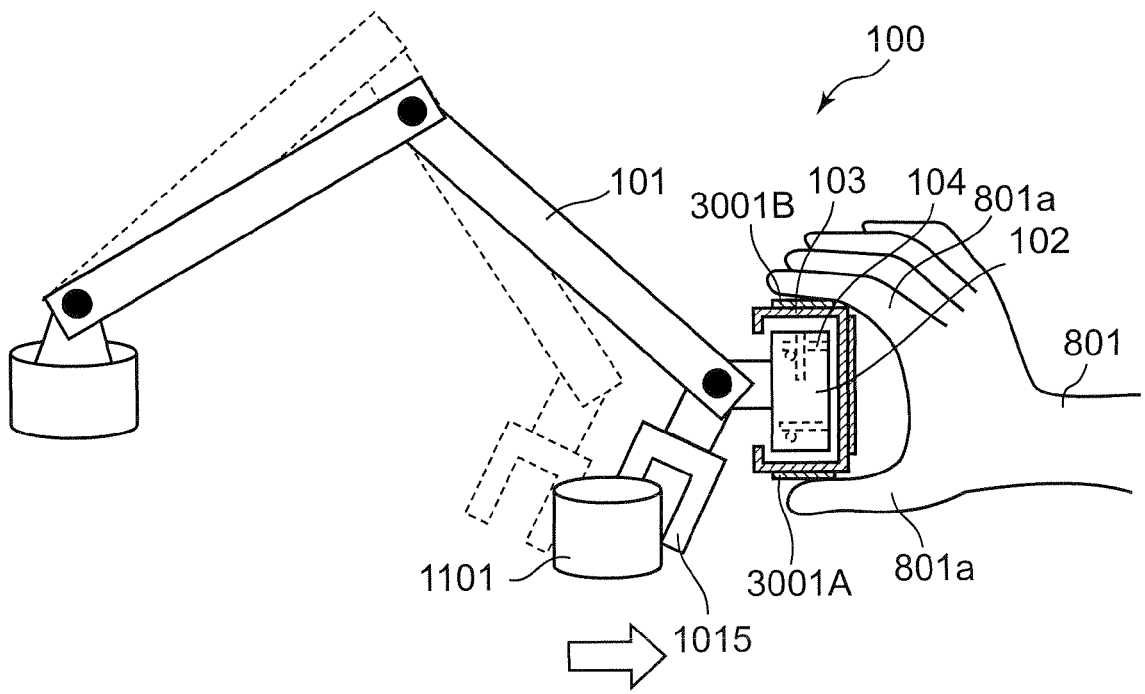
FIG. 34D is an explanatory view of cooperative conveyance using the robot arm in the robot according to the fourth embodiment of the present disclosure.

Next, FIG. 34D shows the state where the user's hand 801 is gripping the grip part 103, and the control device 602 causes the manipulator 101 to perform tracking control. That is, by increasing the magnitudes of forces of the fingers 801a of the user's hand 801 gripping the two opposing force sensors 3001B and 3001A to be greater than the magnitude of force in the state shown in FIG. 34C, the control device 602 causes the manipulator 101 to quickly perform tracking control.

Figure 34E:
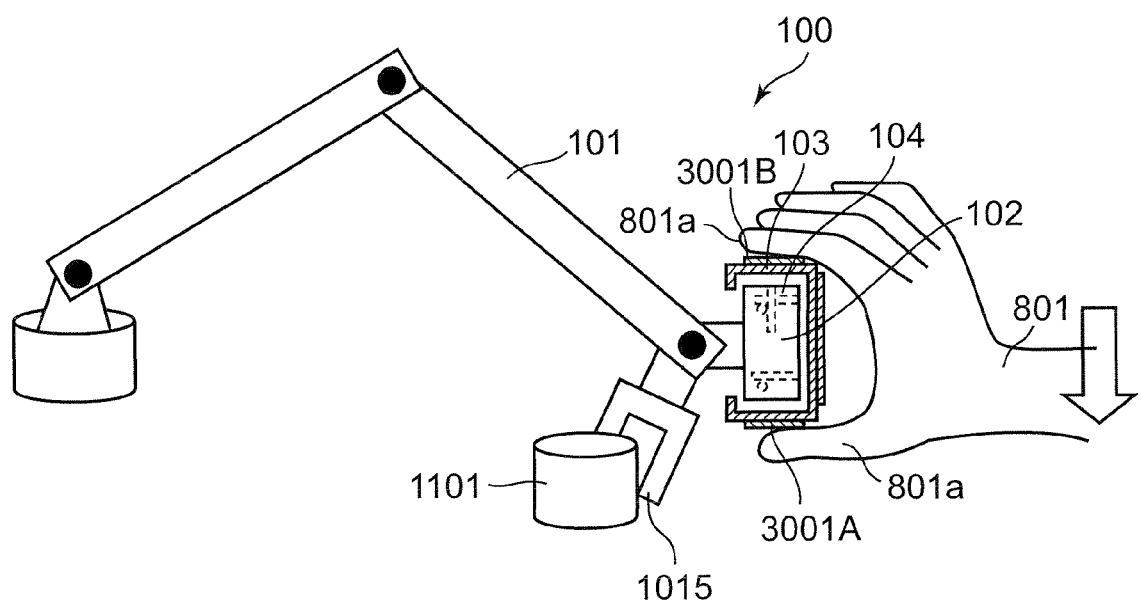
FIG. 34E is an explanatory view of cooperative conveyance using the robot arm in the robot according to the fourth embodiment of the present disclosure.

Next, FIG. 34E shows the state before the tracking control ends; the control device 602 causes the manipulator 101 to perform tracking control slower than that performed in FIG.

34C by the following. The magnitudes of forces of the fingers 801a of the user's hand 801 gripping the two opposing force sensors 3001B and 3001A are reduced than the magnitudes of forces in the state shown in FIG. 34D.

Figure 34F:
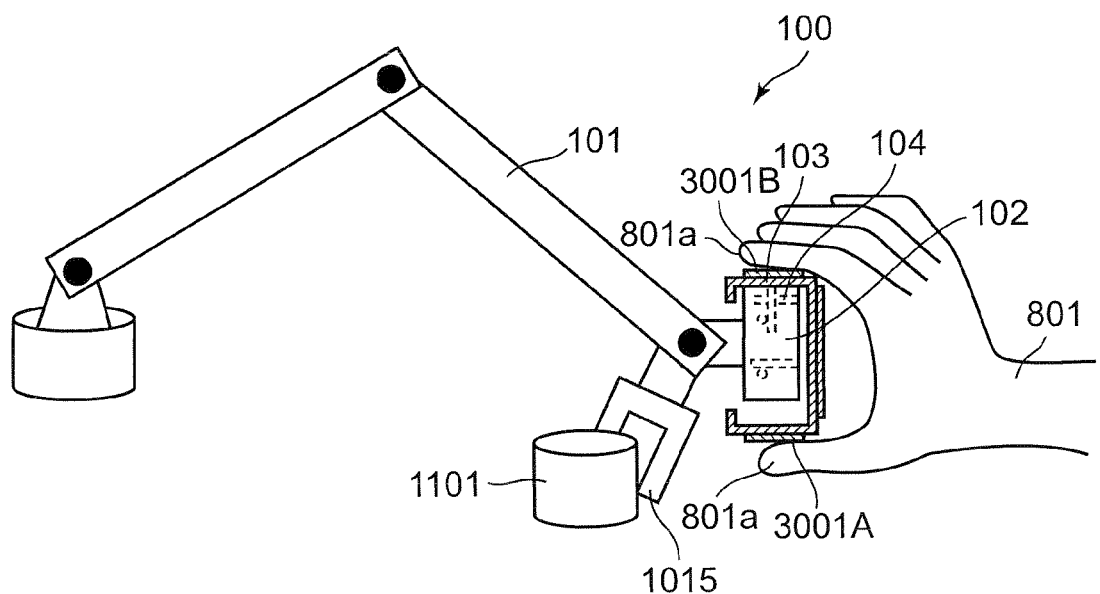
FIG. 34F is an explanatory view of cooperative conveyance using the robot arm in the robot according to the fourth embodiment of the present disclosure.

Next, FIG. 34F shows the state immediately before the tracking control ends. Since the magnitudes of forces of the fingers 801a of the user's hand 801 gripping the two opposing force sensors 3001B and 3001A are smaller than the magnitudes of forces in the state shown in FIG. 34D similarly to FIG. 34E, the control device 602 causes the manipulator 101 to perform tracking control slowly. Here, since the control device 602 causes the manipulator 101 to perform tracking control slowly, the grip part 103 is gently brought into contact with the end effector 102.

Figure 34G:
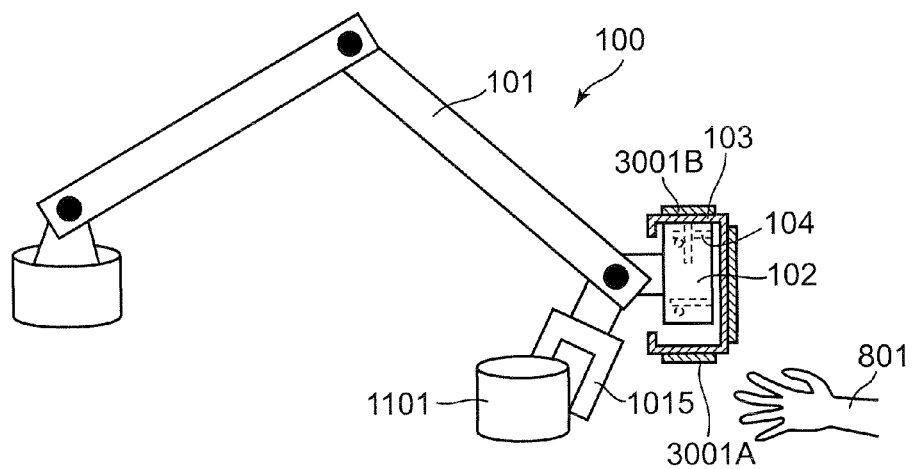
FIG. 34G is an explanatory view of cooperative conveyance using the robot arm in the robot according to the fourth embodiment of the present disclosure.

Next, FIG. 34G shows the state where the user's hand 801 is not in contact with the force sensors 3001 and the manipulator 101 is stopped.

The top graph (A) in FIG. 35 shows the relationship between the time and value of coefficient k in FIGS. 34A to 34G. The horizontal axis indicates time (second), and the vertical axis indicates the value of coefficient k. The bold line on the graph (A) represents the value of coefficient k to time. The middle graph (B) in FIG. 35 shows the relationship between time and speed in FIGS. 34A to 34G. The horizontal axis indicates time (second), and the vertical axis indicates speed (m/sec). The bold line on the graph (B) represents speed to time. The bottom graph (C) in FIG. 35 shows the relationship between time and the magnitude of force in FIGS. 34A to 34G. The horizontal axis indicates time (second), and the vertical axis indicates the magnitude of force (N). The bold line on the graph (C) represents the magnitude of force information acquired by the force information acquiring unit 3101 to time. Further, below the horizontal axis, the state of the manipulator 101 at the corresponding time is shown. From the graphs (A) to (C) in FIG. 35, it can be seen that the manipulator 101 slowly performs tracking control in accordance with the magnitude of force of the user gripping the grip part 103, at the start and at the end of tracking control.

Figure 36:
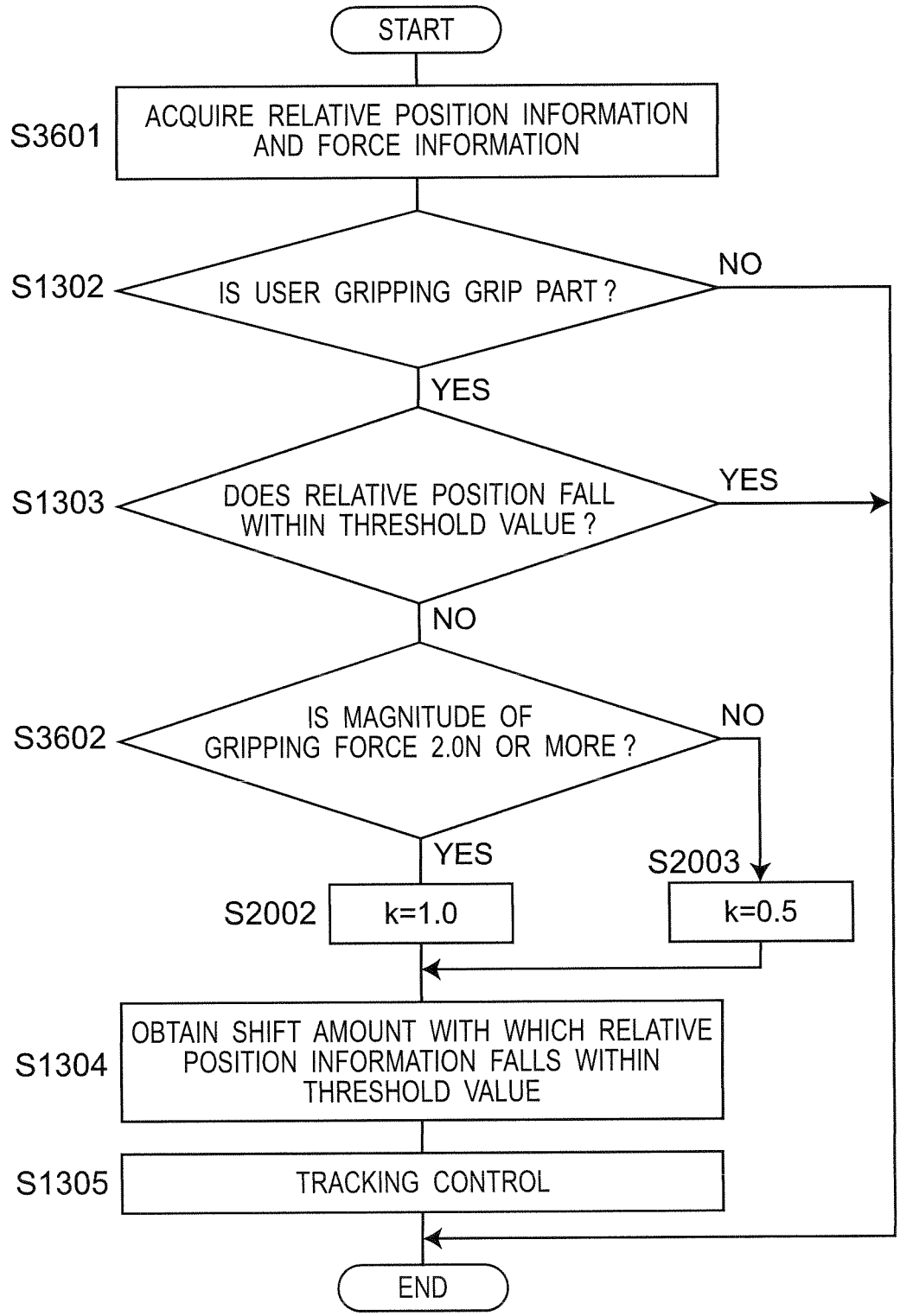
FIG. 36 is a flowchart showing the flow of processing starting from acquiring relative position information and the force information until exerting tracking control in the robot according to the fourth embodiment of the present disclosure.

With reference to the flowchart of FIG. 36, a description will be given of the operation procedure of the control device 602 of the robot arm 100 in the robot 601 according to the fourth embodiment.

In Step S3601, the relative position information acquiring unit 607 acquires the relative position information of the grip part 103 to the end effector 102. The force information acquiring unit 3101 acquires, via the input/output IF 1604, the force information externally applied to the force sensors 3001.

In Step S1302, the grip detecting unit 3102 detects whether the user is gripping the grip part 103, based on the force information acquired from the force information acquiring unit 3101. The result detected by the grip detecting unit 3102 is output from the grip detecting unit 611 to the tracking control switching unit 612 and the control coefficient information determining unit 3103. When the grip detecting unit 3102 detects that the user is gripping the grip part 103, the procedure proceeds to Step S1303. When the grip detecting unit 3102 detects that the user is not gripping the grip part 103, the flow ends.

In Step S1303, the tracking control unit 606 determines whether the relative position information acquired from the relative position information acquiring unit 607 falls within a prescribed threshold value range. When the tracking control unit 606 determines that the relative position information falls within a threshold value range, the flow ends. When the tracking control unit 606 determines that the relative position information does not fall within the threshold value range, the procedure proceeds to Step S3602.

In Step S3602, the control coefficient information determining unit 3103 determines whether the magnitude of force of the user gripping the grip part 103 is equal to or greater than 2.0 N, based on the force information acquired from the force information acquiring unit 3101. When the control coefficient information determining unit 3103 determines that the magnitude of force of the user gripping the grip part 103 is equal to or greater than 2.0 N, the procedure proceeds to Step S2002. When the control coefficient information determining unit 3103 determines that the magnitude of force of the user gripping the grip part 103 is not equal to or greater than 2.0 N, the procedure proceeds to Step S2003.

In Step S2002, the control coefficient information determining unit 3103 sets the value of coefficient k relating to the shift amount in Equation (4) to 1.0, and the procedure proceeds to Step S1304.

In Step S2003, the control coefficient information determining unit 3103 sets the value of coefficient k relating to shift amount in Equation (4) to 0.5, and the procedure proceeds to Step S1304.

In Step S1304, the tracking control unit 606 obtains the shift amount with which the relative position information exceeding the threshold value range falls within the threshold value is obtained. The shift amount obtained by the tracking control unit 606 is output from the tracking control unit 606 to the control unit 605, and the procedure proceeds to Step S1305.

In Step S1305, the control unit 605 exerts tracking control over the manipulator 101 based on the shift amount acquired from the tracking control unit 606, and the flow ends.

According to the fourth embodiment, in addition to the operation and effect of the first embodiment, by the manipulator 101 performing tracking control slowly in accordance with the magnitude of force of the user gripping the grip part 103, safety can be improved at the start and at the end of tracking control more easily, as compared to the method of re-gripping the gripping position employed in the third embodiment.

(Fifth Embodiment)

In the following, a description will be given of a robot according to a fifth embodiment of the present disclosure.

In the case where the user grips and sharply shifts the grip part 103, tracking may not be achieved at the tracking speed of the manipulator 101. That is, it is the case where the shift amount of the user's hand 801 shifting the grip part 103 for every certain time (e.g., every 1 msec) exceeds the shift amount with which the manipulator 101 can shift for every certain time. In such a case, the behavior of the manipulator 101 cannot be predicted. It involves the danger of the manipulator 101 becoming out of control, and is very dangerous. Accordingly, the fifth embodiment takes countermeasures against this issue.

FIG. 37 is a configuration view of the manipulator 101, the end effector 102, the grip part 103, the relative position sensors 104, and contact sensors 3701 in the robot according to the fifth embodiment of the present disclosure. To the arm end of the manipulator 101, the end effector 102 is attached. The grip part 103 is the part for the user to grip when performing work, and is structured to be separated from the end effector 102. The relative position sensors 104 are sensors detecting the relative position of the grip part 103 to the end effector 102.

The contact sensors 3701 are respectively attached to the side face parts and the bottom face part on the inner side of the grip part 103, to detect contact with the end effector 102. Here, five contact sensors 3701 are used (the detail thereof will be given later).

With reference to FIG. 38, a description will be given of the end effector 102, the grip part 103, the relative position sensors 104, and the contact sensors 3701.

Figure 38A:
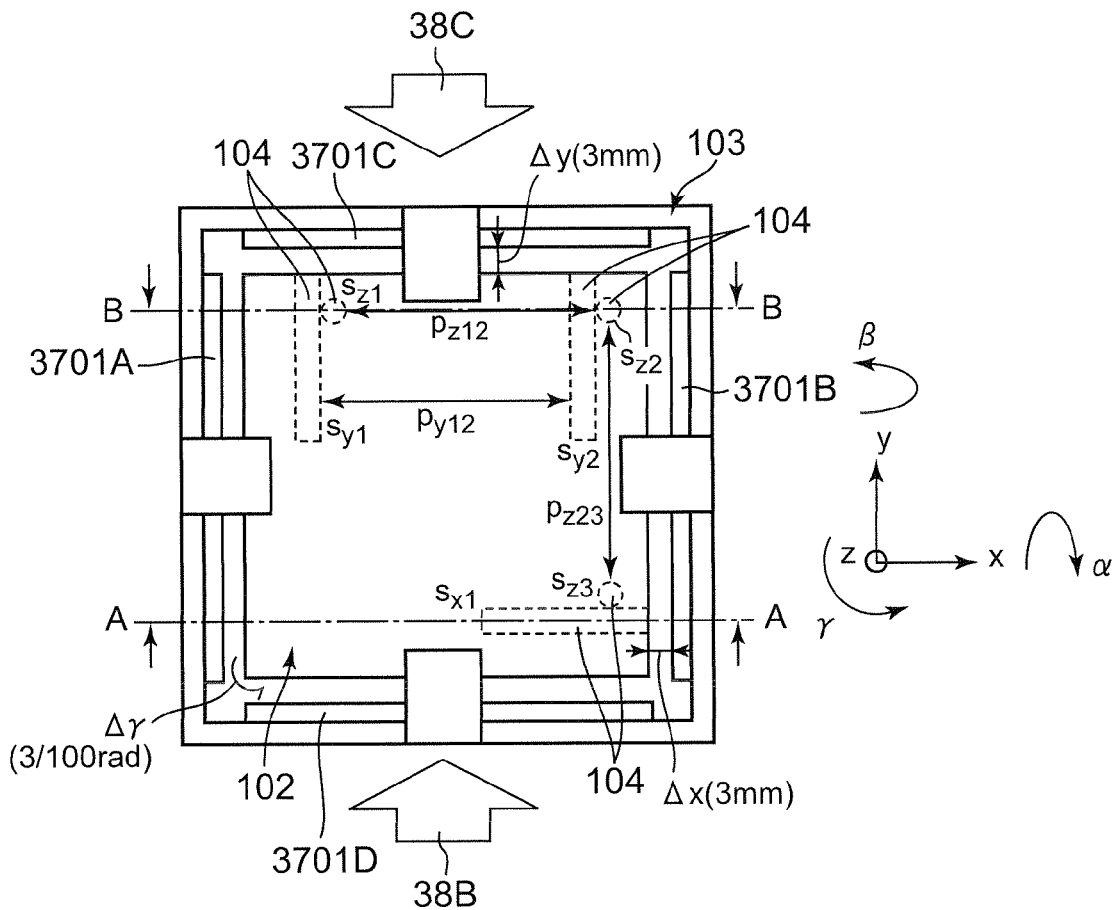
FIG. 38A is a plan view of the end effector, the grip part, the relative position sensors, and the contact sensors in the robot according to the fifth embodiment of the present disclosure.
Figure 38B:
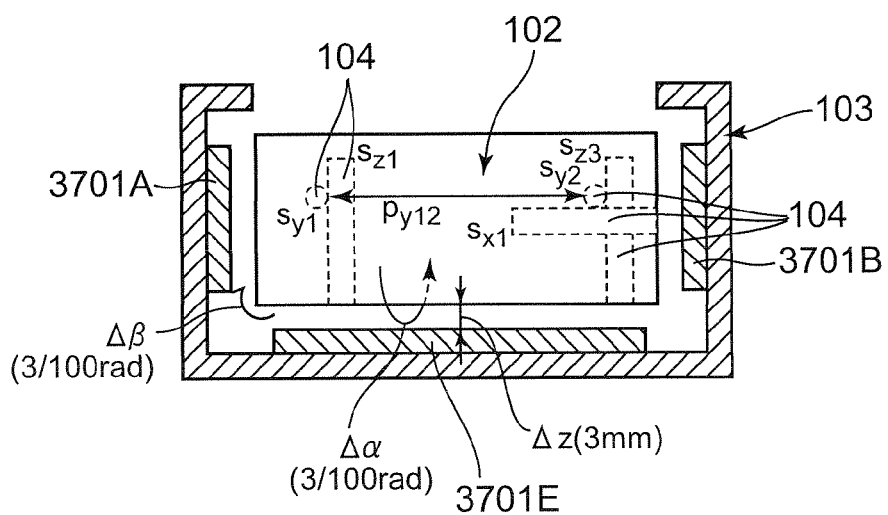
FIG. 38B is a cross-sectional view of the end effector, the grip part, the relative position sensors, and the contact sensors in the robot according to the fifth embodiment of the present disclosure.
Figure 38C:
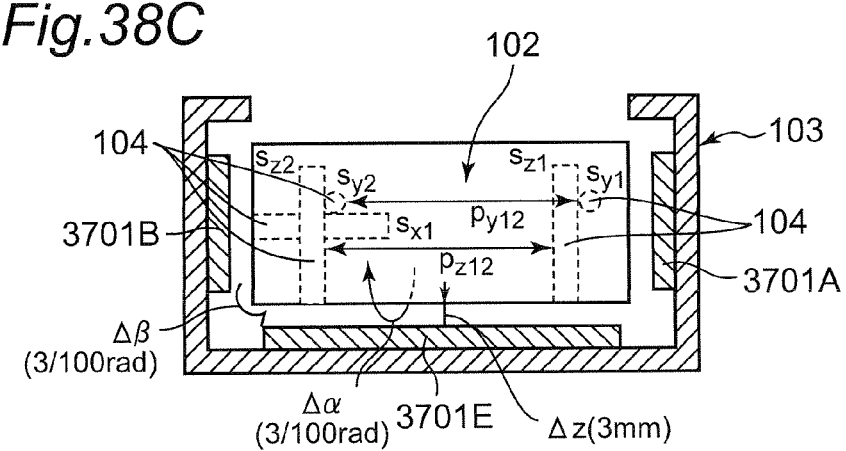
FIG. 38C is a cross-sectional view of the end effector, the grip part, the relative position sensors, and the contact sensors in the robot according to the fifth embodiment of the present disclosure.

FIG. 38A is a plan view of the end effector 102, the grip part 103, the relative position sensors 104, and the contact sensors 3701. FIG. 38B is a cross-sectional view of the end effector 102, the grip part 103, the relative position sensors 104, and the contact sensors 3701 taken along line A-A in FIG. 38A, as seen from arrow 38B. FIG. 38C is a cross-sectional view of the end effector 102, the grip part 103, the relative position sensors 104, and the contact sensors 3701 taken along line B-B in FIG. 38A, as seen from arrow 38C. The functions of the end effector 102, the grip part 103, the relative position sensors 104, and the contact sensors 3701 are identical to those in the first to fourth embodiments.

The difference from the first to fourth embodiments lies in the attaching position of the contact sensors 3701. In the first to fourth embodiments, while the contact sensors are attached to the outer side of the grip part 103 to detect contact between the target object outside the grip part 103 and the grip part 103, the contact sensors are attached to the inner side of the grip part 103 in the fifth embodiment, to detect contact between the grip part 103 and the end effector 102.

The contact sensors 3701 are attached to the inner side of the grip part 103, to detect contact with the end effector 102. The output of each of the contact sensors 3701 is a digital signal, and "1" is output when "in contact", and "0" is output when "out of contact". The contact information detected by the contact sensors 3701 is output to the input/output IF 608. As shown in FIGS. 38A to 38C, the contact sensors 3701 are attached to the five places, i.e., 3701A to 3701E. That is, the contact sensors 3701A to 3701D are attached to the inner faces of the four side face parts 103b, and the contact sensor 3701E is attached to the inner face of the bottom face part 103a. When specific contact sensors are individually described, they are denoted by reference characters 3701A to 3701E, and are denoted by reference character 3701 when they are generally described. It is to be noted that, while the contact sensors 3701 are arranged as shown in FIGS. 38A and 38B, any arrangement place or number of pieces of the contact sensors 3701 can be selected so long as the information as to contact between the grip part 103 and the end effector 102 can be acquired.

Figure 39:
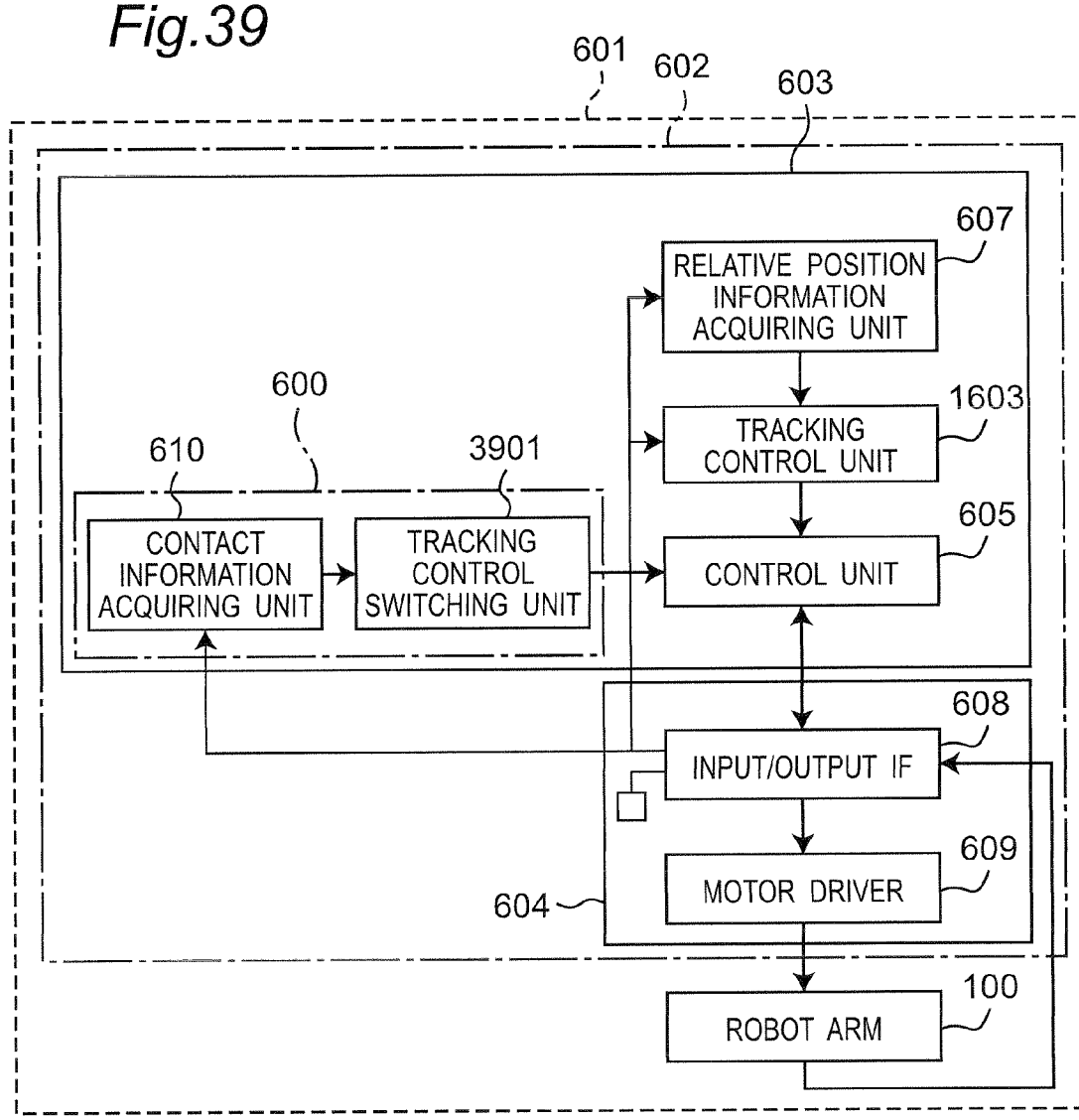
FIG. 39 is a block diagram of the robot arm in the robot according to the fifth embodiment of the present disclosure.

The fifth embodiment corresponds to the block diagram of FIG. 39. Since the manipulator 101, the control unit 605, the tracking control unit 606, the relative position information acquiring unit 607, the input/output IF 608, the motor driver 609, and the contact information acquiring unit 610 in the robot 601 according to the fifth embodiment of the present disclosure are identical to those in the first embodiment, common reference characters are allotted thereto and the description thereof will not be repeated. In the following, a detailed description will be given solely of the different parts.

Firstly, the tracking control switch control unit 600 is structured by the contact information acquiring unit 610 and a tracking control switching unit 3901, and outputs tracking control information, based on the information of contact between the end effector 102 and the grip part 103 acquired by the contact information acquiring unit 610, to stop tracking control only when the grip part 103 and the end effector 102 are in contact with each other and to perform tracking control when the grip part 103 and the end effector 102 are not in contact with each other.

The tracking control switching unit 3901 determines tracking control information in accordance with the contact information from the contact information acquiring unit 610, and outputs the determined tracking control information from the tracking control switching unit 3901 to the control unit 605. The method of selecting tracking control information in the tracking control switching unit 3901 is as follows. When the contact information from the contact information acquiring unit 610 contains information of "in contact" (output: "1") for even one place, "tracking control OFF" is selected; when the information represents "out of contact" (output: "0") for every place, "tracking control ON" is selected. Hence, only when the tracking control switching unit 3901 determines that the grip part 103 are brought into contact with the end effector 102, "tracking control OFF" is selected; when the tracking control switching unit 3901 determines that the grip part 103 is not brought into contact with the end effector 102, the "tracking control ON" is selected. It is to be noted that, as to the selection method of "tracking control ON", though the condition is the occurrence of contact at even one place, it may be the occurrence of contact at two or more places, or at any predetermined place as other control method.

Figure 40A:
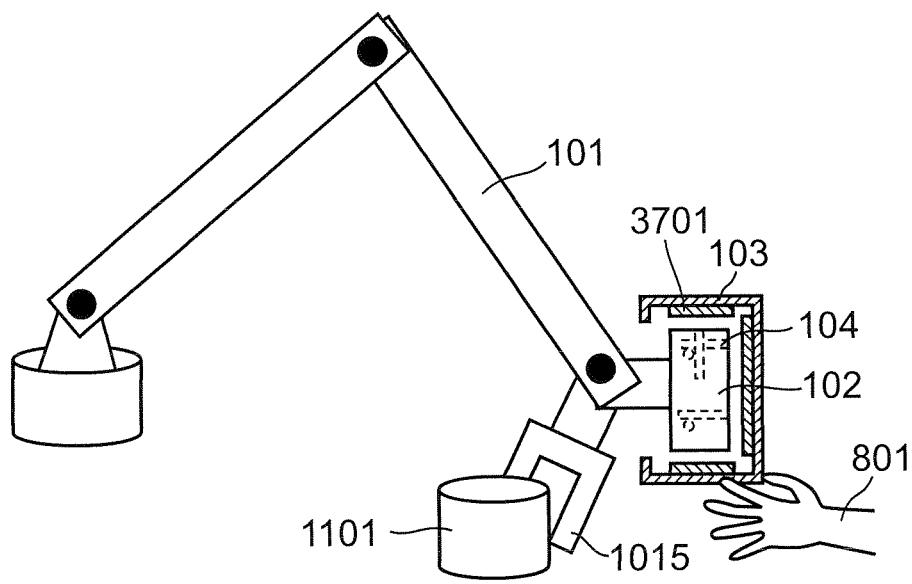
FIG. 40A is an explanatory view of a cooperative conveyance using the robot arm in the robot according to the fifth embodiment of the present disclosure.
Figure 40B:
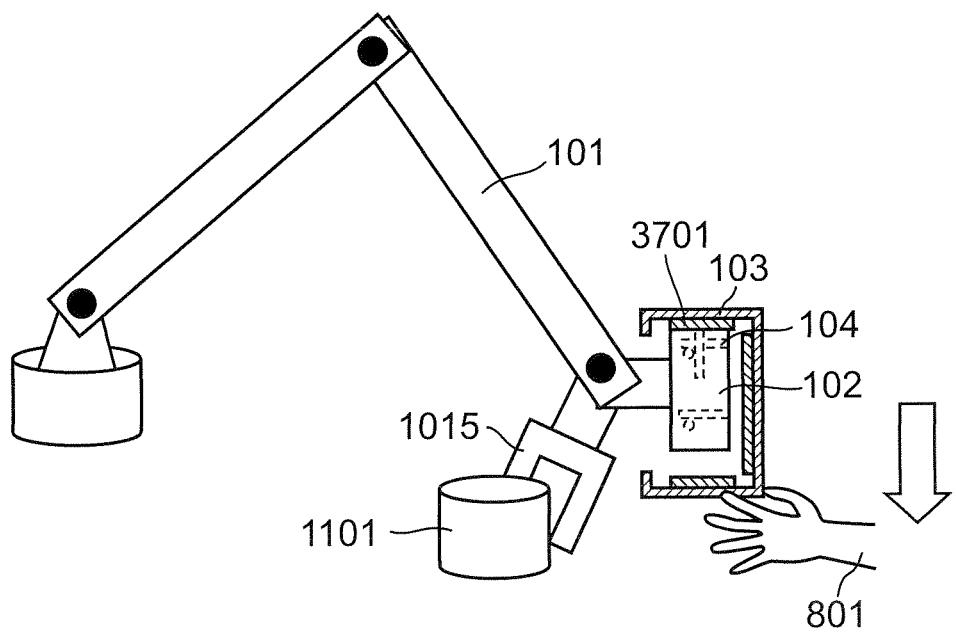
FIG. 40B is an explanatory view of a cooperative conveyance using the robot arm in the robot according to the fifth embodiment of the present disclosure.
Figure 40C:
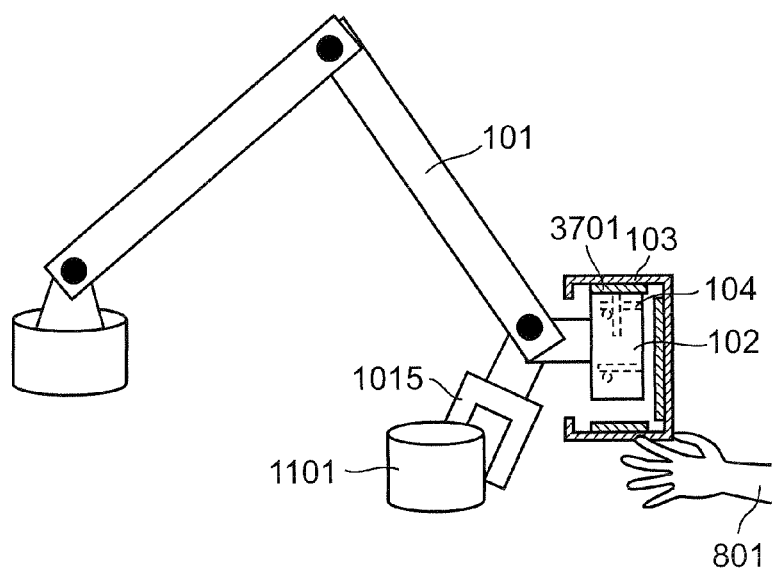
FIG. 40C is an explanatory view of a cooperative conveyance using the robot arm in the robot according to the fifth embodiment of the present disclosure.

FIGS. 40A to 40C show the procedure of the manipulator 101 performing tracking when the user and the manipulator 101 cooperatively convey the target object 1101. The hand 1015 is attached to the arm end part of the manipulator 101, e.g., at the leading end 1002a, and the hand 1015 is caused to grip the target object 1101. Thereafter, the state transits in an order of FIG. 40A→FIG. 40B→FIG. 40C.

Firstly, FIG. 40A shows the state where the user's hand 801 is shifting the grip part 103 and the manipulator 101 is performing tracking control.

Next, FIG. 40B shows the state where the user's hand 801 sharply shifts the grip part 103, whereby the grip part 103 is brought into contact with the end effector 102. This state occurs when the shift amount of the user's hand 801 shifting the grip part 103 every certain time (e.g., every 1 msec) exceeds the shift amount that can be achieved every certain time by the manipulator 101 as being caused by the control device 602 to shift, and thus tracking control lags behind shifting of the grip part 103.

Next, FIG. 40O shows the state where the end effector 102 is in contact with the contact sensor 3701, and the manipulator 101 is stopped.

Figure 41:
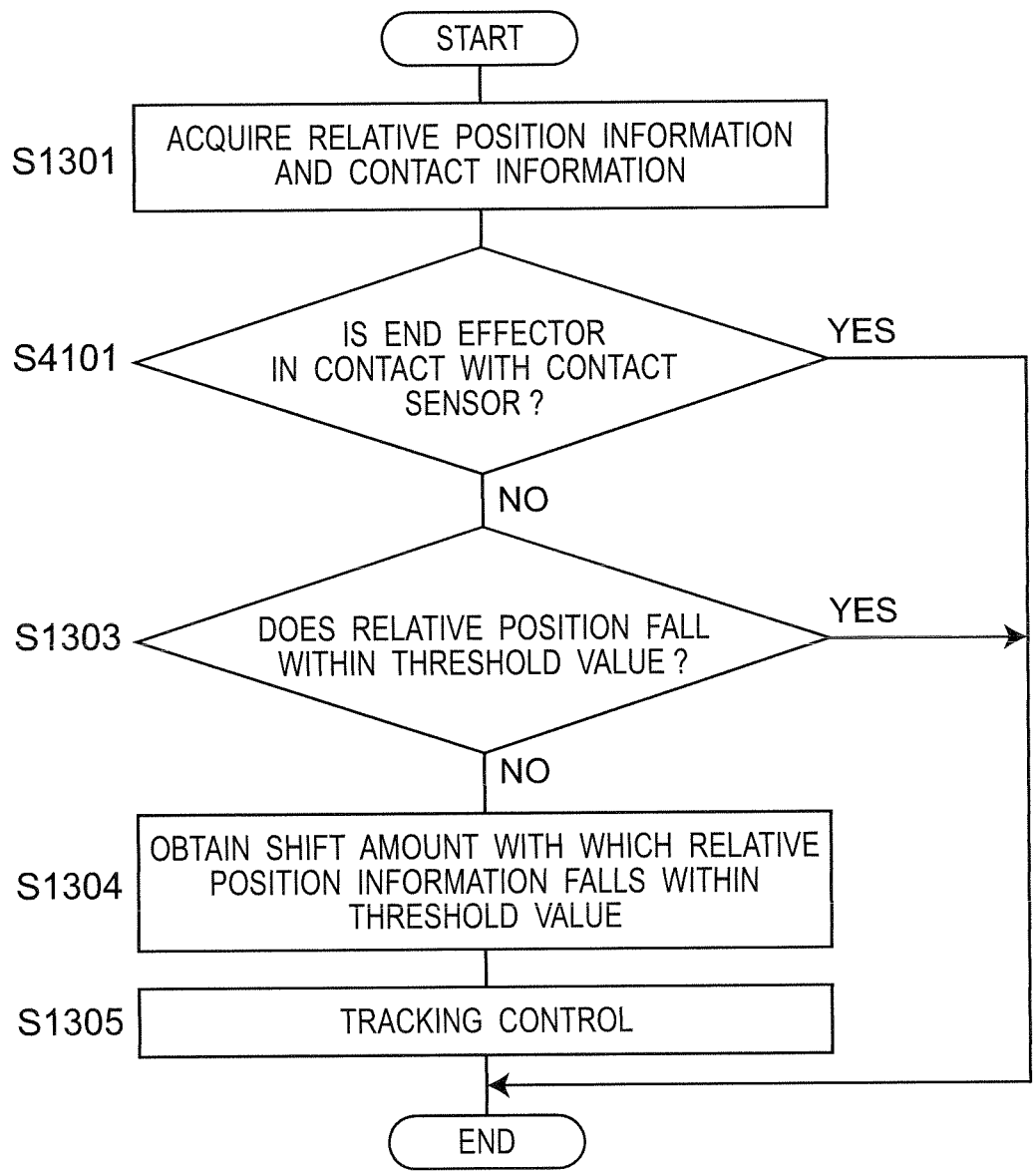
FIG. 41 is a flowchart showing the flow of the processing starting from acquiring the relative position information and the contact information until exerting tracking control in the robot according to the fifth embodiment of the present disclosure.

With reference to the flowchart of FIG. 41, a description will be given of the operation procedure of the control device 602 of the robot arm 100 in the robot 601 according to the fifth embodiment.

In Step S1301, the relative position information acquiring unit 607 acquires the relative position information of the grip part 103 to the end effector 102. The contact information acquiring unit 610 acquires the contact information of the contact sensors 3701 to the end effector 102.

In Step S4101, the tracking control switching unit 3901 determines whether the end effector 102 is in contact with the contact sensor 105, based on the contact information acquired from the contact information acquiring unit 610. When the tracking control switching unit 3901 determines that the end effector 102 is in contact with the contact sensor 3701, the flow ends. When the tracking control switching unit 3901 determines that the end effector 102 is not in contact with the contact sensor 3701, the procedure proceeds to Step S1303.

In Step S1303, the tracking control unit 606 determines whether the relative position information acquired from the relative position information acquiring unit 607 falls within a prescribed threshold value range. When the tracking control unit 606 determines that the relative position information falls within the threshold value range, the flow ends. When the tracking control unit 606 determines that the relative position information does not fall within the threshold value range, the process proceeds to Step S1304.

In Step S1304, the tracking control unit 606 obtains the shift amount with which the relative position information exceeding the threshold value range falls within the threshold value. The shift amount obtained by the tracking control unit 606 is output from the tracking control unit 606 to the control unit 605, and the procedure proceeds to Step S1305.

In Step S1305, the control unit 605 causes the manipulator 101 to perform tracking control based on the shift amount acquired from the tracking control unit 606, and the flow ends.

According to the fifth embodiment, in addition to the operation and effect of the first embodiment, the following danger is addressed. When the user sharply shifts the grip part 103, the tracking control of the manipulator 101 may be delayed and the manipulator 101 may become out of control. Therefore, the control device 602 exerts control to stop the manipulator 101 when the grip part 103 is brought into contact with the end effector 102, whereby the danger is avoided and safety can be enhanced.

Though the present disclosure has been described above based on the above first to fifth embodiments, the present disclosure should not be limited to the above-described first to fifth embodiments. For example, the present disclosure also includes the following cases.

Each of the above-described apparatuses is actually a computer system that includes, for example, a microprocessor, ROM, RAM, hard disk unit, display unit, keyboard, and mouse. A computer program is stored on the RAM or the hard disk unit. Functions of each of the apparatuses can be achieved by the microprocessor operating according to the computer program. The computer program mentioned here is a combination of a plurality of instruction codes that indicate commands to a computer for achieving predetermined functions.

In other words, in each of the above-mentioned embodiments, each component may be composed of dedicated hardware, or implemented by executing programs for components feasible with software. Each component can be implemented as a result that a program executing part such as a CPU reads and executes software programs recorded in a recording medium such as a hard disk or semiconductor memory. Here, software that implements an information-processing device according to each of the above-mentioned embodiments is a following program. That is to say, this program has a computer execute the units/steps defined in claims. The program has a computer execute the units/steps defined in claims. That is, such a program is a robot arm control program for controlling an operation of a robot arm performing work by being touched and manipulated by a user, the robot arm including an end effector attached to a body of the robot arm, and a grip part attached to the body of the robot arm as being separated from the end effector to form a clearance of a prescribed interval between the end effector and the grip part, the grip part being capable of relatively shifting to the end effector and being capable of being gripped by the user during a manipulation, the robot arm control program causing a computer to perform steps of:

acquiring, by a relative position information acquiring unit, relative position information of the grip part to the end effector during the manipulation;

obtaining, by a tracking control unit, a shift amount of the robot arm for tracking control causing the robot arm to shift in accordance with a change amount of the interval of the clearance between the end effector and the grip part, such that the relative position information acquired by the relative position information acquiring unit falls within a prescribed threshold value range;

outputting, by a tracking control switch control unit, tracking control information switching the tracking control such that the tracking control unit exerts the tracking control when the grip part is in contact with any other object than the end effector, and that the tracking control unit does not exert the tracking control when the grip part is out of contact with the other object; and controlling, based on the tracking control information from the tracking control switch control unit, shifting of the robot arm in accordance with the change amount of the interval of the clearance between the end effector and the grip part based on the shift amount of the robot arm obtained by the tracking control unit when the tracking control unit exerts the tracking control, whereas the control unit controls shifting of the robot arm irrespective of the shift amount of the robot arm obtained by the tracking control unit when the tracking control unit does not exert the tracking control, wherein in the outputting of the tracking control information from the tracking control switch control unit, acquiring, by a contact information acquiring unit, information as to an occurrence of contact between the grip part and any other object, detecting, by a grip detecting unit, grip information indicative of information as to an occurrence of gripping of the user to the grip part and information of one of position and magnitude of force of the user's gripping, based on the information as to the contact acquired by the contact information acquiring unit, and outputting, by a tracking control switching unit, tracking control information for changing a tracking speed in accordance with one of the position and the magnitude of force of the user's gripping to the grip part, based on the grip information detected by the grip detecting unit.

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

By properly combining arbitrary embodiment(s) or modification(s) of the aforementioned various embodiments and modifications, the effects possessed by the embodiment(s) or modification(s) can be produced.

The entire disclosure of Japanese Patent Application No. 2011-015228 filed on Jan. 17, 2011, including specification, claims, drawings, and summary are incorporated herein by reference in its entirety.

INDUSTRIAL APPLICABILITY

The present disclosure is useful for control device and control method of an industrial robot or a robot arm of a movable mechanism in productive facilities, the robot, a control program of the robot arm, and an integrated electronic circuit. Further, not being limited to the industrial robot, the present disclosure is applicable to control device and control method of a robot arm of a household robot, the robot, a control program of the robot arm, and an integrated electronic circuit.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

The invention claimed is:

1. A robot arm control device controlling an operation of a robot arm performing work by being touched and manipulated by a user, the robot arm including an end effector attached to a body of the robot arm, and a grip part attached to the body of the robot arm as being separated from the end effector to form a clearance of a prescribed interval between the end effector and the grip part, the grip part being capable of relatively shifting to the end effector and being capable of being gripped by the user during a manipulation, the robot arm control device comprising:
a relative position information acquiring unit that acquires relative position information of the grip part to the end effector during the manipulation;
a tracking control unit that obtains a shift amount of the robot arm for tracking control causing the robot arm to shift in accordance with a change amount of the interval of the clearance between the end effector and the grip part, such that the relative position information acquired by the relative position information acquiring unit falls within a prescribed threshold value range;
a tracking control switch control unit that outputs tracking control information switching the tracking control such that the tracking control unit exerts the tracking control when the grip part is in contact with any other object than the end effector, and that the tracking control unit does not exert the tracking control when the grip part is out of contact with the other object; and
a control unit that controls, based on the tracking control information from the tracking control switch control unit, shifting of the robot arm in accordance with the change amount of the interval of the clearance between the end effector and the grip part based on the shift amount of the robot arm obtained by the tracking control unit when the tracking control unit exerts the tracking control, whereas the control unit controls shifting of the robot arm irrespective of the shift amount of the robot arm obtained by the tracking control unit when the tracking control unit does not exert the tracking control, wherein
the tracking control switch control unit includes:
a contact information acquiring unit that acquires information as to an occurrence of contact between the grip part and any other object;
a grip detecting unit that detects grip information indicative of information as to an occurrence of gripping of the user to the grip part and information of one of position and magnitude of force of the user's gripping, based on the information as to the contact acquired by the contact information acquiring unit; and
a tracking control switching unit that outputs tracking control information for changing a tracking speed in accordance with one of the position and the magnitude of force of the user's gripping to the grip part, based on the grip information detected by the grip detecting unit.

2. The robot arm according to claim 1, wherein
the grip detecting unit detects, in addition to the information as to an occurrence of the user's gripping, an elapsed time from a start of gripping also as the grip information,
the robot arm further comprising:
a control coefficient information acquiring unit that acquires associated information in which the information as to an occurrence of the user's gripping to the grip part, the elapsed time from the start of the gripping, and information as to a control coefficient determining the tracking speed are associated with one another; and
a control coefficient information determining unit that determines the control coefficient determining the tracking speed based on the grip information detected by the grip detecting unit and the associated information acquired by the control coefficient information acquiring unit, wherein
in a prescribed certain time immediately after the user grips the grip part, control is exerted such that the tracking speed of the tracking control becomes slower than the tracking speed in other time, based on the control coefficient acquired by the control coefficient information acquiring unit.

3. The robot arm according to claim 1, wherein
the grip detecting unit detects, in addition to the information as to an occurrence of the user's gripping, a position at which the grip part is gripped by the user also as the grip information,
the robot arm further comprising:
a control coefficient information acquiring unit that acquires associated information in which the information as to an occurrence of the user's gripping to the grip part, the position at which the grip part is gripped by the user, and information as to a control coefficient determining a tracking speed are associated with one another; and
a control coefficient information determining unit that determines the control coefficient determining the tracking speed based on the grip information detected by the grip detecting unit and the associated information acquired by the control coefficient information acquiring unit, wherein
control is exerted such that the tracking speed of the tracking control is changed based on the control coefficient acquired by the control coefficient information acquiring unit, in accordance with the position at which the grip part is gripped by the user.

4. The robot arm according to claim 1, wherein
the tracking control switch control unit includes a force information acquiring unit acquiring a magnitude of force externally applied to the grip part, and
the grip detecting unit detects, based on the force information acquired by the force information acquiring unit, the information as to an occurrence of gripping of the user to the grip part, and further detects the magnitude of force of the user gripping the grip part also as the grip information,
the robot arm further comprising:
a control coefficient information acquiring unit that acquires associated information in which the information as to an occurrence of the user's gripping to the grip part, the magnitude of force of the user gripping the grip part, and a control coefficient determining the tracking speed are associated with one another; and
a control coefficient information determining unit that determines a control coefficient determining the tracking speed based on the grip information detected by the grip detecting unit and the associated information acquired by the control coefficient information acquiring unit, wherein control is exerted such that the tracking speed of the tracking control is changed based on the control coefficient acquired by the control coefficient information acquiring unit, in accordance with the magnitude of force of the user gripping the grip part.

5. The robot arm according to claim 1, wherein the tracking control switch control unit includes:
a contact information acquiring unit that acquires an occurrence of contact of the end effector with the grip part; and
a tracking control switching unit that outputs tracking control information for stopping tracking control only when the grip part and the end effector are brought into contact with each other, and exerting tracking control when the grip part and the end effector are out of contact with each other, based on the contact information acquired by the contact information acquiring unit.

6. A robot, comprising the robot arm according to claim 1.

7. A robot arm control method controlling an operation of a robot arm performing work by being touched and manipulated by a user, the robot arm including an end effector attached to a body of the robot arm, and a grip part attached to the body of the robot arm as being separated from the end effector to form a clearance of a prescribed interval between the end effector and the grip part, the grip part being capable of relatively shifting to the end effector and being capable of being gripped by the user during a manipulation, the method comprising:
acquiring, by a relative position information acquiring unit, relative position information of the grip part to the end effector during the manipulation;
obtaining, by a tracking control unit, a shift amount of the robot arm for tracking control causing the robot arm to shift in accordance with a change amount of the interval of the clearance between the end effector and the grip part, such that the relative position information acquired by the relative position information acquiring unit falls within a prescribed threshold value range;
outputting, by a tracking control switch control unit, tracking control information switching the tracking control such that the tracking control unit exerts the tracking control when the grip part is in contact with any other object than the end effector, and that the tracking control unit does not exert the tracking control when the grip part is out of contact with the other object; and
controlling, based on the tracking control information from the tracking control switch control unit, shifting of the robot arm in accordance with the change amount of the interval of the clearance between the end effector and the grip part based on the shift amount of the robot arm obtained by the tracking control unit when the tracking control unit exerts the tracking control, whereas the control unit controls shifting of the robot arm irrespective of the shift amount of the robot arm obtained by the tracking control unit when the tracking control unit does not exert the tracking control, wherein
in the outputting of the tracking control information from the tracking control switch control unit,
acquiring, by a contact information acquiring unit, information as to an occurrence of contact between the grip part and any other object,
detecting, by a grip detecting unit, grip information indicative of information as to an occurrence of gripping of the user to the grip part and information of one of position and magnitude of force of the user's gripping, based on the information as to the contact acquired by the contact information acquiring unit, and
outputting, by a tracking control switching unit, tracking control information for changing a tracking speed in accordance with one of the position and the magnitude of force of the user's gripping to the grip part, based on the grip information detected by the grip detecting unit.

8. A computer-readable recording medium including a robot arm control program for controlling an operation of a robot arm performing work by being touched and manipulated by a user, the robot arm including an end effector attached to a body of the robot arm, and a grip part attached to the body of the robot arm as being separated from the end effector to form a clearance of a prescribed interval between the end effector and the grip part, the grip part being capable of relatively shifting to the end effector and being capable of being gripped by the user during a manipulation,
the robot arm control program causing a computer to perform steps of:
acquiring, by a relative position information acquiring unit, relative position information of the grip part to the end effector during the manipulation;
obtaining, by a tracking control unit, a shift amount of the robot arm for tracking control causing the robot arm to shift in accordance with a change amount of the interval of the clearance between the end effector and the grip part, such that the relative position information acquired by the relative position information acquiring unit falls within a prescribed threshold value range;
outputting, by a tracking control switch control unit, tracking control information switching the tracking control such that the tracking control unit exerts the tracking control when the grip part is in contact with any other object than the end effector, and that the tracking control unit does not exert the tracking control when the grip part is out of contact with the other object; and
controlling, based on the tracking control information from the tracking control switch control unit, shifting of the robot arm in accordance with the change amount of the interval of the clearance between the end effector and the grip part based on the shift amount of the robot arm obtained by the tracking control unit when the tracking control unit exerts the tracking control, whereas the control unit controls shifting of the robot arm irrespective of the shift amount of the robot arm obtained by the tracking control unit when the tracking control unit does not exert the tracking control, wherein
in the outputting of the tracking control information from the tracking control switch control unit,
acquiring, by a contact information acquiring unit, information as to an occurrence of contact between the grip part and any other object,
detecting, by a grip detecting unit, grip information indicative of information as to an occurrence of gripping of the user to the grip part and information of one of position and magnitude of force of the user's gripping, based on the information as to the contact acquired by the contact information acquiring unit, and
outputting, by a tracking control switching unit, tracking control information for changing a tracking speed in accordance with one of the position and the magnitude of force of the user's gripping to the grip part, based on the grip information detected by the grip detecting unit.

9. A robot arm-use integrated electronic circuit controlling an operation of a robot arm performing work by being touched and manipulated by a user, the robot arm including an end effector attached to a body of the robot arm, and a grip part attached to the body of the robot arm as being separated from the end effector to form a clearance of a prescribed interval between the end effector and the grip part, the grip part being capable of relatively shifting to the end effector and being capable of being gripped by the user during a manipulation, the integrated electronic circuit comprising:

a relative position information acquiring unit that acquires relative position information of the grip part to the end effector during the manipulation;

a tracking control unit that obtains a shift amount of the robot arm for tracking control causing the robot arm to shift in accordance with a change amount of the interval of the clearance between the end effector and the grip part, such that the relative position information acquired by the relative position information acquiring unit falls within a prescribed threshold value range;

a tracking control switch control unit that outputs tracking control information switching the tracking control such that the tracking control unit exerts the tracking control when the grip part is in contact with any other object than the end effector, and that the tracking control unit does not exert the tracking control when the grip part is out of contact with the other object; and a control unit that controls, based on the tracking control information from the tracking control switch control unit, shifting of the robot arm in accordance with the change amount of the interval of the clearance between the end effector and the grip part based on the shift amount of the robot arm obtained by the tracking control unit when the tracking control unit exerts the tracking control, whereas the control unit controls shifting of the robot arm irrespective of the shift amount of the robot arm obtained by the tracking control unit when the tracking control unit does not exert the tracking control, wherein the tracking control switch control unit includes:

a contact information acquiring unit that acquires information as to an occurrence of contact between the grip part and any other object;

a grip detecting unit that detects grip information indicative of information as to an occurrence of gripping of the user to the grip part and information of one of position and magnitude of force of the user's gripping, based on the information as to the contact acquired by the contact information acquiring unit; and a tracking control switching unit that outputs tracking control information for changing a tracking speed in accordance with one of the position and the magnitude of force of the user's gripping to the grip part, based on the grip information detected by the grip detecting unit.

* * * * *